United States Patent
Tonkin et al.

(10) Patent No.: US 11,899,705 B2
(45) Date of Patent: *Feb. 13, 2024

(54) PUTATIVE ONTOLOGY GENERATING METHOD AND APPARATUS

(71) Applicant: Semantic Technologies Pty Ltd., North Sydney (AU)

(72) Inventors: Albert Donald Tonkin, Seaforth (AU); Dung Xuan Thi Le, Homebush (AU)

(73) Assignee: SEMANTIC TECHNOLOGIES PTY LTD, North Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,005

(22) Filed: Nov. 29, 2022

(65) Prior Publication Data

US 2023/0334080 A1    Oct. 19, 2023

Related U.S. Application Data

(63) Continuation of application No. 16/692,593, filed on Nov. 22, 2019, now Pat. No. 11,556,578, which is a continuation-in-part of application No. 15/310,751, filed as application No. PCT/AU2015/000270 on May 8, 2015, now abandoned.

(60) Provisional application No. 61/992,153, filed on May 12, 2014.

(51) Int. Cl.
| | |
|---|---|
| *G06F 16/36* | (2019.01) |
| *G06N 5/025* | (2023.01) |
| *G06F 16/21* | (2019.01) |
| *G06F 16/22* | (2019.01) |

(52) U.S. Cl.
CPC .......... *G06F 16/367* (2019.01); *G06F 16/211* (2019.01); *G06F 16/2282* (2019.01); *G06N 5/025* (2013.01)

(58) Field of Classification Search
CPC .. G06F 16/367; G06F 16/211; G06F 16/2282; G06N 5/025; G06N 5/022; G06N 5/027
USPC ........................................................ 707/803
See application file for complete search history.

(56) References Cited

U.S. PATENT DOCUMENTS

| | | | |
|---|---|---|---|
| 2003/0120665 A1* | 6/2003 | Fox ...................... | G06F 16/288 |
| 2008/0140389 A1* | 6/2008 | Funakoshi .............. | G06F 40/30 704/9 |
| 2009/0070295 A1* | 3/2009 | Otomori ................ | G06F 40/143 |
| 2011/0055240 A1* | 3/2011 | Li ........................ | G06F 16/9032 707/769 |
| 2012/0143881 A1* | 6/2012 | Baker .................... | G06F 16/93 707/750 |
| 2015/0019248 A1* | 1/2015 | Anand ................... | G16H 50/20 705/2 |
| 2015/0142828 A1* | 5/2015 | Nguyen ................ | G06F 16/367 707/758 |

* cited by examiner

*Primary Examiner* — Hicham Skhoun
(74) *Attorney, Agent, or Firm* — Honigman LLP

(57) ABSTRACT

Apparatus for generating a putative ontology from a data structure associated with a data store, the apparatus including an electronic processing device that generates a putative ontology by determining at least one concept table in the data structure, determining at least one validated attribute within the at least one concept table, determining at least one selected attribute value from the at least one validated attribute and generating at least one ontology class using the at least one attribute value.

11 Claims, 22 Drawing Sheets

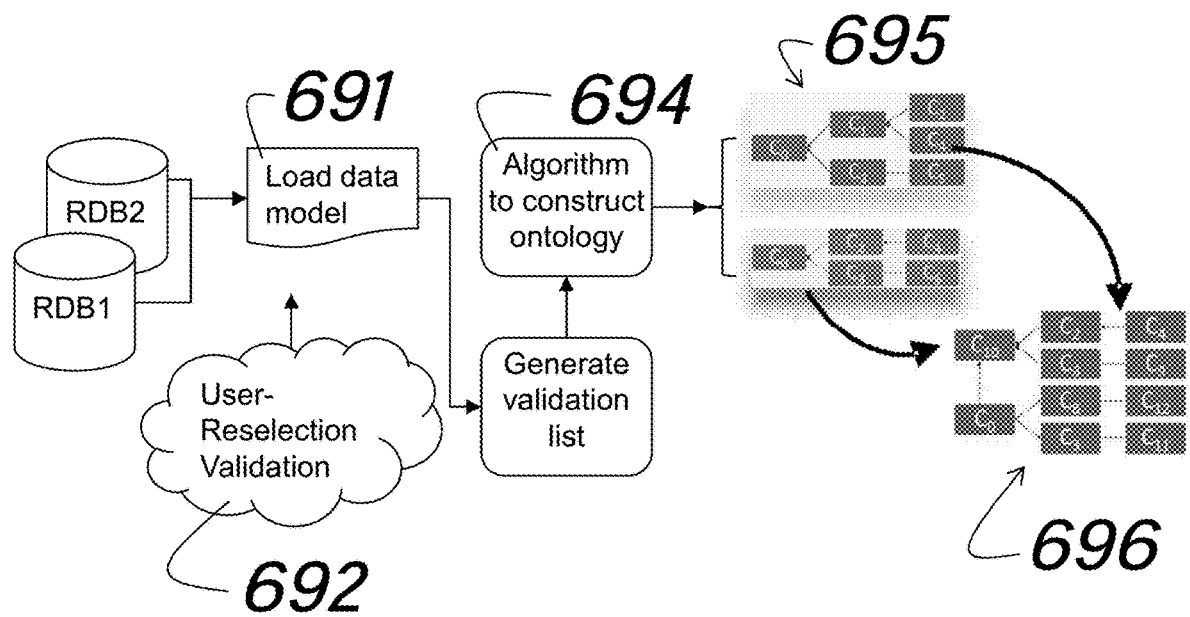

Fig. 6B

Algorithm: createOntology

1. Input:
2.     $L_m$ = user validation list of metadata information
3.     SD = Data sources
4.     Let $y$ be a record in a relation $r$, be a data type property of a concept, V be a set of attribute values of an attribute, tempConcept be an empty list
5. Output: O
6.     FOR each item in $L_m$ LOOP
7.         Extract A, r
8.         FOR each a in A LOOP
9.             Retrieve values V of a from r SD
10.             FOR each value v
11.                 Create a concept_name c using v
12.                 = DataTypeProperty(Domain:c, Range: String)
13.                 Assign as data type property to c
14.                 = conceptInstance(c, r, SD)
15.                 IF is not null THEN set as an instance of c
16.             Push (c,y) into tempConcept
17.             Update O with c include instance and DataTypeProperty
18.             END FOR
19.         END FOR
20.     END FOR
21.     Push $L_m$
22.     ObjectProperty(O, tempConcept)

Fig. 6C

Function 1: conceptInstance

1:1. Input:
1:2.     c = concept requires an instance created
1:3.     SD = Data sources
1:4.     Let r be the name of a relation table in SD
1:5.     Let REC be a record to be retrieved
1:6. Output:
1:7.    FOR each record REC in r  SD
1:8.        IF c  REC THEN
1:9.            REC
1:10.       EXIT FOR
1:11.   RETURN

*Fig. 6D*

Function 2: ObjectProperty

1.  Input:
2.      O = an ontology with all concepts created
3.      tempConcept=a list of concepts and their associated relations
4.      Let $r_m$, $r_n$ be relations, $P_m$, $P_n$ be primary keys, $F_m$, $F_n$ be foreign keys
5.  Output:O
6.     FOR each item m in tempConcept
7.         Extract relation $r_m$ and concept $C_i$ from m
8.         Let n be the item start after m in tempConcept
9.         FOR each item n in tempConcept
10.            Extract relation $r_n$ and concept $C_j$ from n
11.            IF $r_m$ == $r_n$ THEN EXIT FOR
12.            IF ($P_m$, $r_m$ == Pn $r_n$) THEN
13.                ObjectProperty = Domain:$c_i$ Range:$c_j$
14.            ELSE IF ($F_m$, $r_m$ == Pn $r_n$) THEN
15.                ObjectProperty = Domain:$c_i$ Range:$c_j$
16.            END IF
17.            Update objectProperty for $c_i$, $c_j$ in O
18.        END FOR
19.    END FOR
20. Flush tempConcept

*Fig. 6E*

PUTATIVE ONTOLOGY GENERATING METHOD AND APPARATUS

This application is a continuation of U.S. patent application Ser. No. 16/692,593, filed Nov. 22, 2019, which is a continuation-in-part of U.S. patent application Ser. No. 15/310,751, filed Nov. 12, 2016, which claims the benefit under 35 USC 371 to International Application No. PCT/AU2015/000270, filed May 8, 2015, which claims priority to U.S. Provisional Application No. 61/992,153, filed May 12, 2014, each of which is incorporated by reference in its entirety.

BACKGROUND OF THE INVENTION

The present invention relates to a method and apparatus for use in generating a putative ontology.

DESCRIPTION OF THE PRIOR ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

Reference to cited material or information contained in the text should not be understood as a concession that the material or information was part of the common general knowledge or was known in Australia or any other country.

There are many thousands of public and private ontologies describing every aspect of the scientific, engineering and business worlds. The explosive growth of knowledge and data is beyond the ability of traditional information management mechanisms to manage or even describe. Semantic Web technologies such as ontologies and new languages such as OWL (Web Ontology Language) and RDF (Resource Description Framework) enable the description of linked concepts such as health, medicine or engineering to be described in previously impossible detail and in a manner which is both human and machine understandable. Consequently ontologies play an important role in bridging and integrating multiple heterogeneous sources on a semantic level.

The task of developing ontologies manually is very complex, challenging, error-prone and often a lengthy process. The complexity is due to the concrete knowledge required in order to present an enormous diversity with ten of thousands of possible concepts for a domain. These ontologies may contain many thousands of linked concepts and removing even one concept, axiom or data property could render many of the relationships invalid. These ontologies are therefore typically created by teams of subject matter experts (ontologists). Therefore, the cost of developing ontologies is high both in terms of resources and time.

Consequently there is increasing interest in techniques that will convert relational data sources to ontologies automatically. However, most techniques centre around the use of scripts, which must be manually pre-configured for each schema separately, thereby limiting their use.

SUMMARY OF THE PRESENT INVENTION

In one broad form the present invention seeks to provide an apparatus for generating a putative ontology from a data structure associated with a data store, the apparatus including an electronic processing device that generates a putative ontology by:
  determining at least one concept table in the data structure;
  determining at least one validated attribute within the at least one concept table;
  determining at least one selected attribute value from the at least one validated attribute; and
  generating at least one ontology class using the at least one attribute value.

Preferably, the electronic processing device utilises a rules based approach.

Preferably, the electronic processing device uses respective rules to determine at least one of:
  the ontology class;
  at least one data property associated with the ontology class;
  at least one an ontology class instance associated with the ontology class; and
  at least one object property associated with the ontology class.

Preferably, the electronic processing device identifies the concept table based on at least one of:
  a table structure;
  relationships between the tables;
  a table name; and
  names of attributes within the table.

Preferably, the electronic processing device identifies a concept table at least in part by:
  selecting a table;
  identifying a related table;
  examining a type of the related table and the relationships to the related table; and
  selectively determining the selected table to be a concept table depending on the results of the examination.

Preferably, the concept table is at least one of:
  a type table;
  a bill of materials table having a bill of materials structure;
  related to a bill of materials table having a bill of materials structure; and
  related to a type table.

Preferably, the bill of materials table is related by a many to many relationship.

Preferably, the type table is related by a one to many relationship.

Preferably, the concept table is denormalised.

Preferably, the electronic processing device defines a class name of the at least one ontology class using the at least one attribute value.

Preferably, the concept table is related to a bill of materials table containing at least two foreign keys that refer to a primary key in the concept table.

Preferably, the electronic processing device identifies an attribute of the bill of materials table that defines an object property relating the two classes identified by the foreign keys, in accordance with user input commands.

Preferably, the electronic processing device determines the at least one validated attribute in accordance with at least one of:
  user input commands; and
  a primary key of the at least one table.

Preferably, the electronic processing device determines each attribute value of the validated attribute to be a selected attribute value.

Preferably, the electronic processing device determines at least one selected attribute value in accordance with user input commands.

Preferably, the electronic processing device:
displays a list of attribute values of the at least one validated attribute; and
determines at least one selected attribute value in accordance with user input commands.

Preferably, the electronic processing device:
determines at least one record including an attribute value corresponding to an ontology class; and
uses the at least one record to determine at least one ontology class instance.

Preferably, the electronic processing device, for any ontology term corresponding to an attribute:
determining keys associated with the at least one table; and
generating object properties based on the keys.

Preferably, the keys include primary and foreign keys.

Preferably, the electronic processing device determines data properties of an ontology class in accordance with attributes related to the validated attribute.

Preferably, the concept table is related to a type table and a bill of materials table and wherein the electronic processing device determines the data properties using the type table and bill of materials.

Preferably, the electronic processing device uses the bill of materials table and type table to establish a concept that is a class related to a concept that is a data property.

Preferably, the electronic processing device further creates an ontology term corresponding to at least one other table in the data structure.

In another broad form the present invention seeks to provide a method for generating a putative ontology from a data structure associated with a data store, the method including in an electronic processing device, generating a putative ontology by:
determining at least one concept table in the data structure;
determining at least one validated attribute within the at least one concept table;
determining at least one selected attribute value from the at least one validated attribute; and
generating at least one ontology class using the at least one attribute value.

BRIEF DESCRIPTION OF THE DRAWINGS

An example of the present invention will now be described with reference to the accompanying drawings, in which:

FIG. 6B is a schematic diagram of an example of a method of generating a putative ontology;

FIGS. 6C to 6E are example algorithms and functions for use in generating a putative ontology;

DETAILED DESCRIPTION OF THE PREFERRED EMBODIMENTS

Figure 1:
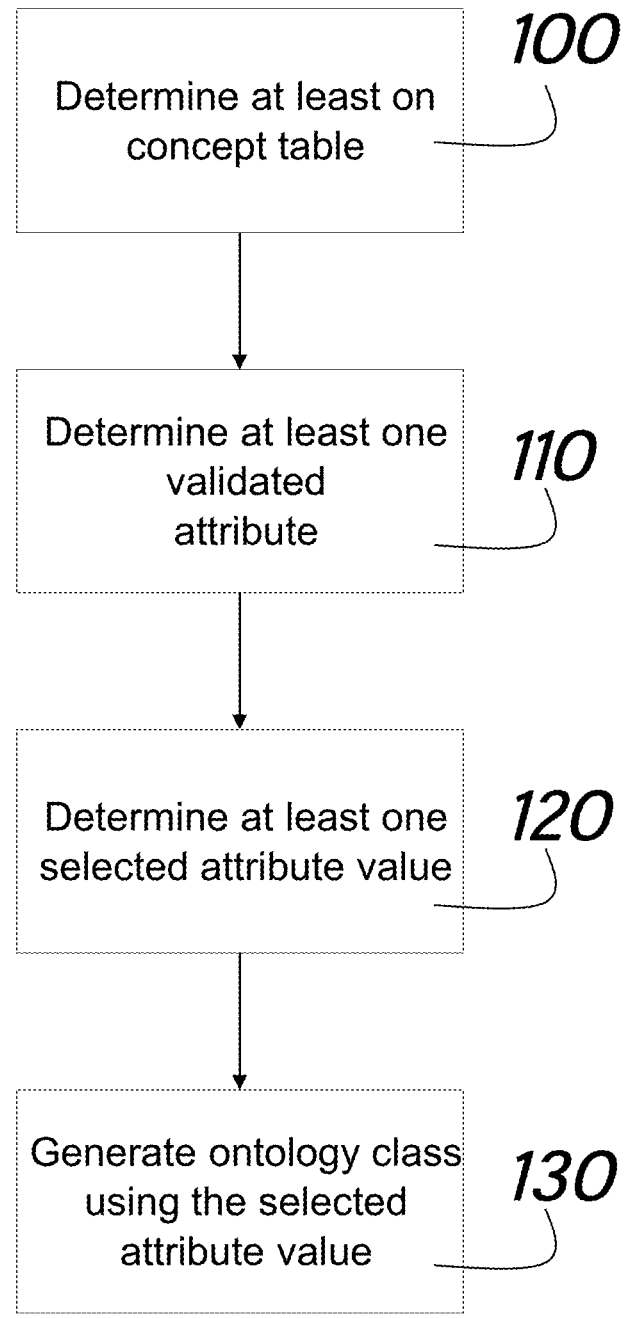
FIG. 1 is a flow chart of an example of a method for use in aligning ontology terms.

An example of a method of generating a putative ontology will now be described with reference to FIG. 1.

For the purpose of example, it is assumed that the process is performed at least in part using an electronic processing device, such as a microprocessor of a computer system, as will be described in more detail below.

For at least some of the examples, it is also assumed that content is stored as one or more content instances in content fields of a data store acting as a content repository, such as database or file. Thus, the content fields could be database fields of a database, with a content instance corresponding to a database record, including values stored across one or more database fields. Alternatively, content fields could be fields defined within a file, such as an XML file, which may be used for transporting data, for example, when data is to be extracted from and/or transferred to a database, as will become apparent from the description below. As another alternative, content fields could be fields defined within a file, such as an RDF triple store, which may be used for transporting data, for example, when data is to be extracted from and/or transferred to a RDF triple store database, as will also become apparent from the description below. It is assumed that the content is stored in accordance with a data structure, such as a database schema, XML document definition, ontology or schema, or the like.

For the purpose of illustration throughout the following description, the term "source" is used to refer to a data store, such as a database or file from which data is being extracted, whilst the term "target" is used to refer to a data store, such as a database or file into which data is being stored. These terms are for the purpose of illustration only, for example to distinguish between possible sources and targets, and are not intended to be limiting.

The term "content instance" refers to an individual piece of content that is being extracted from a source and/or transferred to a target and is also not intended to be limiting. For example the term content instance could refer to a database record having values stored in a number of different database fields, or a set of related database records, or could alternatively refer to a single value stored within a single field.

The term "ontology" represents knowledge as a set of concepts within a domain, using a shared vocabulary to denote the types, properties and interrelationships of those concepts. Ontologies typically include a number of components such as individuals, classes, objects, attributes or the like and the term "ontology terms" is generally used to refer to these components and optionally specific ones of these concepts. The term "putative ontology" refers to an ontology that is generated, typically on the basis of a data structure, such as a database or XML schema, or the like, as in the case of a standard putative ontology, but also on the basis of data or content contained in the data structure. In contrast, the term "formalized ontology" is one created based on analysis of a domain by an ontologist, such as the Galen ontology, or the like.

The term "meaning" is intended to refer to the semantic interpretation of a particular ontology term, content field name, or the like. The term meaning therefore encompasses the intended meaning of the ontology term or content field, for example to account for issues such as homonyms, synonyms, meronyms, or the like, as will be described in more detail below.

In the example of FIG. 1, the method of generating the putative ontology includes, at step 100 determining at least one concept table in the data structure. This can be achieved in any appropriate manner, and could involve having the electronic processing device examine tables within a database schema or other similar data structure, and identify whether the tables are tables that contain concepts corresponding to ontology classes. This can be achieved by examining the structure of the table and/or related tables, the names of attributes or the like as will be described in more detail below.

At step 110, at least one validated attribute within the at least one concept table is determined. This can be achieved in any suitable manner, and could include examining the data structure, for example by examining primary keys, or the like. Additionally and/or alternatively this could be achieved in accordance with user input commands, for example by display a list of attributes to a user allowing the user to validate those attributes which could be used as a basis for ontology classes within the putative ontology.

At step 120, at least one selected attribute value is determined from the at least one validated attribute, which can again be performed automatically for example by selecting attribute values meeting certain criteria, or manually in accordance with user input commands.

Finally, at step 130 at least one ontology class is generated using the at least one attribute value, for example by using the attribute value as a class name. The ontology class will then typically be stored as part of the putative ontology in an ontology database or the like, as will be appreciated by persons skilled in the art.

Accordingly, the above described technique provides a mechanism to allow for the generation of putative ontologies based on data structures, such as database schemas and determined instances of data in the schema. The technique can use an algorithmic approach with optional rule-based enhancement that takes in the data and their semantics/constraints in the data source for constructing ontology.

In particular, this allows an ontology to be generated from a database structure in which classes are defined as instances of attributes within tables, for example when data is stored in a denormalised form. By expanding data structures of this form, it allows ontology classes stored within tables to be accurately captured as ontology classes, thereby ensuring that the resulting ontology has a structure that accurately reflects the database structure and content.

The need to generate putative ontologies is highlighted by the health domain where health information is extracted from existing health systems and the use of ontology enables knowledge representation. Although a significant number of health information systems (HIS) are available, information is not yet compliant with standardized health domain terminologies. Mapping directly from SNOMED-CT ontology for information available in HIS is complex making this problematic. However, by utilizing the above described techniques, a putative ontology can be generated from existing HIS and then mapped to the SNOMED-CT ontology with a minimal effort of user validation. Thus, generated ontologies enable the integration of multiple sources where a given formal medical ontology is used as the target ontology for clinical terminology standardization.

A number of further features will now be described.

In one example the electronic processing device utilises a rules based approach to identify ontology classes, as well as associated data and object properties. In particular, this can include using respective rules to determine an ontology class, at least one data property associated with the ontology class, at least one an ontology class instance associated with the ontology class and at least one object property associated with the ontology class.

The electronic processing device typically identifies the concept table based on one or more of a table structure, relationships between the tables, table names and names of attributes within the table. Thus, for example, if a table contains an attribute "class", then it is possible that the attribute values would typically correspond to respective ontology classes.

To achieve this the electronic processing device typically identifies a concept table at least in part by selecting a table, identifying a related table, examining a type of the related table and the relationships to the related table and selectively determining the selected table to be a concept table depending on the results of the examination. Thus, the electronic processing device examines tables and identifies concept tables that are a type table or a bill of materials table having a bill of materials structure, or that are related to a bill of materials table having a bill of materials structure or to a type table.

In this regard, a BOM (Bill Of Materials) table has many-to-many relationships and is used to list of all parts constituting an item, object or article, whilst the Type structure has a many-to-one relationship and has only one relevant attribute or column which is used to limit the range of values in the related table.

The concept table is typically related to a bill of materials table containing at least two foreign keys that refer to a primary key in the concept table, in which case the electronic processing device identifies an attribute of the bill of materials table that defines an object property relating the two classes identified by the foreign keys, in accordance with user input commands. The BOM table will contain or infer an attribute which names the Object Property connecting the two classes defined by the foreign keys.

The electronic processing device determines the at least one validated attribute in accordance with at least one of user input commands and a primary key of the at least one table.

The electronic processing device typically defines a class name of the at least one ontology class using the at least one attribute value, which can in turn be used to determine a meaning for the ontology term as will be described in more detail below. The electronic processing device can determine each attribute value of the validated attribute to be a selected attribute value but more typically selects some of the attribute values in accordance with user input commands so that ontology classes are only created for some of the attribute values. To achieve this, the electronic processing device can display a list of attribute values of the at least one validated attribute and determine at least one selected attribute value in accordance with user input commands.

The electronic processing device can further determine at least one record including an attribute value corresponding to an ontology class and use the at least one record to determine at least one ontology class instance.

For any ontology term corresponding to an attribute, the electronic processing device typically determines keys, such as primary and foreign keys associated with the at least one table and generates object properties based on the keys. For a BOM structure the Object property will typically be explicitly named in the BOM table. Otherwise it may be inferred by the BOM table name or by user inspection. For a type table the Object property is generally subsumption, that is all the classes are subclasses of a class determined by a BOM or by the data schema.

The electronic processing device can also determine data properties of an ontology class in accordance with attributes related to the validated attribute. In one example, when the concept table is related to a type table and a bill of materials table and the electronic processing device determines the data properties using the type table and bill of materials. In particular, the electronic processing device uses the bill of materials table and type table to establish a concept that is a class related to a concept that is a data property.

In addition to performing the above described process, the electronic processing device can also further create ontology terms corresponding other tables in the data structure.

Accordingly, the above described techniques allow for the creation of one or more putative ontologies, using a largely automated rules based approach in which a database schema or other similar data structure is analysed to identify attributes having respective attribute values that correspond to ontology classes. This allows classes embodied within data stored in database tables or the like, to be identified and used to create corresponding classes in the putative ontology, which has not been achieved using other techniques. Once created, the putative ontologies can then be used as required, for example by mapping the putative ontology to a formalised ontology, thereby allowing the content of the database to be more easily transferred to different data structures.

In one example, in order to allow the above described process to be performed, a number of different tools can be used to assist in generating mappings and managing the ontologies. In one example the tools are provided as part of a software suite forming an integrated package of ontology and data management tools. In one example, the tools include an indexer module that generates an index indicative of ontology terms in an ontology, a browser module that enables browsing of ontology terms in an ontology and generates code embodying at least part of the ontology thereby allowing a user to interact with data stored in a data structure in accordance with the ontology, an aligner module that determines alignment between ontology terms different ontologies, a pruner module that determines a group of ontology terms within at least one ontology at least in part using relationships between the ontology terms and a semantic matcher module that identifies ontology term meanings. However, the use of respective modules is not essential and other arrangements can be used.

Figure 2:
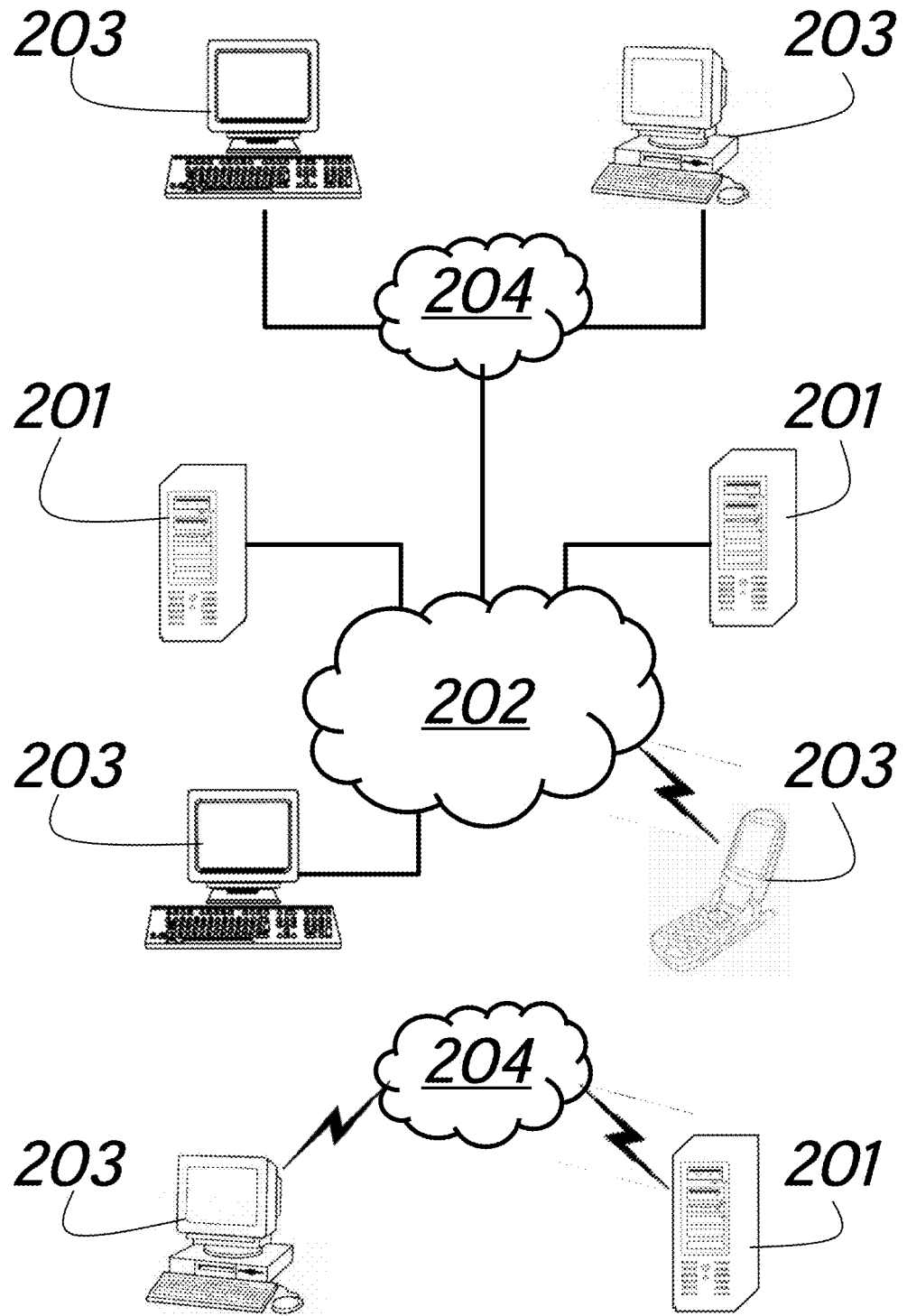
FIG. 2 is a schematic diagram of an example of a distributed computer architecture.

In one example, the processes can be performed at least in part using a processing system, such as a suitably programmed computer system. This can be performed on a standalone computer, with the microprocessor executing applications software allowing the above described method to be performed. Alternatively, the process can be performed by one or more processing systems operating as part of a distributed architecture, an example of which will now be described with reference to FIG. 2.

In this example, two base stations 201 are coupled via a communications network, such as the Internet 202, and/or a number of local area networks (LANs) 204, to a number of computer systems 203. It will be appreciated that the configuration of the networks 202, 204 are for the purpose of example only, and in practice the base station 201, computer systems 203 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, each base station 201 includes a processing system 210 coupled to a database 211. The base station 201 is adapted to be used in managing ontologies, for example to perform browsing and optionally, pruning or alignment, as well as generating mappings for example for use in transferring content between source and target data stores. The computer systems 203 can be adapted to communicate with the base stations 201 to allow processes such as the generation of mappings to be controlled, although this is not essential, and the process can be controlled directly via the base stations 201.

Whilst each base station 201 is a shown as a single entity, it will be appreciated that the base station 201 can be distributed over a number of geographically separate locations, for example by using processing systems 210 and/or databases 211 that are provided as part of a cloud based environment. In this regard, multiple base stations 201 can be provided each of which is associated with a respective data stores or ontology, although alternatively data stores could be associated with the computer systems 203.

However, the above described arrangement is not essential and other suitable configurations could be used. For example, the processes could be performed on a standalone computer system.

Figure 3:
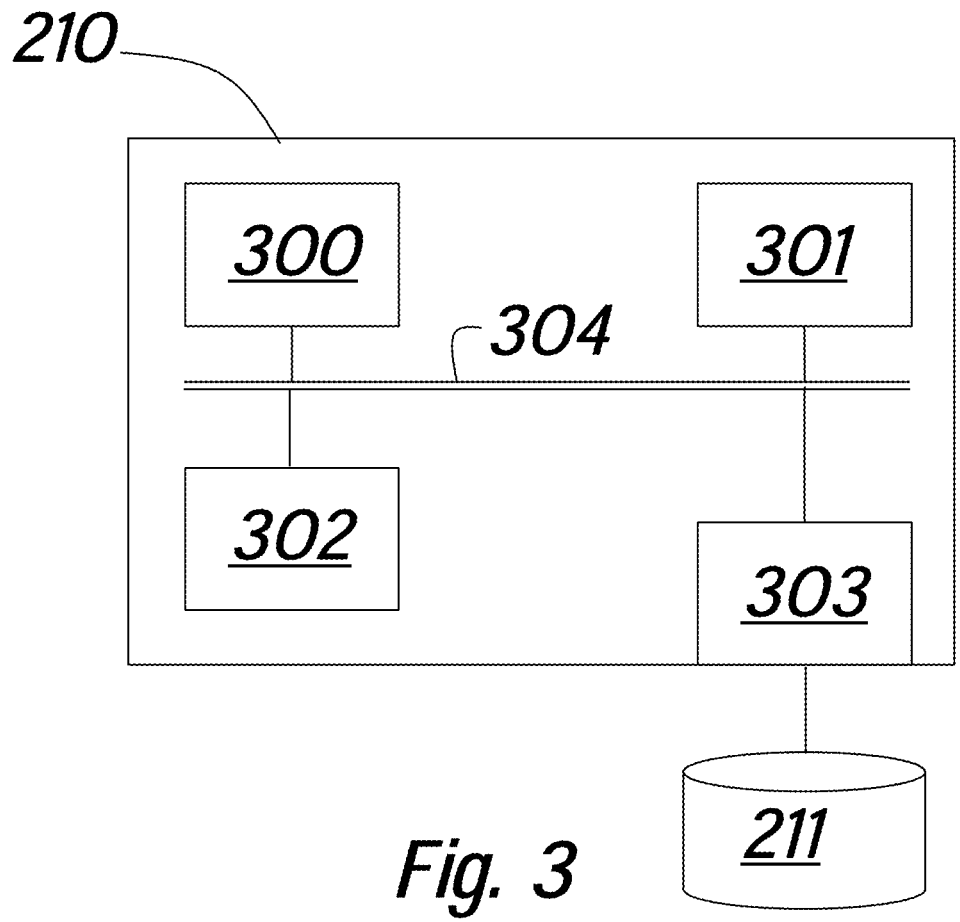
FIG. 3 is a schematic diagram of an example of a base station processing system.

An example of a suitable processing system 210 is shown in FIG. 3. In this example, the processing system 210 includes at least one microprocessor 300, a memory 301, an input/output device 302, such as a keyboard and/or display, and an external interface 303, interconnected via a bus 304 as shown. In this example the external interface 303 can be utilised for connecting the processing system 210 to peripheral devices, such as the communications networks 202, 204, databases 211, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow for browsing, and optionally index generation, mapping and content transfer to/from the database 211 to be performed, as well as to communicate with the computer systems 203. The applications software may include one or more software modules, and may be executed in a suitable execution environment, such as an operating system environment, or the like.

Accordingly, it will be appreciated that the processing system 210 may be formed from any suitable processing system, such as a suitably programmed computer system, PC, database server executing DBMS, web server, network server, or the like. In one particular example, the processing system 210 is a standard processing system such as a 32-bit or 64-bit Intel Architecture based processing system, which executes software applications stored on non-volatile (e.g. hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
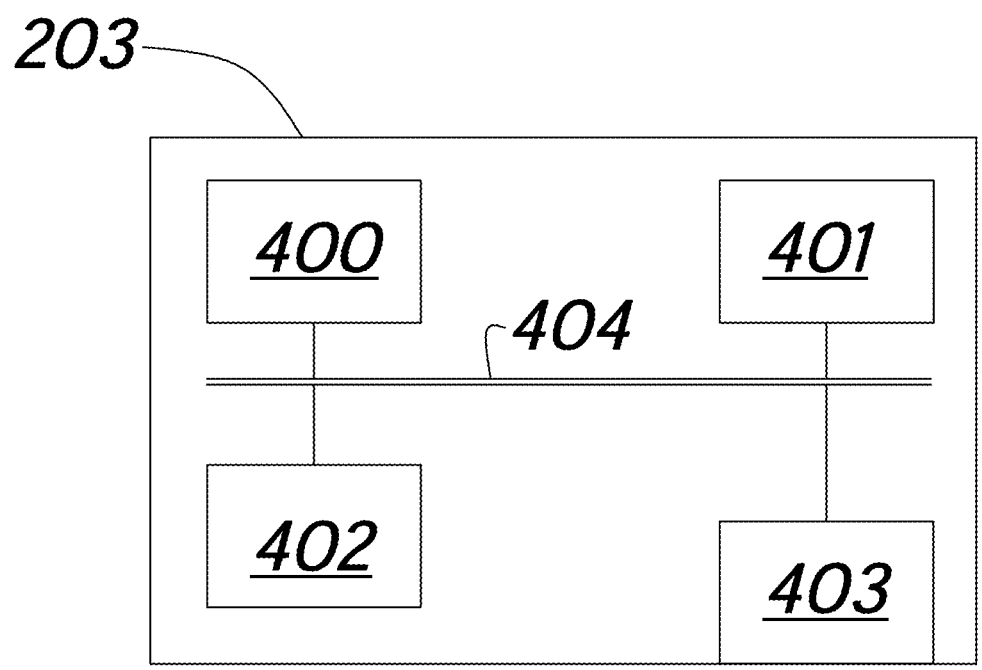
FIG. 4 is a schematic diagram of an example of an computer system.

As shown in FIG. 4, in one example, the computer system 203 includes at least one microprocessor 400, a memory 401, an input/output device 402, such as a keyboard and/or display, and an external interface 403, interconnected via a bus 404 as shown. In this example, the external interface 403 can be utilised for connecting the computer system 203 to peripheral devices, such as the communications networks 202, 204, databases 211, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401 to allow communication with the base station 201, for example to allow an operator to provide control inputs.

Accordingly, it will be appreciated that the computer systems 203 may be formed from any suitable processing system, such as a suitably programmed PC, Internet terminal, lap-top, hand-held PC, smart phone, PDA, web server, or the like. Thus, in one example, the processing system 100 is a standard processing system such as a 32-bit or 64-bit Intel Architecture based processing system, which executes software applications stored on non-volatile (e.g. hard disk) storage, although this is not essential. However, it will also be understood that the computer systems 203 can be any electronic processing device such as a microprocessor, microchip processor, logic gate configuration, firmware optionally associated with implementing logic such as an FPGA (Field Programmable Gate Array), or any other electronic device, system or arrangement.

Examples of the operation of the system to generate mappings, allow browsing, indexing of and interaction with ontologies, including aligning and pruning ontologies will now be described in further detail.

For the purpose of these examples, it is assumed that the processing system 210 of the base station 201 hosts applications software for performing the processes, with actions performed by the processing system 210 being performed by the processor 300 in accordance with instructions stored as applications software in the memory 301 and/or input commands received from a user via the I/O device 302, or commands received from the computer system 203. In this regard, for the purpose of the following examples, the processing system 210 executes applications software having a number of modules including an indexer module, a browser module, an aligner module, a pruner module, a semantic matcher module and an ETL module. However, the use of respective modules is not essential and other arrangements can be used.

It will also be assumed that the user interacts with applications software executed by the processing system 210 via a GUI, or the like, presented either on the input/output device 302 or the computer system 203. Actions performed by the computer system 203 are performed by the processor 400 in accordance with instructions stored as applications software in the memory 401 and/or input commands received from a user via the I/O device 402. The base station 201 is typically a server which communicates with the computer system 203 via the particular network infrastructure available, and may for example be in the form of an enterprise server that interacts with a database 211 for users of one or more computer systems 203.

However, it will be appreciated that the above described configurations are for the purpose of example only and are not intended to be limiting, so in practice any database management system can be used. It will also be appreciated that the partitioning of functionality between the computer system 203, and the base station 201 may vary, depending on the particular implementation.

Figure 5A:
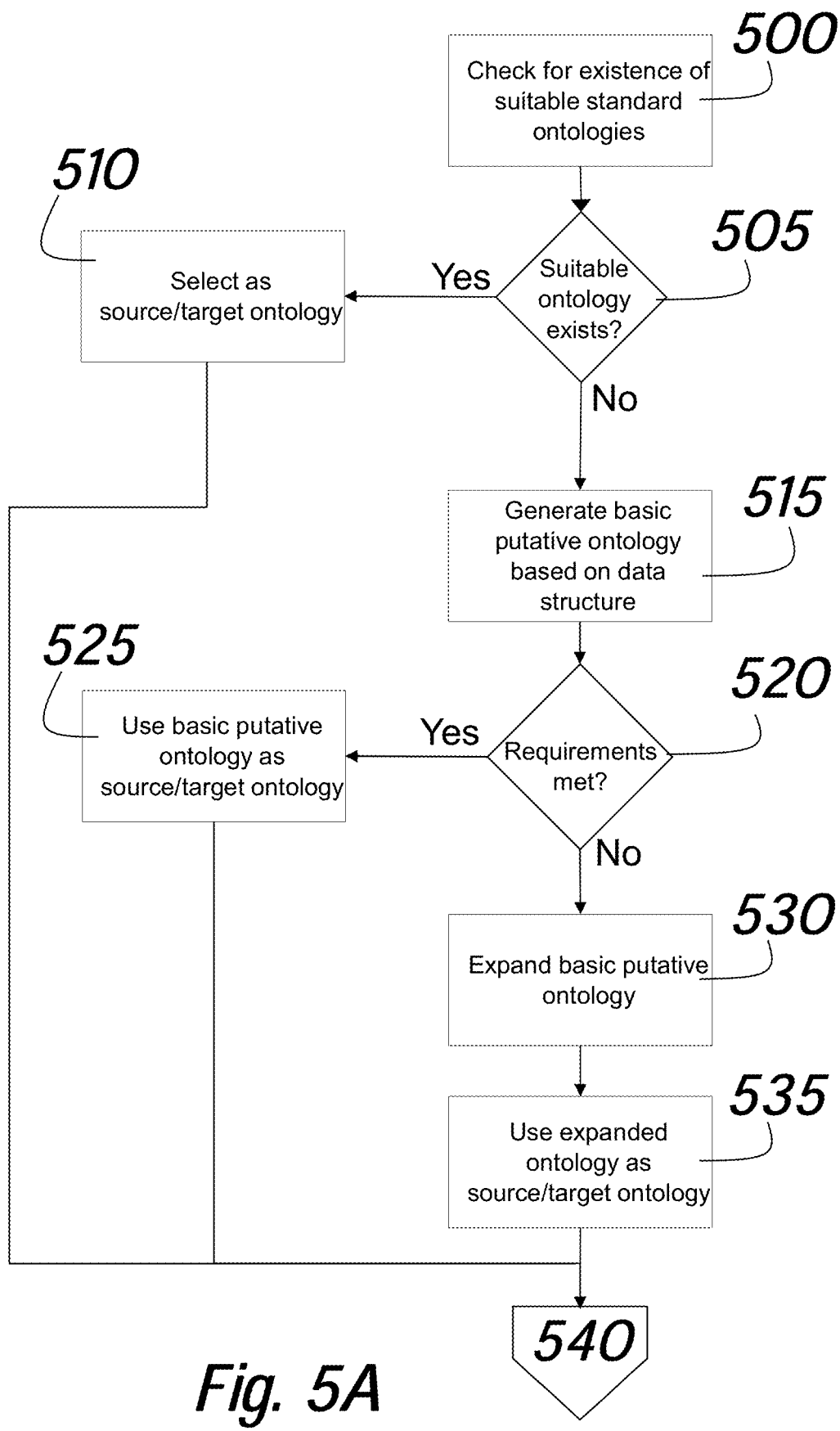
FIGS. 5A and 5B are a flow chart of an example of a method for use in generating a mapping for transferring content between source and target data structures.
Figure 5B:
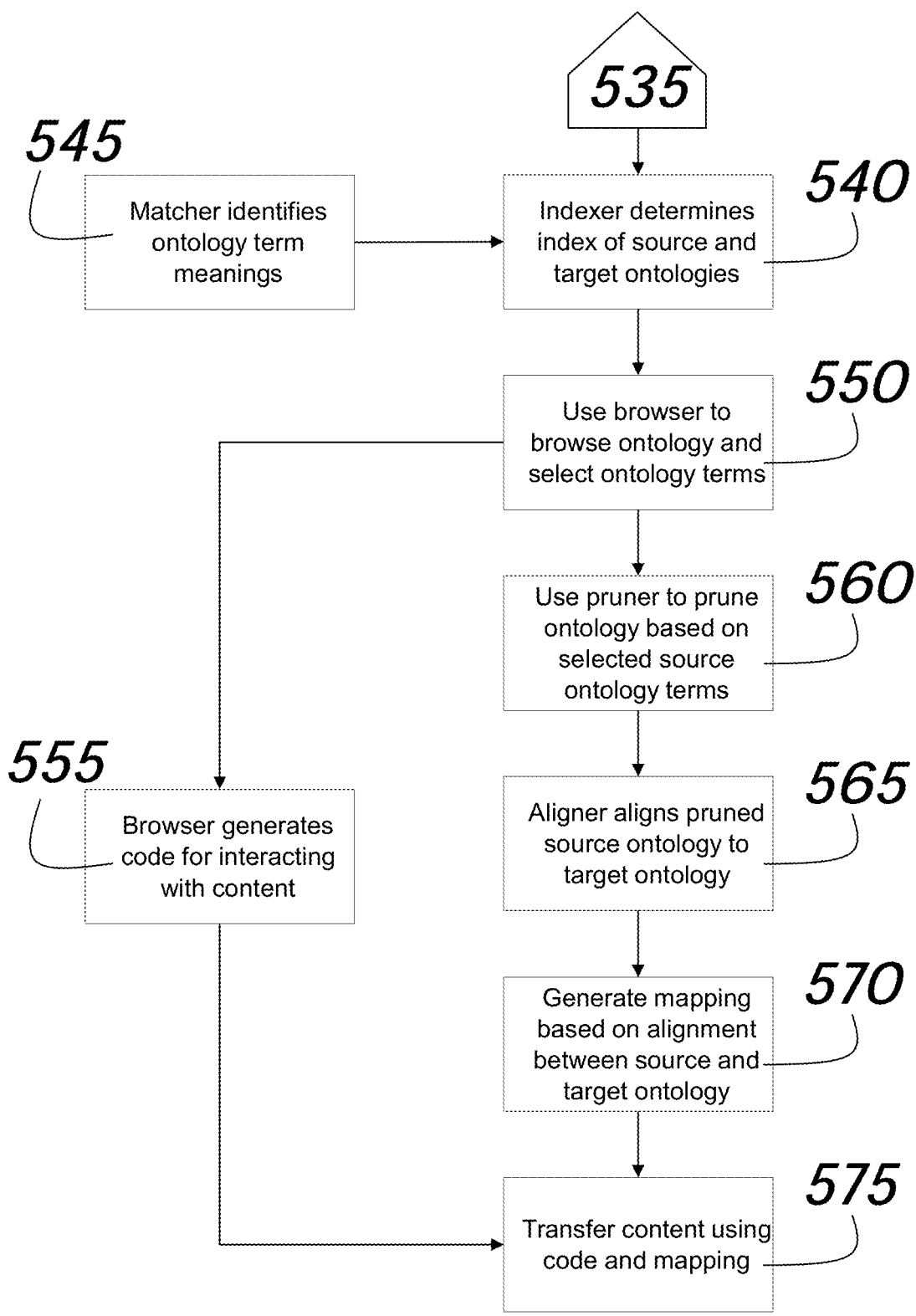

An overview of the process for determining a mapping and using this to transfer content from a source to a target will now be described with reference to FIGS. 5A and 5B. For the purpose of this example it will be assumed that the processing system 210 implements a number of different modules for providing different functionalities.

In this example, the processing system 210 initially identifies source and target ontologies using the source and target data structures. The identification of the source and target ontologies is performed by checking the existence of a standard ontology that can be associated with the source or target at step 500. If it is determined that a suitable standard ontology exists at step 505 then this is selected as the source/target ontology at step 510, and the process proceeds to step 540.

Otherwise, at step 515, the processing system 210 creates a "standard" putative ontology in which every table typically maps to a class and every relationship maps to an object property. At step 520, the processing system 210 examines the putative ontology to confirm that the level of description is adequate for the end to end mapping requirements. If it is adequate then at step 525, the basic putative ontology is used as the source/target ontology. Otherwise the putative ontology is expanded using data values from the source or target at step 530, with the expanded ontology being used as the source/target ontology at step 535. A specific example of the process of generating expanded putative ontologies will be described in more detail with reference to FIGS. 6A to 6E.

At step 540, the indexer module determines an index of source and target ontologies. The index is typically in the form of a list including an entry indicative of each ontology term, an associated ontology term type if this is known, and also optionally an ontology term meaning. In this regard, the ontology term meanings are typically determined by the semantic matcher module at step 545 that compares the ontology term to a concept matching database, and uses the results of the comparison to identify a meaning for each ontology term in the index.

At step 550, the browser module is used to browse an ontology and select source or target ontology terms. This allows a user to select those ontology terms that are of interest, typically corresponding to content to be extracted from the source data store or imported into the target data store.

The selected ontology terms can then be used at step 555 to allow the browser module to generate code for interacting with content stored in a data store in accordance with the respective data structure. In particular, this can include code for allowing a computer system to generate a user interface which the user can use to review data fields of the data structure, select content to be extracted/imported and then generate the necessary queries to perform the extraction/importation, as will be described in more detail below.

Alternatively, at step 560, the selected ontology terms are used by the pruner module to prune either the source and/or target ontology. In particular, this allows the user to select only those parts of the ontology that are of interest, with the processing system 210 then selecting additional ontology terms required to maintain relationships between the selected ontology terms as will be described in more detail below.

Once one or more of the ontologies have been pruned, at step 565, the processing system 210 uses the aligner module to align the source and target ontologies. This identifies a correspondence between one or more of the source ontology terms and one or more of the target ontology terms, thereby allowing a mapping between the source and target data structures to be determined at step 570, which in turn can be used together with code generated by the browser module to transfer content from the source data store to the target data store at step 575.

Figure 6A:
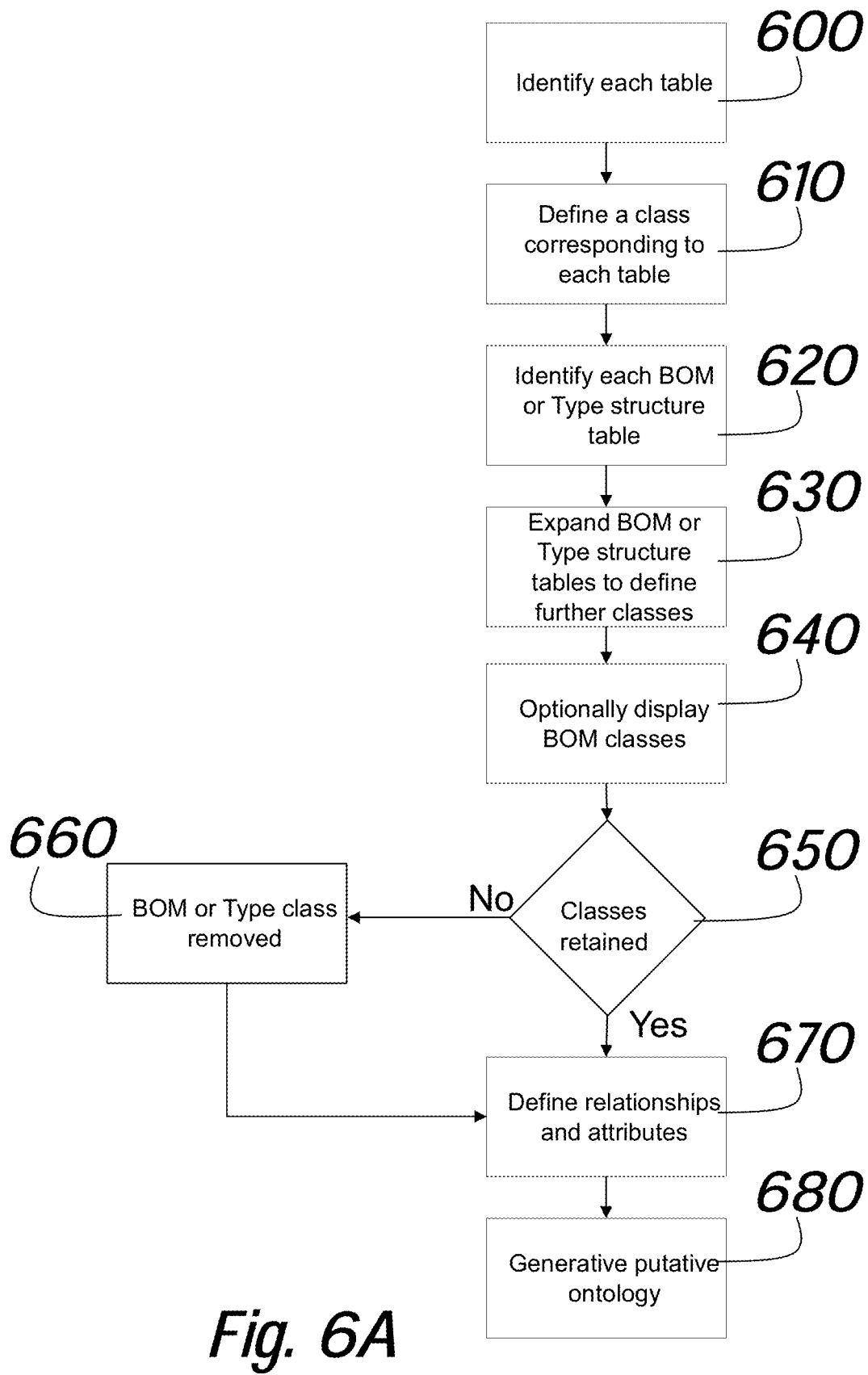
FIG. 6A is a flow chart of an example of a method of generating a putative ontology.

An example of the process for generating a putative ontology from a data structure, such as a database schema or the like, will now be described with reference to FIG. 6A.

Whilst this example is specific to generating a putative ontology for a relational database, it will be appreciated that similar concepts can be applied to other data structures, and that this example is for the purpose of illustration only and is not intended to be limiting.

In this example, at step 600, the processing system 210 determines each table in the database, typically by extracting this information from metadata defining the database schema. At step 610, the processing system 210 defines a class corresponding to each table in the database. In this regard, the term class refers to a specific ontology term corresponding to a concept within the ontology, as will be described in more detail below.

At step 620, the processing system 210 identifies any database tables having a BOM structure or a Type structure. In this regard, a BOM table has two "one to many" relationships and is used to list of all parts constituting an item, object or article. The Type structure has one "many to one" relationship and has only one relevant attribute or column which is used to limit the range of values in the related table. Such tables are often used to denormalise data and can therefore contain many concepts or classes that should each represent a respective ontology term. Effectively these tables contain metadata rather than data and, as such form a natural part of the metadata schema used in creating the putative ontology. Accordingly, at step 630, the processing system expands each Type table and each BOM table to define further classes corresponding to each unique entry in the table.

At step 640, the processing system 210 optionally displays each identified class from within the Type or BOM table, allowing a user to confirm whether the class should be retained at step 650. If it is indicated that the Type or BOM class should not be retained, it is removed at step 660.

Once the relevant BOM or Type classes have been selected, the processing system 210 defines relationships and attributes (also referred to as data objects and data properties) based on the database schema or on Object Properties specified in the BOM table. Thus, the table structure can be used to identify relationships between the identified classes, whilst data fields in the tables are used to identify attributes of the classes. The relationships and attributes are in turn used to define object properties and data properties in the ontology, thereby allowing the putative ontology to be generated and saved, for example in an ontology database at step 680.

Thus, this allows a putative ontology to be created in a substantially automated fashion solely from an analysis of the data structure of a data store, such as a database, structured file, or the like. Following this, in the event that it is required to define meanings for the different classes within the putative ontology, the putative ontology can be aligned with a formalised ontology, as will be described in more detail below.

A second example process for generating a putative ontology will now be described with reference to FIG. 6B.

Previous techniques of creating ontologies often rely on mapping tables to ontology classes. However, this encounters problems when a relational table, namely concept, has a column, named class, and contains a list of data corresponding to classes, such as Procedure, Symptom and Finding in a medical scenario. By applying the existing approaches, concept or class is transformed to a concept in the constructed ontology and its data can be transformed as individuals of the concept. This is effective if the constructed ontology is used for the purpose of accessing the database. However, this process may not be suitable for semantic interoperability where clinical terminologies are the focus.

For the purpose of the following several terms that will be defined.

Definition 1—A relational database schema S is defined as S={ $\mathcal{R}$, $\mathcal{W}$ } where $\mathcal{R}$ and $\mathcal{W}$ are progressively derived as follows, let:

$\mathcal{R}$ be names of a set of relations denoted by $\mathcal{R}=\{r_1, r_2, \ldots, r_i\}$ where $i \geq 1$ $\mathcal{A}$ be the names of a set of attributes where A is denoted as $\mathcal{A}=\{a_1, a_2, \ldots, a_j\}$ and $j \geq 1$ $\mathcal{Q}$ be a set of constraints including primary key $\mathcal{K}_p$, foreign key $\mathcal{K}_f$, and other constraints on attributes $\mathcal{D}$ be a set of domains denoted by $\mathcal{D}=\{d_1, d_2, \ldots, d_y\}$ (also known as data type) of attributes where $y \geq 1$ $\infty$ be a mapping function $d \in \mathcal{D} \rightarrow aj \in \mathcal{A}$ $\mathcal{W}$ be a set of entity relationships among $\mathcal{R}$ where
$\mathcal{W} = \{w_1, w_2, \ldots, w_3\}$ where $w_1 = 0 \ldots n$, $w_2 = 1 \ldots n$, $w_3 = n \ldots m$ and $n \geq 1$, and $m > n$ For each relation r in $\mathcal{R}$, we define r($\mathcal{A}, \mathcal{D}, \mathcal{Q}$)

Definition 2—An ontology is a set of tuples O(C, Ω, $\mathcal{P}, \mathcal{I}$) where:
- O is the name of the ontology.
- C is a finite set of names of concepts, which can also be referred to as classes. A concept can be defined with a group of individuals $\mathcal{I}$.
- Ω is a set of relationships among C. A relationship among the classes comprises of two parts including domain and range. While domain is a concept, range can be a concept or data range.
- $\mathcal{P}$ is a set of properties. This refers to object or data property.

Definition 3—A source-based ontology is an ontology generated from an existing data source. It is an ontology that has concepts and behaviours as described in Definition 1.

Definition 4—A target ontology is a given ontology (pre-built ontology) that serves a specific purpose such as integration. It is an ontology that has concepts and behaviours as described in Definition 1.

An example of the design of the framework for constructing ontology from existing data sources is shown in FIG. 6B.

This framework does not include a description of the database connection as it assumes the connection is pre-configured.

Based on the data source structure, information about the metadata (database schema) is initially loaded as shown at 691. The users have an option to confirm (validate) the pre-selected information or de-select any unwanted information at 692. Upon the completion of user-reselection and validation, the process will generate the mapping based on the new information and reload the new information into memory at 693. Transformed and required data is retrieved based on user validation at 694, with retrieved data as well as a list of user validations combining to generate a source-based ontology as the final result at 695. The ontology can then be mapped to a formalised ontology at 696 or used in other processes as required. This enables easier integration, alignments, mapping and matching from sources ontology to target ontology.

With the user validation or confirmation, semantic data are also produced alongside the source-based ontology, which are stored in a triple store that can be manipulated based on the ontology.

Principles used in implementation of the framework will now be described, firstly with reference to loading relational database schema and how the information is processed and stored, followed by the principles used to construct ontology and algorithms.

As described at 691, the metadata (schema) is initially extracted and loaded and awaits user validation.

Let $\mathcal{L}$m be a metadata pre-processing list that stores user-validated information. The structure of the information is based on S (refer to Definition 1).

When user validation is carried out, it may create changes in the selection of information; e.g. fewer attributes are selected. The new details of the schema processed progressively, are used to built-up $\mathcal{L}$m, based on the user validation, which consists of validated relations $\mathcal{R}$ and $\mathcal{W}$. Each validated r∈$\mathcal{R}$ (refer to Definition 1 for r), is processed by user validation. For example, the user validates the relation concept_class which has five attributes; however, he/she validates only two attributes, ID and name. r is created with this validated information as well as those that have been predefined by the schema S, r is now loaded in $\mathcal{L}$m.

Generation of the ontology uses the following assumptions:
- The validated attributes are determined by the primary key.
- The values of validated attributes are not duplicated.
- The terms 'concept' and 'class' are used interchangeably throughout this work because they have the same meaning, namely, the ontology concept.

The rules and the relevant principles that lead to the derivation of algorithms for generating the ontology will now be described.

Concept Rule—Concepts are organized based on the set of values of attributes retrieved from a set of relational tables whose validated names and attributes are stored in list $\mathcal{L}$m.

The function ε is used to generate the set of concepts C based on attribute data extracted from the database S $\mathcal{D}$ using the user validation information from list $\mathcal{L}$m which contains a set of attributes $\mathcal{A}$ in relations r.

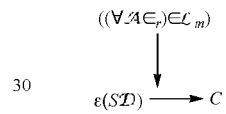

The function ε is used to generate the set of concepts C based on attribute data extracted from the database S $\mathcal{D}$ using the user validation information from list $\mathcal{L}$m which contains a set of attributes $\mathcal{A}$ in relations r.

By way of example, using the OpenMRS health management system, there exists a relation table Concept_Class which consists of a set of attributes/columns. Assuming that a user validates this relation Concept_Class and attribute Name, in which the attribute has values such as Symptom, Procedure, Findings namely a few. Based on the Concept Rule defined above, each one of these values is now transformed to concepts whose names correspond to the value names.

DataTypeProperty Rule—The validated attribute used to create a concept can also be transformed to data property. The name of domain is the attribute value that is used to create the concept and the range is the String data type. This is designed so as to provide the flexibility to accommodate the various lengths of concept instances. A DataTypeProperty function ω depicts its functionality as below:

$$\omega(c \in C) \rightarrow (\text{Domain}:c, \text{Range}:\text{String})$$

Concept Instance Rule—Each tuple that contains the value of a validated attribute as one of the fields, from which the concept has been created, is now transformed to the instance of the concept.

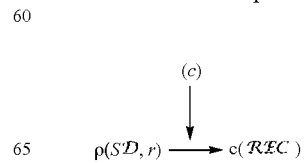

Function P extracts a record $\mathcal{REC}$ from a relation r in data source $S^{\mathcal{D}}$ based on an input c∈C where C is a list of concepts and c is the current created concept that requires an instance created. ρ checks if one of the record fields in $\mathcal{REC}$ has a value of c, if this is true it sets $\mathcal{REC}$ as an instance of c.

For the relation Concept_Class above, the retrieved record from Concept_Class that has the value Symptom in one of its fields is transformed to the instance of the concept Symptom.

Based on the rules above, algorithms can be created as shown below. The algorithms are designed at a high level; therefore, syntactically they do not bind to any particular ontology language. What is presented here is a simple natural language suggestion. However, to meet reader expectation, we produce the output in ontology web languages such as owl: Class, owl: ObjectProperty, Owl: DataTypeProperty.

The algorithm createOntology shown in FIG. 6C derives the list of concepts C and their data type properties. The algorithm progressively processes items in list $\mathcal{L}$m (Lines 1-15). For each processing item, it extracts a set of validated attributes $\mathcal{A}$ and the relation r that $\mathcal{A}$ belongs to (Line 7). For each validated attribute a in list $\mathcal{A}$ in relation r in data source $S^{\mathcal{D}}$, it retrieves the attribute values $\mathcal{V}$ (Line 9). For each value v of $\mathcal{V}$, it creates a concept named v then follows this with the derivation of the data type property of the concept (Lines 10-16). Based on the Data Type Property rule, the domain of the data type property is established using the name of the concept and the range using the atomic data type String (Lines 12-13).

To create an instance of the concept c, based on the Concept Instance rule as proposed earlier, the algorithm passes mandatory information such as the current concept c, relation r in which c belongs to and the data source $S^{\mathcal{D}}$ to function conceptInstance, shown in FIG. 6D, (Line 14) for further processing. Once the instance returns to the algorithm by function conceptInstance, the algorithm then checks and sets the instance for c (Line 15). Each time a concept c and its behaviour is created and derived, concept c and r are stored in tempConcept list (Line 16) and the content of o is updated with c details (Line 17). Once all the concepts have been generated, list $\mathcal{L}$m is no longer needed, so the system will eliminate it to release the space. The algorithm then calls the objectProperty function to create an object property for each pair concepts.

The function conceptInstance accepts the mandatory inputs c, $S^{\mathcal{D}}$, r (Lines 1:1-1:4), defines a parameter $\mathcal{REC}$ (Line 1:5) and expects an output ρ. The function first retrieves a data record $\mathcal{REC}$ from a relational table r in data source $S^{\mathcal{D}}$ then it checks whether c exists in $\mathcal{REC}$ as one of the field values (Lines 1:7-1:10). Once it confirms that $\mathcal{REC}$ includes c, it returns the record REC to the ontologyCreate algorithm for further processing (Line 1:11).

ObjectProperty Rule—An object property is an object relationship which is organized in a domain and range for a pair of concepts $c_i$ and $c_j$ where i, j≥1 and i≠j. The ObjectProperty function first determines the relationship between two concepts $c_i$ and $c_j$ via a set of primary and foreign keys in the relations r to which $c_i$ and $c_j$ belong. The function then derives the domain and range for the pair of concepts. In order to enrich the functionalities of this process, we describe it in algorithmic form.

Function ObjectProperty shown in FIG. 6E is called at the end of the algorithm createOntology. It takes in inputs of the tempConcept list. Each item in the tempConcept list consists of two value concepts c and relation r that c belong to. Along those input it also defines parameters of primary and foreign keys (Lines 1-4). The function finally returns Ontology O as the output (Line 5).

Function ObjectProperty is called at the end of the algorithm createOntology as shown below. It takes in inputs from the tempConcept list. Each item in the tempConcept list consists of two values:
concept c; and
relation r to which c belongs.

Along with that input, it also defines the parameters of the primary and foreign keys (Lines 1-4). The function finally returns Ontology O as the output (Line 5).

For each item, referred to as m in the tempConcept list, the algorithm first extracts the concept ci and relation rm from m. It then goes through each unchecked item, referred to as n, to extract the concept cj and rn from n to determine the relationship between the pair of concepts (Lines 6-10).

From Definition 1 each derived relation r would be equipped with at least a primary key or at most with both primary and foreign keys. To establish the domain of the concept, the algorithm checks for a foreign key in the one relation which must also be a primary key in other relation in order to determine that there exists a relationship between the two concepts because both primary and foreign keys are present. The algorithm then establishes (Lines 9-16):
1. the domain on the side of the concept, which belongs to the relation that holds the foreign key; and
2. the range on the side of the concept which belongs to the other relation that holds the primary key.

The above approach implements a number of functionalities in practice. Unlike existing techniques, this can be used to provide a semi-automated approach that does not require the user to import a data source or to manually map from the individual field in the source in order to define the concepts/classes.

In one example, users can have the option to connect to a database allowing available entities such as the names of relational tables and their columns to be loaded and displayed on a GUI. The user can then validate those entities the wishes to select, thereby allowing unwanted information to be excluded. Once the user confirms the validation, the mapping is used to transform the data to resource description framework (RDF) triples. The ontology can then be generated in the form of an Owl, Turtle, RDF file or the like.

Figure 7:
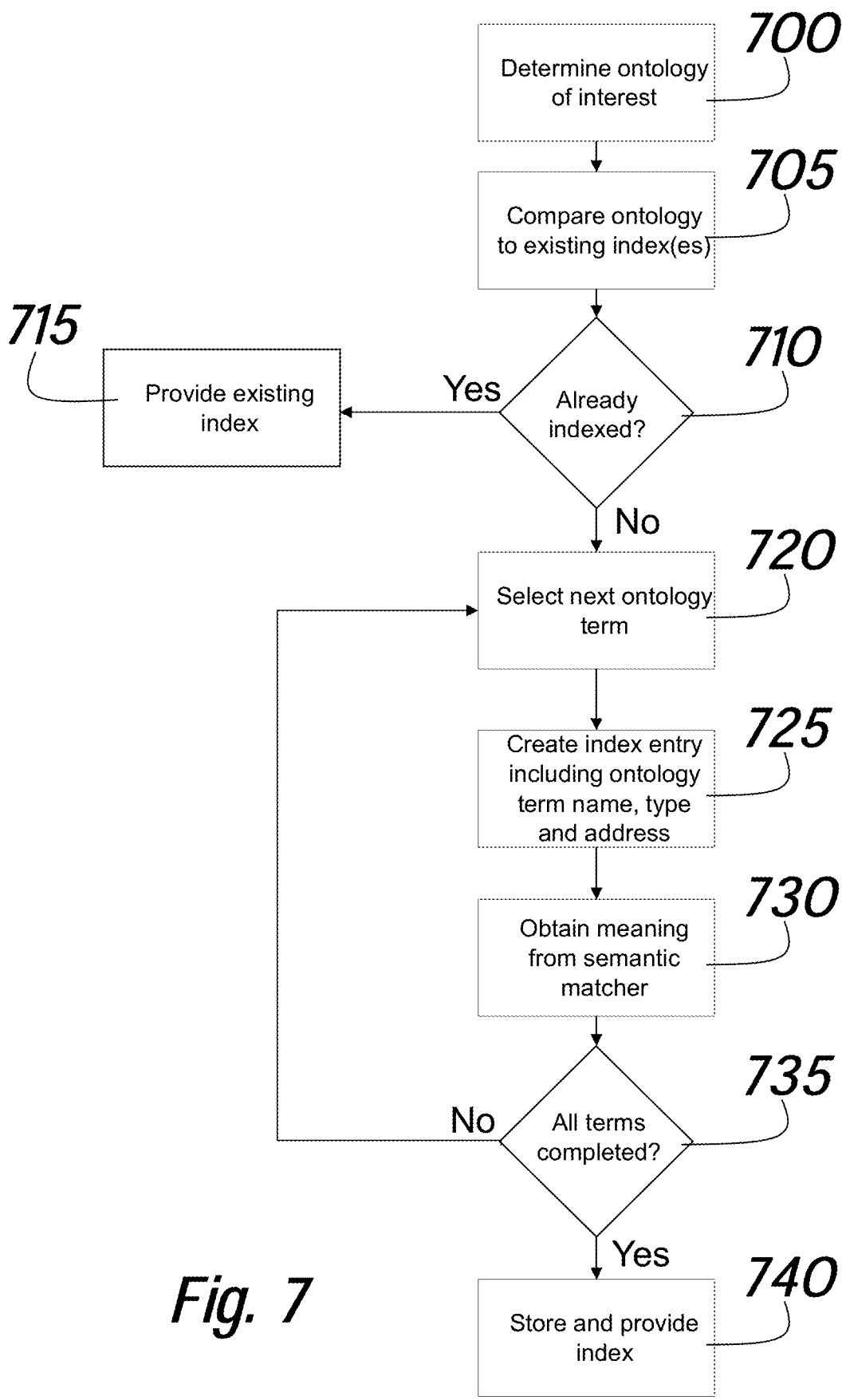
FIG. 7 is a flow chart of an example of a method of determining an index.

An example of the process for generating an index will now be described with reference to FIG. 7.

In this example, at step 700 the indexer module determines an ontology of interest. This may be determined based on user input commands, for example supplied via the browser module, or could be received from another module requiring an index. For example, an ETL module that has generated a putative ontology may require this be indexed and provide an indication of the ontology to the indexer module, or alternatively, a pruner module may request an index allowing pruning to be performed on an ontology.

At step 705, the indexer module compares the ontology to one or more existing indexes, typically stored in an index database, and determines if an index already exists. This can be achieved by comparing metadata associated with the ontology, such as an ontology name and/or address, with corresponding information associated with the indexes, or alternatively by comparing one or more ontology terms to ontology terms in existing indexes.

If it is determined that an index exists at step 710, then the index is provided at step 715, for example by providing the index to the module that requested the index. Otherwise, the index must be generated, in which case the indexer module selects a next ontology term at step 720, and then creates an index entry including an indication of the ontology term name, an ontology term type and an ontology term address, typically indicative of a URI (Uniform Resource Identifier) or similar, at step 725. At step 730, the indexer module obtains a semantic meaning for the ontology term from a semantic matcher module, as will be described in more detail below, and adds this to the index entry.

At step 735, the indexer module determines if all ontology terms have been completed and if not the process returns to step 720, allowing a next ontology term to be selected. Otherwise, at step 740, the index is stored and optionally provided to another module.

Figure 8:
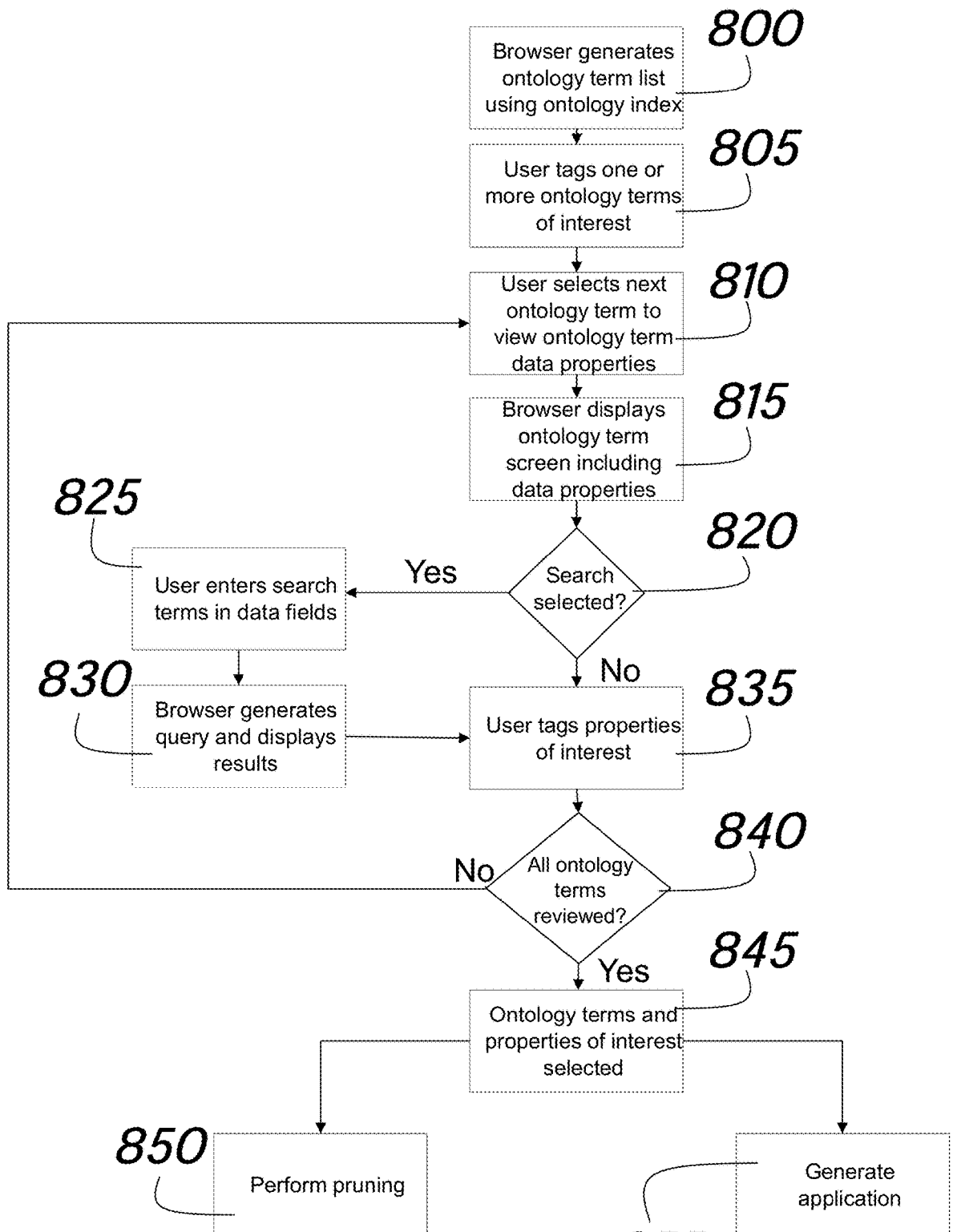
FIG. 8 is a flow chart of an example of a method of browsing an ontology.

An example of a process for browsing of an ontology will now be described with reference to FIG. 8.

In this example, at step 800, the browser module generates an ontology term list for a selected ontology, using an ontology index. Accordingly, as part of this process, the browser module can request the ontology index from the indexer module, for example based on the identity of a selected ontology. The ontology term list can then be displayed to a user via an appropriate GUI (graphical user interface).

A step 805, the user tags one or more ontology terms of interest, before selecting a next ontology term to view at step 810 allowing the browser module to display a ontology term screen including data properties for the selected ontology term at step 815. In this regard, the data properties correspond to attributes of the ontology term, which are defined as part of the ontology.

At step 820, the browser module determines if a search option has been selected by the user, in which case the user enters search terms in the data fields of the data properties at step 825. The browser module then generates and performs a query of data associated with the respective ontology term data properties, returning and displaying results to the user at step 830. Thus, this process allows the user to review the content that would be associated with respective data properties in the corresponding source or target data store, thereby allowing the user to ascertain whether the ontology term and associated data properties are of interest.

Once the search has been performed, or in the event that no search is performed, the user tags one or more data properties of interest at step 835. Thus, this process allows the user to review the ontology terms and associated data properties and then select ontology terms and data properties of interest by tagging them.

At step 840, the ontology terms are reviewed to determine if all ontology terms and data properties of interest to the user have been selected. If not, the process returns to step 810 allowing further ontology terms to be reviewed.

Otherwise, at step 845 the browser module selects the tagged ontology terms and associated data properties, allowing these to be used in other processes, such as to perform pruning at step 850 or to generate an application at step 855. In this regard, generation of an application involves uses scripts or the like to generate executable code, that when executed on a computer system allows the computer system to display a user interface for interacting with content in fields in the source or target corresponding to the selected ontology terms or data properties, as will be described in more detail below.

Thus, the above described process can be used to allow a user to browse ontology terms and associated data properties to identify which of those are of interest in respect of the content they wish to export from a source or import into a target.

Figure 9:
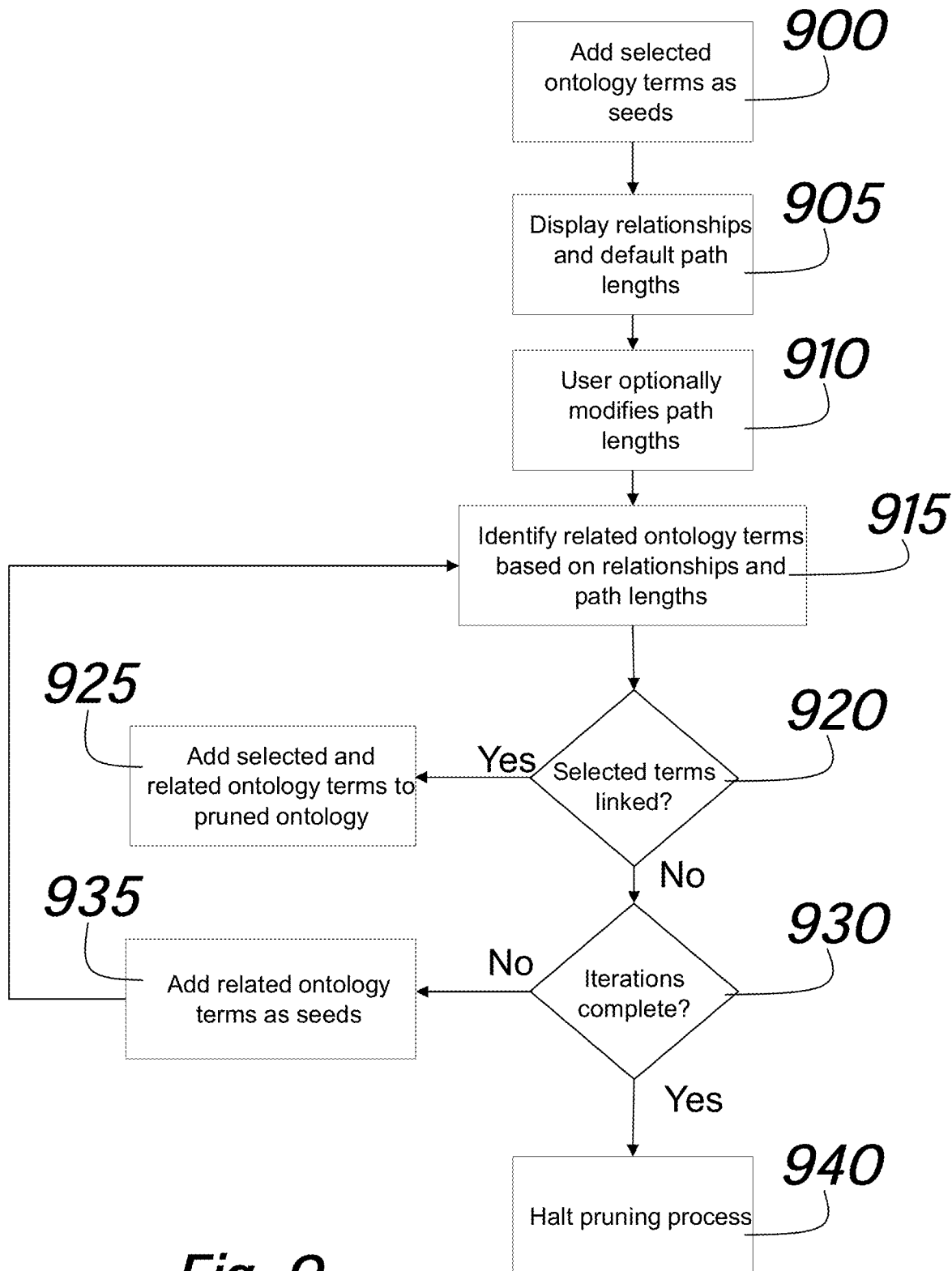
FIG. 9 is a flow chart of an example of a method for pruning an ontology.

An example of the process for pruning an ontology will now be described with reference to FIG. 9.

In this example, at step 900, the selected ontology terms are added as seeds for the pruning process. Following this, an iterative process is performed to repeatedly explore ontology terms related to the seed ontology terms until a path is identified that interconnects the seed ontology terms. To achieve this, at step 905, different types of relationships and associated default path lengths are displayed. In this regard, ontology terms can be related by different types of relationships, such as parent, child, sibling, or the like. As certain types of relationship may be more important than others, different relationship types may have different lengths. Additionally, the length of path that is explored for each type of relationship can be varied thereby ensuring that a larger number of ontology terms connected to the seed ontology terms via the more important relationships are included. Accordingly, at step 910, the user can adjust the path lengths for the different relationships, thereby allowing the pruning process to be tailored by the user, for example to control the extent and/or direction of pruning.

At step 915, ontology terms related to the selected ontology terms are determined, by identifying those ontology terms related by relationships of the specified path length. At step 920, the pruner module determines if the selected seed terms are linked. In other words there is a series of interconnected ontology terms that links the seed ontology terms, and if so, the pruning process can end with the selected and related ontology terms identified being used the define the pruned ontology at step 925, which can be stored as a pruned ontology or pruned index.

Otherwise, at step 930 it is determined if the iterations are complete, and if not the related ontology terms are added the selected ontology terms and the process returns to step 915, allowing further related ontology terms to be identified. Thus, the number of ontology terms related to the seed ontology terms is gradually increased until the seed ontology terms are connected by a path of relationships.

Thus, the above described process is repeated either until the ontology is successfully pruned, at which time the seed ontology terms are interconnected via a path of related ontology terms, or until a predetermined number of iterations are completed and no path is identified, in which case the process is halted at step 940. In this latter case, this typically suggests that the ontology terms are from different ontologies, in which case the pruning process is performed in conjunction with an alignment process, allowing the pruning process to span multiple ontologies as will be described in more detail below. Alternatively, this indicates that the ontology terms cannot be easily linked.

Figure 10:
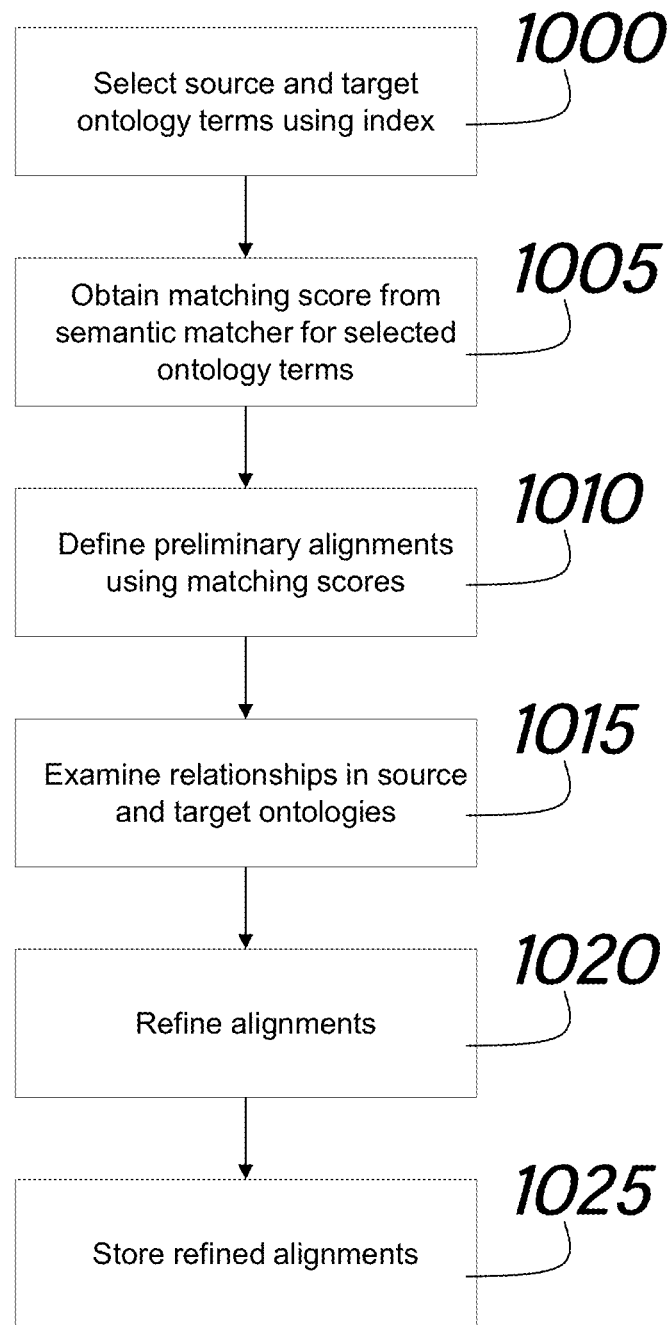
FIG. 10 is a flow chart of a second example of a method for aligning ontologies.

An example of the process for aligning source and target ontologies will now be described with reference to FIG. 10.

In this example, at step 1000 source and/or target ontology terms are selected using the index. This may involve having the user select ontology terms using the browser module, or more typically select two pruned ontologies corresponding to pruned versions of source and target ontologies that contain source and/or ontology terms of interest. At step 1005, the matcher module is used to determine a matching score for different combinations of pairs of source and target ontology terms. These scores are used to define preliminary alignments solely based on how similar the meanings of the source and target ontologies are at step 1010.

At step 1015, the aligner module examines relationships (object properties) and attributes (data properties) of the source and target ontology terms to determine whether the preliminary alignments are correct. Thus, for example, this will examine if preliminary aligned source and target ontology terms have similar number of attributes, and also if these have similar relationships with other source or target ontology terms. This can be used to identify inexact matches, for example if each of the terms first name and last name may be preliminary matched to name, with the examination of the relationships being used to demonstrate this should be a many to one relationship.

At step 1020, this can be used to refine the alignments, allowing these to be stored to represent the alignment between the source and target ontologies at step 1025. This can be in the form of a merged ontology, or alternatively an alignment index.

Figure 11:
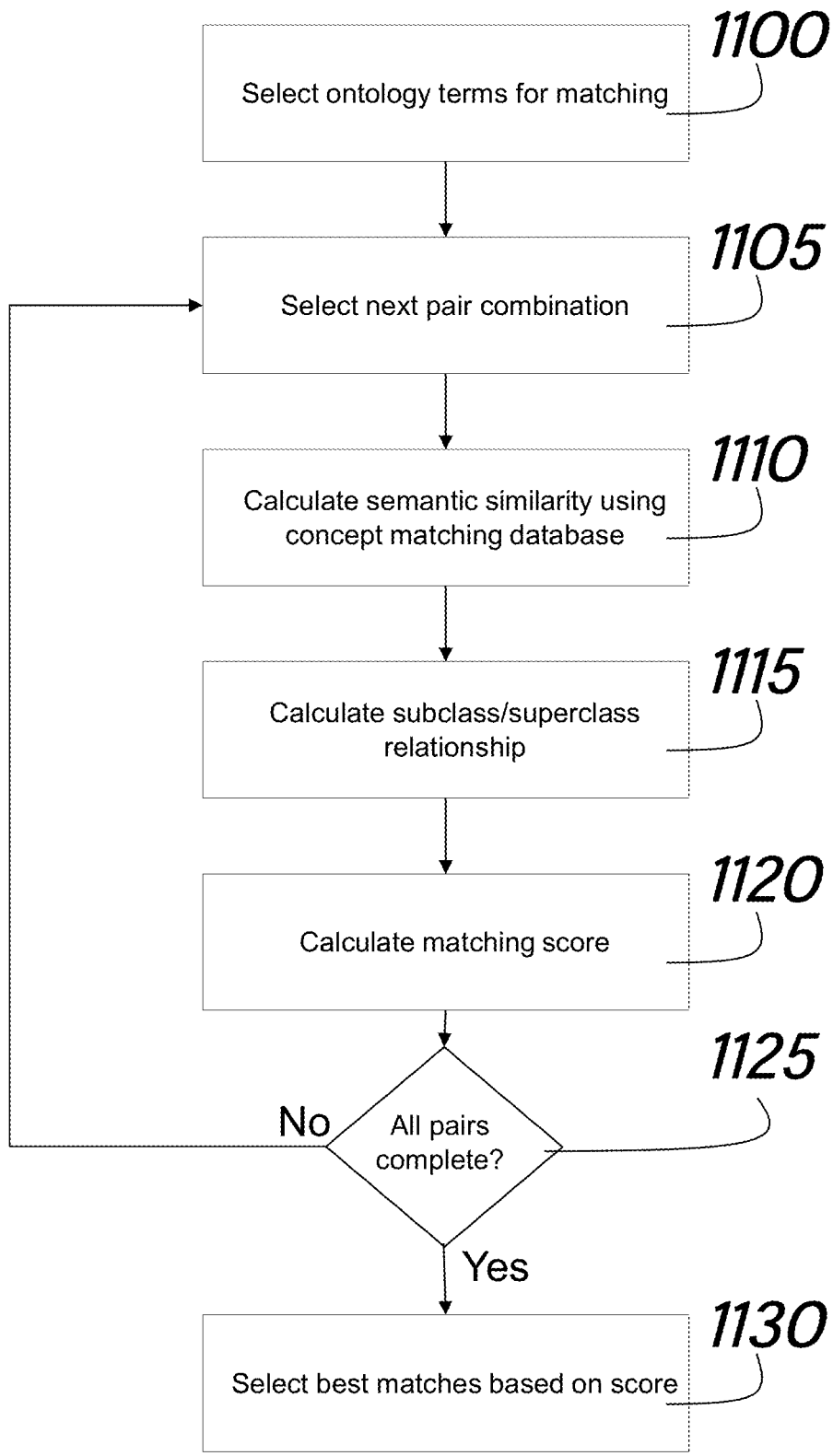
FIG. 11 is a flow chart of an example of a semantic matching method.

An example of a semantic matching process will now be described with reference to FIG. 11.

In this example, at step 1100, the matcher module receives ontology terms for matching. This could be based on user selection via the browser module, but more typically is by receiving terms from the indexer module or the aligner module. At step 1105, a next pair combination is selected, either by comparing a single ontology term to a plurality of respective terms in a matching database, or by selecting a next pair of received source and target ontology terms.

At step 1110, the semantic matcher module calculates a semantic similarity using a concept matching database. The score can be determined in any one of a number of manners, but typically involves applying a predetermined formula that calculates a score based on whether the meanings are in any way related, such as whether they are antonyms, synonyms, or the like. In one particular example, this involves matching ontology terms with definitions, for example using a dictionary, such as WordNet, or the like. In this regard, WordNet is a large lexical database of English. Nouns, verbs, adjectives and adverbs are grouped into sets of cognitive synonyms (synsets), each expressing a distinct concept and is described in Fellbaum, Christiane (2005). WordNet and wordnets. In: Brown, Keith et al. (eds.), Encyclopaedia of Language and Linguistics, Second Edition, Oxford: Elsevier, 665-670.

Once a definition has been identified, this is expressed in terms of RDF triples, which are then stored in a database. The RDF triples for two different meanings can then be queried to determine a similarity between the triples, which is used to determine a similarity score indicative of the similarity of the meaning of the two ontology terms.

Following this, at step 1115, the semantic matcher module determines whether the terms are related by subclass and superclass arrangements. This information is then combined with the similarity score to calculate a matching score at step 1120. At step 1125, it is determined if all pairs are completed and if not the process returns to step 1105 allowing a next pair of source and target ontologies to be selected and a matching score is calculated. Once all potential pairs of ontology terms or ontology terms and matching concepts in the database have been checked, the semantic matcher module can select the best match and then provide an indication of this at step 1130.

Accordingly, it will be appreciated that the above described processes allow users to interact with ontologies, select ontology terms of interest and use this to generate software for interacting with content stored in a data store, such as a database or XML file, in accordance with a respective ontology. The users can further investigate the ontology and then prune this using a pruner module, allowing a minimal ontology to be determined which allows the user to interact with content of interest. The pruned ontology can then be aligned with another pruned ontology, so that this can be used to define a mapping therebetween, which can in turn be used to transfer data between data stores having a source and target data structure.

A more specific example will now be described. For the purpose of this example, an ontology is defined as follows:

A set of related Concepts, also called Classes or Objects, some of which are related to each other using sub/super class relationships also called 'inheritance' relationships. Examples are 'Organisation', 'Company', 'Club' which display inheritance and 'Land Mass', 'Gender', 'Person' which do not display inheritance.

A set of Object Properties, which provide an additional mechanism for relating Classes. For example 'is Located at/in' 'has Gender'. These relationships allow inferencing of concepts, relationships and properties.

A set of Data Properties associated with each Class. For example the class "Person" may have Data Properties of Name, Title, Date-of-Birth, and Gender.

A set of axioms providing a formulaic relationship between any of the preceding properties. For example, "if a Person has a Title of 'Mrs' then the gender must be female" or "if two objects have the same unique identifier then they are the same object". These axioms allow further inferencing of concepts, relationships and properties.

An ontology can be described in a number of languages such as RDFS, XML, DAML, OIL, N3 and OWL. These languages may have different dialects such as OWL-Lite or OWL-DL. From a functionality perspective they differ in their ability to manage and describe complex relationships and axioms.

An ontology may contain hundreds of thousands of concepts. A user may be interested in a subset of these concepts. This subset may be from:
a single ontology;
multiple overlapping ontologies; or
multiple disparate ontologies.

Some concepts in a target ontology may not be predefined, and may not exist in any of the source ontologies. In such a case the user may need to manually add the missing concepts. The required subset may have both or either starting and ending concepts.

Figure 12A:
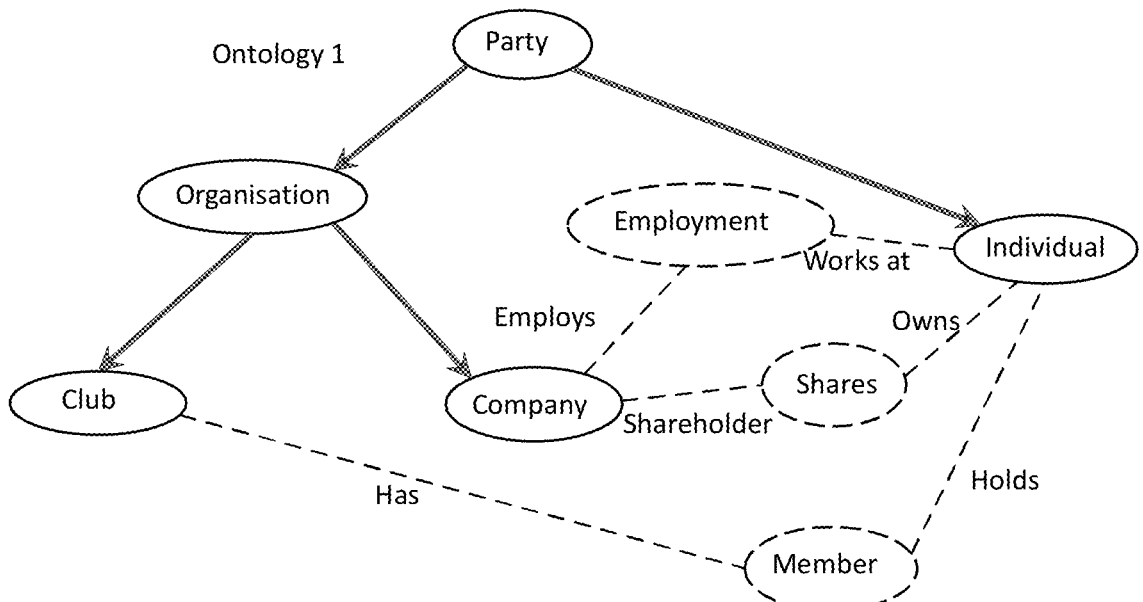
FIGS. 12A and 12B are schematic diagrams of example ontologies.
Figure 12B:
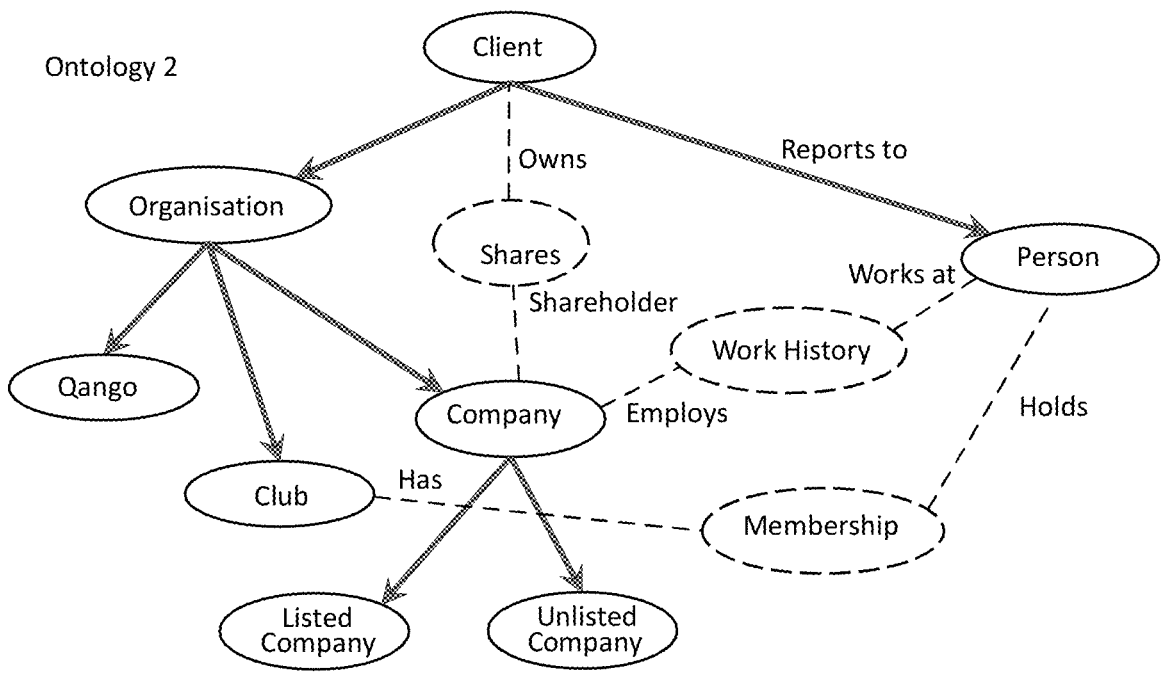

For the purpose of illustration two extremely simple example ontologies are shown in FIGS. 12A and 12B. It will be appreciated that these are utilised to illustrate the processes of indexing, pruning semantic matching and alignment and are not intended to be limiting.

In these examples, there are two types of relationships, those which are hierarchically connected and those which are not. In these examples, hierarchically connected classes are represented by solid ellipses, which are hierarchically connected by solid lines pointing from the superclass to the subclass. Each subclass inherits all the properties of its superclass. The non-hierarchically connected set of classes, shown as broken ellipses, are connected to any class by a named Object Property line shown here as a dashed line. Each class has a set of data properties some of which are shown in Table 1 for illustration.

TABLE 1

| Class Name 1 | Data Property 1 | Class Name 2 | Data Property 2 |
| --- | --- | --- | --- |
| Party 1.0 | Name | Client 2.0 | Name |
| Individual 1.1 | First Name<br>Last Name<br>Date of Birth<br>Gender | Person 2.1 | Given Name<br>Family Name<br>Date of Birth<br>Gender |
| Organisation 1.2 | Date of Incorporation or founding | Organisation 2.2 | Date of Incorporation or founding |
| Club 1.3 | Type | Club 2.3 | Type |
| Company 1.4 | Type<br>Registered in/on | Company 2.4<br>Listed Company 2.5<br>Unlisted Company 2.6<br>Qango 2.7 | Type<br>Stock Exchange<br>Registered in<br>Ministry |
| Member 1.5 | Type<br>Joined Date<br>Exit Date | Membership 2.8 | Type<br>Joined Date<br>Exit Date |
| Employment 1.6 | Role<br>Start Date<br>End Date<br>Reports to | Work History 2.9 | Role<br>Start Date<br>End Date<br>Reports to |
| Shares 1.7 | Purchase Date<br>Number<br>Type | Shares 2.10 | Purchase Date<br>Number<br>Type |

It will be appreciated that the ontologies show similar concepts, but that there are some differences.

Some concepts have different names. Can we say that a 'Party' is identical to a 'Client', a 'Person' is identical to an 'Individual', 'Member' to 'Membership' and 'Employment' to 'Work History'?

In each case except 'Employment', the classes each have identical Data Properties so we can assume that they are nearly identical. Mathematically the Sameness(C1i, C2i) ~1.0 where C1i is a concept from the first ontology and C2i is a concept from the second ontology.

Some Concepts have different Data Properties. In the case of 'Employment' and 'Work History' they have some identical Data Properties and one, 'Reports To', which applies only to 'Work History'. In fact 'Work History' violates 4th Normal Form as it is ambiguous as to whether the 'Start Date' and 'End Date' refer to the 'Role' or the 'Reports To' Data Property.

Some Concepts have different Object Properties. 'Work History' has two Object Properties with 'Person', whereas 'Employment' has only one. In Ontology 1 'Shares' relates 'Company' to 'Individual' whereas in Ontology 2 it relates 'Company' to 'Client'.

Some Concepts do not exist in one Ontology. 'Listed Company' exists in Ontology 2 but not in Ontology 1.

Figure 13:
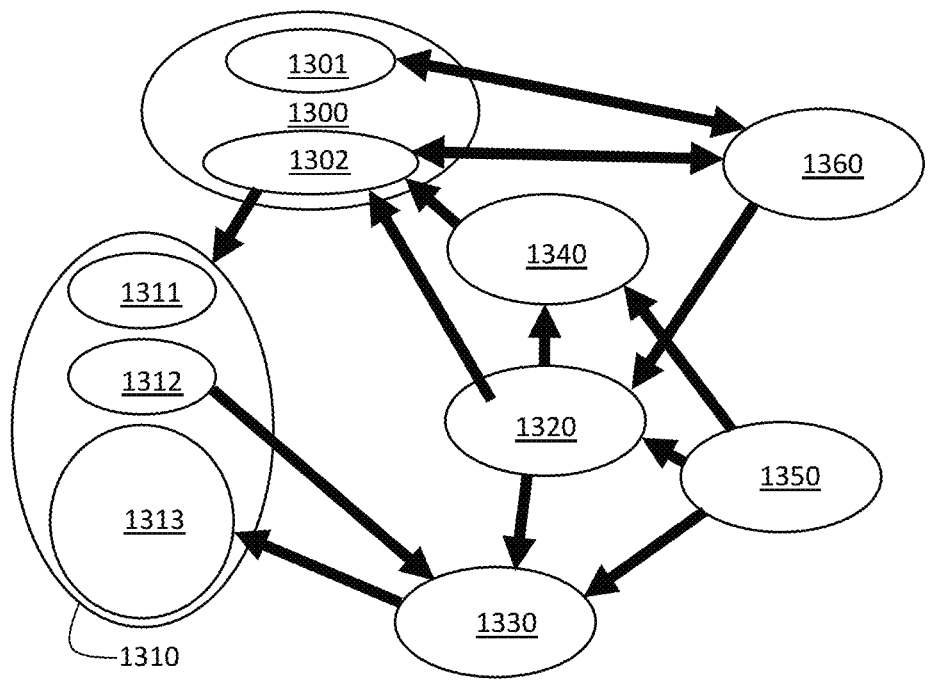
FIG. 13 is a schematic diagram of the modules used for interacting with ontologies.

For the purpose of these examples, the system performs the functionality shown in FIG. 13, with these being implemented by respective modules. In this regard the modules include:

ETL (Extraction-Transformation-Loading) module 1300. This extracts, transforms and loads content within structured data sources. This includes two sub-components, including:

Processor 1301 that extracts source data either via a specified ontology, or, in the absence of an ontology, via a putative ontology which the Processor creates to describe the data. The Processor can be deployed either in the Cloud or on the same machine as the data or on a machine which can access the data via messaging, ODBC, https, SOAP or any equivalent protocol. Multiple copies of the Processor can be deployed in order to obtain data from multiple sources.

Orchestrator 1302 that collects data from the various Processors and maps the source ontologies to the target ontology. Queries are written using the target ontology and are translated into equivalent source ontology queries, allowing data to be returned using the target ontology.

Ontology Browser module 1310 including a browser 1311, editor 1312 and generator 1313. This generates screens and the associated software and data to manage them, which enables a user to browse and edit an ontology and the data described by the ontology. These screens appear in two stages. The first stage is during the generation process. In this stage the screens are dynamically created and display additional information to enable the user to select which features are to be generated. In the second stage the screens are hard coded and only display the information specified for generation.

Ontology Indexer module 1320. The Indexer module creates a set of linked indexes on one or more ontologies, of all the class names, data property names and, object property names. Additionally the index includes semantically equivalent terms (synonyms and homonyms for example) which come from the source ontologies plus from a semantic equivalence function.

Ontology Pruner module 1330. The Pruner module takes an ontology and allows a user to specify which classes, data properties, object properties and axioms they wish to retain. Using those retained the Pruner module checks to see that the relational and axiomatic integrity defined in the ontology is maintained.

Ontology Aligner module 1340. The Aligner module takes two or more ontologies and uses a number of techniques to align the concepts in the various ontologies, either with each other or with a specified target ontology. The techniques utilise the indexes created by the indexer module to find concepts which are semantically similar. Each data property and concept is compared using the semantic matcher module. It refines the matching based upon the ontology structure and the data properties.

Semantic Matcher module 1350. The matcher module compares two terms or two lists of terms to determine whether they have a mathematically defined degree of semantic equivalence within a specified context, for example medicine or engineering, or, in another instance, given a single term, will provide a list of synonyms, homonyms, etcetera based upon a specified context.

Putative Ontology Builder module 1360. This module takes a traditional data source (Relational, XML etc.) and constructs an ontology based upon both the data structure and schema of the source and the contents of any metadata tables which it identifies in the schema of the traditional data source.

Typically an ontology does not have any data instances except as examples, however an ontology can be matched to existing data in one of two ways:

The ontology is constructed from the existing data. For example a relational database could be automatically converted to a 'putative' ontology by relational Entities (tables) being defined as ontological Classes, relational Relationships as ontological Object Properties, and relational Attributes (columns) as ontological Data Properties. Some ontological axioms could be derived from relational referential integrity constraints, but most axioms would need to be manually added or ignored. This putative ontology may then be aligned with an existing rich ontology to add metadata.

Matching the ontology to the data. There are a number of tools for doing this (e.g. S-Match).

Regardless of the data format a putative ontology can be automatically generated from the source data using methods appropriate to the source data structure and metadata (if it exists). This putative ontology may be manually updated using the ontology editor, or used as generated. In either case the putative ontology is then aligned using the aligner module with a subject area ontology (invoked by the ETL module processor) and with the target ontology (invoked by the ETL module orchestrator).

The target ontology may be pruned using the pruner module, to ensure that it contains only the desired concepts plus those concepts, axioms, properties, inferences and provenance details which are required to ensure the integrity of the desired concepts.

All these tools make use of the services provided by the semantic matcher module to check if two semantic concepts match, and the indexer module to look for matching concepts and conceptual structures in the various source and target ontologies.

Examples of the respective modules will now be described in further detail.

ETL Module

The ELT module performs the functions of data extraction, transformation and loading common to all ETL tools without the use of a metadata repository. It does this by using metadata associated with the source data to determine data structure and then by mapping this metadata to an ontology. It also assigns meaning to the data and hence is able to achieve a high level of automation in mapping and transforming the data.

Eliminating the need for a metadata repository means that the flexibility of the processes is not constrained by the human interface required to maintain it. New data formats and technologies can be automatically accommodated.

At a high level there are two major processes performed. The code to perform these processes is called the processor and the orchestrator. Numerous copies of the processor may be deployed to read data at any defined location. The processor can be co-located on the same device as the data or it can be located in the cloud and access the data using a remote access protocol. The processor extracts metadata from the source and creates a putative ontology from that metadata. It then performs some elementary data transformations and passes the data and the ontology to the orchestrator.

The orchestrator receives input from the various processors and aligns their ontologies. It then applies a mapping from the aligned source ontologies to the user defined target ontology. The user can now see all the data from the various source ontologies. Data can be extracted either by specifying a specific query against the target ontology or by using the ontology browser module to create the query, as will be described in more detail below.

Figure 14A:
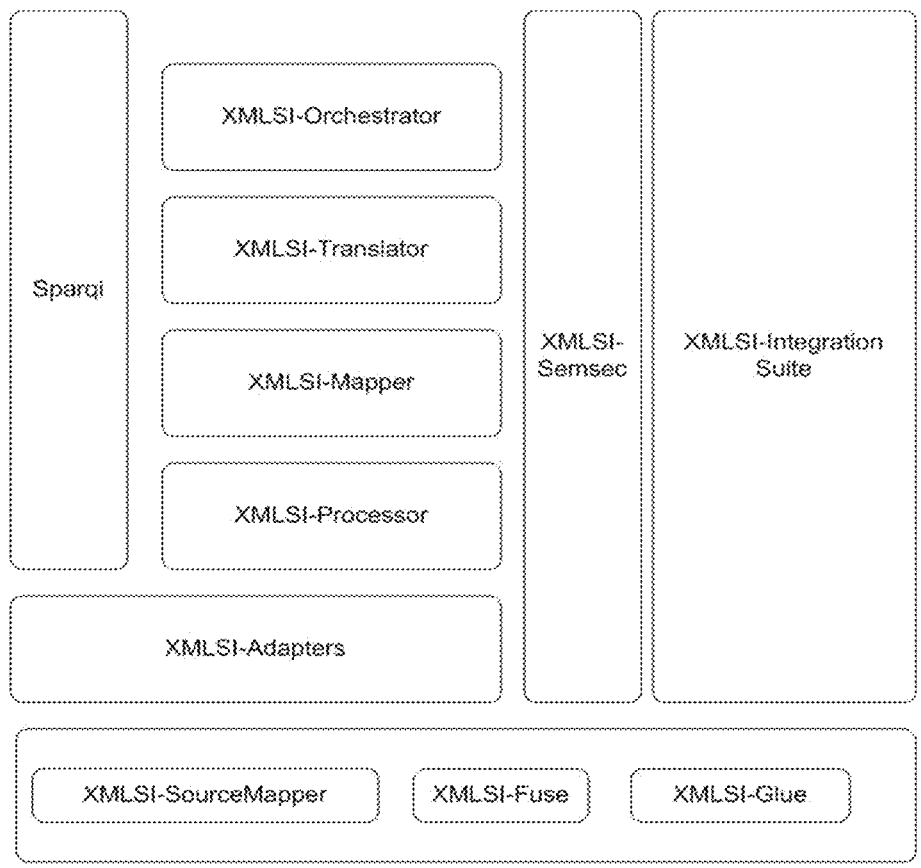
FIG. 14A is a schematic diagram of an example of the software stack of the ETL (Extraction Transformation Load) module of FIG. 13.
Figure 14B:
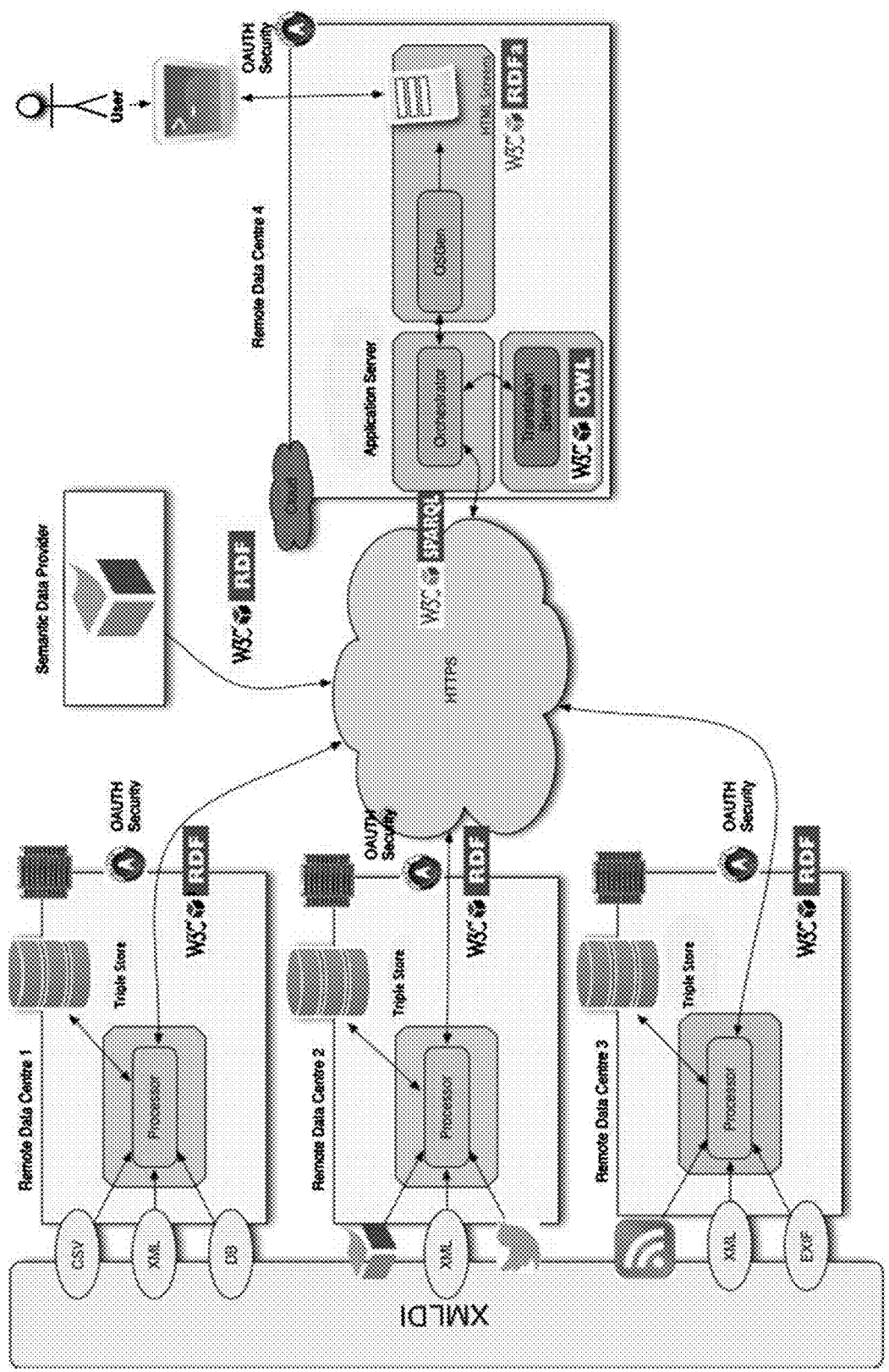
FIG. 14B is a schematic diagram of an architecture used for implementing the ETL module if FIG. 13.

An example ETL module software stack including the various software components which are required to achieve this outcome are shown in FIG. 14A, whilst FIG. 14B shows an example deployment in which a number of processors are coupled to a single orchestrator via a network arrangement.

The processor is responsible for reading data from disparate data source, exposing the data as RDF and creating a putative ontology to describe the data. The high level functions are as follows:

Register disparate data sources by adding metadata and mapping files.

Convert unstructured data into RDF.

Load RDF into triple-store.

Convert the mapping files into putative ontologies.

Expose a SPARQL endpoint for each source.

The orchestrator is responsible for reading target ontologies and mapping files and orchestrating the transformation of request and response. The high level functions are as follows:

Register target ontologies.

Read mapping files and index them.

Transform SPARQL queries from target to mapped source vocabularies.

Transform Response from source to target vocabularies.

Store transformation rules.

Expose a SPARQL endpoint for the target.

Ontology Browser Module

The ontology browser module operates to automatically create a set of screens to enable a user to browse an ontology, query data defined by an ontology and add instance data to data defined by an ontology. The screens thus generated can then be used independently of the ontology and the creating tools, as a complete stand-alone application.

In this regard, currently the use of ontologies to define linked concepts and to access data is largely confined to academics and professional ontologists. The reason for this is that there is no simple mechanism for allowing users to browse ontologies, and then use this in guiding their interaction with data stored in structured data stores. Accordingly, by providing a tool that enables a person with little or no ontological expertise to access all the details of an ontology in a simple comprehensible fashion, this allows the user to select and inspect the data described by the ontology using a simplified query construction mechanism. They will be able to add records to the data with all the constraints and inferences which exist in the original ontology still being enforced. Finally they will be able to deploy the generated screens as stand-alone applications suitable for use by front-office personnel.

When inspecting the data, the user can display it in a number of formats. The underlying data can be stored as RDF Triples, for example. These can be displayed as relational tables, spread sheets, name-value pairs or any user defined format.

created and display additional information to enable the user to select which features are to be generated. In the second stage the screens are hard coded and only display the information specified for generation.

A brief description of the screens is set out in Table 2 below.

TABLE 2

| # | Screen Title | User Story | Notes |
|---|---|---|---|
| 1 | Landing Page | The user will first access the 'landing page' which will have the capability of listing the available ontologies. The user will select an ontology. Having selected the ontology the tool will generate the screens to manage that ontology. | This is the entry point for this application. It could be done in an object oriented fashion. This screen is not generated in the deployable code. |
| 2 | Class List | Having selected an ontology the user will be presented with a list of classes in the chosen ontology. The User will select one class as the entry point to the ontology. | Each list item could include a label to help in identification. This screen is generated in the deployable code. It would be the entry point for the deployable code. |
| 3 | Class Display | All the data property fields for the class are displayed in the main frame, along with four additional frames which are: The parent/super classes of the selected class-a clickable link utilising super class relationships. The child/sub classes of the selected class-a clickable link utilising subclass relationships. The related classes of the selected class-a clickable link using Object Property details. The axioms which impact that class. This frame is only displayed during the generation process. In the generated screens axioms are not displayed except as an error message if invalid data is entered. The field names on the screen are displayed with an adjacent data entry field which is blank when browsing an ontology. Editing mechanisms are provided to select the classes and properties for the screens which are to be generated. Fields can be marked 'non-searchable' to control resource usage. | A screen or a set of related screens is generated in the deployable code, as a screen or set of screens specific to each class. Class specific screens can be generated using a number of templating tools to ensure that a particular look and feel is generated. |
| 4 | Query | A query is performed by adding data into a data property field in one or more class screens. Additional constraints can be defined by the user. Once the query has been defined the user selects a 'Search' option and the records meeting the search criteria are returned. | |

The ontology browser module can exist in two major forms, either as a stand-alone tool, or second as a plug-in to existing ontology tools (such as Protégé). In either form it can generate an application specific to the ontology selected.

The generated application can be used without the ontology as a full function code-set for accessing, updating, deleting and adding records with all the data rules defined in the original ontology being enforced.

Thus, the ontology browser module provides a set of processes which can be implemented in a computer program which generates screens and the associated software and data to manage them which enables a user to browse and edit an ontology and the data described by the ontology. These screens appear in two stages. The first stage is during the generation process. In this stage the screens are dynamically These screens are available without generation in a generic format such that a single screen is used for each type of screen. The screen layout is dynamically determined by the ontology content.

Generic screens are not user friendly and cannot be customised. Therefore the process allows the user to generate a complete set of screens whose look and feel can be parametrically predetermined using facilities such as cascading style sheets, Templates, icons and user supplied parameters.

Figure 15:
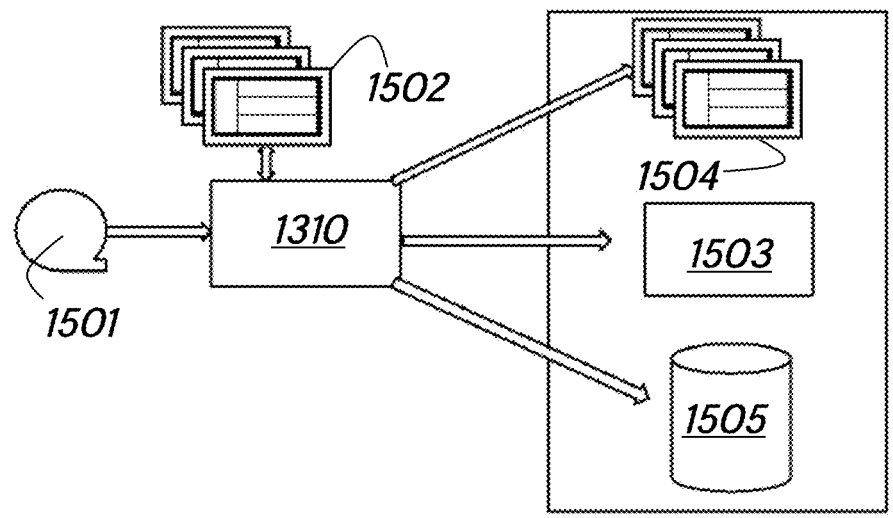
FIG. 15 is a schematic diagram of an example of the functionality of the browser module of FIG. 13.

An example of the arrangement of the browser module is shown in FIG. 15.

In this regard, the browser module 1310 takes a target ontology 1501 from the orchestrator 1302, or any ontology defined by the user. The Browser module 1310 displays the set of screens 1502 which allowing the user to browse the ontology and to specify which components of the ontology to generate into a standalone application.

The browser module 1302 generates a standalone application 1503 including a set of computer screens 1504 to manage the data using the structure and rules specified in the target ontology. The application can be generated in a number of modes, such as purely an ontology or data browser module, or as a full function data add, update and delete application. In this case the user now has a complete application 1503 to manage the data described by the ontology.

Ontologies using OWL or RDF files have enough information to generate web pages and create a corresponding database 1505 to store the information. The RDF or OWL file may have been created by an ontologist based upon their detailed business knowledge.

Thus the browser module 1310 creates an application 1503 for end users to query or enter transaction data. The OWL or RDFS file is fed into the browser module 1310 along with application customisation files, database connection details and any other metadata required to create the application.

The browser module 1310 can create web pages, for example using HTML5, JSP, JSF or any similar technology. For each class in the ontology browser module 1310 creates a web page and each property associated with that class is created as a field within the page. The application 1503 bridges between the generated webpages and the database 1505. It performs the processes to persist the data from the web pages to the database 1505, to extract data from the database 1505, to query data in the database 1505 and to display data on the web page. The browser module 1310 then creates database scripts for creating and loading a database of the type specified in the user supplied metadata. This could be a relational database (RDBMS), a Triple Store, NOSQL, NewSQL, Graph Database or any other recognised database.

Operation of the browser module will now be described in more detail. In this regard, in order to browse an ontology a user must be able to find ontology terms:
concepts;
data properties;
object properties; and
inferences.

This requires two mechanisms, namely:
a method for indexing the above ontology terms from an ontology, in order to search for any such ontology term by name, as described with respect to the indexer module below; and
a method for displaying all the related data and object properties once a particular property has been chosen.

To achieve this, the user initially selects the ontology to be browsed in the 'Landing screen' described in Table 2. The ontology can be selected from a file or a Web address. Once the ontology has been selected a class list is generated using an index of the ontology. This list displays the name and description of each class. For larger lists a list search function is provided enabling the user to search by class name or part of a class description. It is also possible to search on a data property. In either case the search would return a list of classes which contain that data property.

The user then selects the class of interest, which causes a 'Class screen' to be displayed including four components, in the form of frames or tagged sub-screens, as follows:

The Data Property Component. The name of each data property is displayed in a list format with a description box beside the field. Clicking on an information icon beside the field will display all the field attributes and any axioms related to that field. Optionally (clickable), data properties of a parent/super or related class or classes may also be shown.

The parent/super Class Component. This displays the name and description of the parent/super class of the displayed class, with a clickable link to it. Clicking on this link will cause the browser module to display a screen displaying the Parent of the current class.

The child/sub Class Component. This displays the name and description of the subclasses of the displayed class, with a clickable link utilising subclass relationships. Clicking on one of these links will cause the browser module to display a Child/sub class or subclass of the current class.

The Object Property Component. This displays the related Classes of the selected class, each with a clickable link using the object property. Clicking on one of these links will cause the browser module to display a class related to the current class.

By selecting a 'Search' option on a class screen a query is issued to return all the data instances for that class. This is displayed as a list with one row for each instance of the class. By clicking on a particular row, that row is displayed as a formatted screen similar to the ontology class screen. In one example, the data returned maybe restricted by executing a query which would filter the results. The construction and use of such a query will now be described in more detail.

In this regard, filtering the data returned to the user is achieved by capturing from the user, the user's exact requirements of the data to be returned, in the form of a filter and then generating a query based on that filter. The filter is constructed by entering values or expressions into the data property fields on a class screen. For example, using the sample ontologies described above, to find out how many shares John Doe owns, the following steps would be required.

Select the 'Individual' class from the class list screen.
In the Data Property fields enter 'John' into Given-Name and Doe' into Last-Name.
From the Object Property frame of the 'Individual' class screen, select the 'Shares' class.
Select the Search option.

By selecting the 'Search' option on a Shares Class screen a query is issued to return all the data properties for that class but only those owned by John Doe. The filter has been transformed by the generated application 1503 into a SPARQL or functionally equivalent query which can be executed against the data stored in the database 1505.

To allow the browser module 1310 to generate the application 1503, the following process is performed:
Optionally configure metadata for the application to be generated including items such as:
Company name, logo etc.
Name of the application to be generated.
Name and type of database to be created.
Location of the database.
Naming and coding specification and standards for the application to be generated. This includes style sheets, Templates, Java scripts and other display specifications.
Icons to be associated with classes and actions.
Location and contact details of help desk.
Verbosity of error and log messages.

On the 'Landing Screen' select the ontology from which to generate, resulting in a 'Class List' screen being displayed by the browser module 1310.

On the Class List screen tag each class to be generated with 'g'.

Select each class to be generated, causing the browser module 1310 to display the 'Class Display' screen.

On the Class Display screen all fields are initially tagged with a 'g'. Review each data property field, each super/subclass link and each object property link to be generated, removing the tag if it is not required.

By default all fields are searchable (i.e. can be added to a filter). Adding an 'ns' tag to a data property field will mean that that field will be non-searchable in the generated application.

There are additional field tag positions on each of the super/subclass link fields and the object property link fields. By setting an 'I' tag in these fields it will generate data fields from the linked class into the generated screen. These fields will be displayed as non-updateable fields.

If any fields from linked classes are to be displayed, select the linked class and tag the appropriate fields with an 'I'.

Return to the Class Display screen and remove the tag from each axiom description if it is not to be enforced. It is important to remove fields before axioms as otherwise there may be a loss of integrity in the generated application.

Repeat Steps 3-9 until all the required classes have been selected for generation.

Return to the Class List screen and selects a 'Generate Application' option.

The application will be generated by the browser module 1310 and saved into the location specified in the application metadata (Step 1). The database creation and load scripts will be created. Run these scripts to ready the application for use.

Accordingly, the above described browser module 1310 allows a user to browse and interact with ontologies, and then by selecting specific classes and data properties, generate an application 1503 that can be used to interact with data stored in a data store 1505 in accordance with the selected classes and data properties.

Ontology Indexer Module

The indexer module automatically creates a set of indexes of the terms used in a collection of one or more ontologies to assist a user to browse an ontology and to expedite the querying of data defined by an ontology These indexes are used by the other modules to assist in the alignment, pruning and browsing of ontologies.

The indexer module indexes one or more ontologies by creating a set of linked indexes of all the class names, data property names and object property names and relationships. The index includes semantically equivalent terms which come from the source ontologies plus from a semantic equivalence function.

Figure 16:
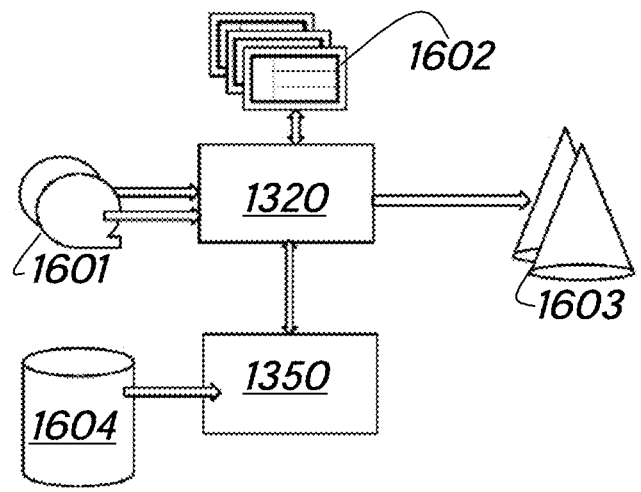
FIG. 16 is a schematic diagram of an example of the functionality of the indexer module of FIG. 13.

An example of the functionality of the indexer will now be described with reference to FIG. 16.

In this example, the indexer module 1320 receives an ontology 1601 from the orchestrator 1302, or any ontologies defined by the user, via a set of screens 1602, or by the processor 1301 and creates indexes 1603 of all the class names, data property names and, object property names. It will be appreciated that the screens may be generated by the browser module 1310 as previously described.

As each ontology term is indexed, synonyms of that item, obtained from the semantic matcher module 1350, using a concept matching database 1604, are also indexed. For Object Properties, the concepts linked by the object property are cross referenced in an index.

A sample of the Concept-Data Property-Object Property (CDO) index based on the example ontologies above is shown in Table 3. It should be noted that this is a display form of the index for the purpose of illustration but that in practice the index may be stored in a more complex index structure as will be described in more detail below.

TABLE 3

| CDO | Type | Address |
| --- | --- | --- |
| Client | Concept | Ont 2.0 |
| Club | Concept | Ont 1.3 |
| Club | Concept | Ont 2.3 |
| Company | Concept | Ont 1.4 |
| Company | Concept | Ont 2.4 |
| Employment | Concept | Ont 1.6 |
| Individual | Concept | Ont 1.1 |
| Listed Company | Concept | Ont 2.5 |
| Member | Concept | Ont 1.5 |
| Membership | Concept | Ont 2.8 |
| Organisation | Concept | Ont 1.2 |
| Organisation | Concept | Ont 2.2 |
| Party | Concept | Ont 1.0 |
| Person | Concept | Ont 2.1 |
| Qango | Concept | Ont 2.7 |
| Shares | Concept | Ont 1.7 |
| Shares | Concept | Ont 2.10 |
| Unlisted Company | Concept | Ont 2.6 |
| Work History | Concept | Ont 2.9 |
| Date of Birth | Data Property | Ont 1.1 |
| Date of Birth | Data Property | Ont 2.1 |
| Date of Incorporation or founding | Data Property | Ont 1.2 |
| Date of Incorporation or founding | Data Property | Ont 2.2 |
| End Date | Data Property | Ont 1.6 |
| End Date | Data Property | Ont 2.9 |
| Exit Date | Data Property | Ont 1.6 |
| Exit Date | Data Property | Ont 2.9 |
| Family Name | Data Property | Ont 2.1 |
| First Name | Data Property | Ont 1.1 |
| Gender | Data Property | Ont 1.1 |
| Gender | Data Property | Ont 2.1 |
| Given Name | Data Property | Ont 2.1 |
| Joined Date | Data Property | Ont 1.5 |
| Joined Date | Data Property | Ont 2.8 |
| Last Name | Data Property | Ont 1.1 |
| Ministry | Data Property | Ont 2.7 |
| Name | Data Property | Ont 1.0 |
| Name | Data Property | Ont 2.0 |
| Number | Data Property | Ont 1.7 |
| Number | Data Property | Ont 2.10 |
| Purchase Date | Data Property | Ont 1.7 |
| Purchase Date | Data Property | Ont 2.10 |
| Registered in | Data Property | Ont 2.6 |
| Registered in/on | Data Property | Ont 1.4 |
| Reports to | Data Property | Ont 2.9 |
| Role | Data Property | Ont 1.6 |
| Role | Data Property | Ont 2.9 |
| Start Date | Data Property | Ont 1.6 |
| Start Date | Data Property | Ont 2.9 |
| Stock Exchange | Data Property | Ont 2.5 |
| Type | Data Property | Ont 1.3 |
| Type | Data Property | Ont 1.4 |
| Type | Data Property | Ont 1.5 |
| Type | Data Property | Ont 1.7 |
| Type | Data Property | Ont 2.10 |
| Type | Data Property | Ont 2.3 |
| Type | Data Property | Ont 2.4 |
| Type | Data Property | Ont 2.8 |
| Employs | Inv Obj Prop | Ont 1.6 |
| Employs | Inv Obj Prop | Ont 2.9 |
| Has | Inv Obj Prop | Ont 1.5 |

TABLE 3-continued

| CDO | Type | Address |
|---|---|---|
| Has | Inv Obj Prop | Ont 2.8 |
| Holds | Inv Obj Prop | Ont 1.5 |
| Holds | Inv Obj Prop | Ont 2.8 |
| is a | Inv Obj Prop | Ont 1.0 |
| is a | Inv Obj Prop | Ont 1.0 |
| is a | Inv Obj Prop | Ont 1.2 |
| is a | Inv Obj Prop | Ont 1.2 |
| is a | Inv Obj Prop | Ont 2.0 |
| is a | Inv Obj Prop | Ont 2.0 |
| is a | Inv Obj Prop | Ont 2.1 |
| is a | Inv Obj Prop | Ont 2.2 |
| is a | Inv Obj Prop | Ont 2.2 |
| is a | Inv Obj Prop | Ont 2.2 |
| is a | Inv Obj Prop | Ont 2.4 |
| is a | Inv Obj Prop | Ont 2.4 |
| Owns | Inv Obj Prop | Ont 1.7 |
| Owns | Inv Obj Prop | Ont 2.10 |
| Reports to | Inv Obj Prop | Ont 2.1 |
| Shareholder | Inv Obj Prop | Ont 1.7 |
| Shareholder | Inv Obj Prop | Ont 2.10 |
| Works at | Inv Obj Prop | Ont 1.6 |
| Works at | Inv Obj Prop | Ont 2.9 |
| Employs | Obj Property | Ont 1.4 |
| Employs | Obj Property | Ont 2.4 |
| Has | Obj Property | Ont 1.3 |
| Has | Obj Property | Ont 2.3 |
| Holds | Obj Property | Ont 1.1 |
| Holds | Obj Property | Ont 2.1 |
| is a | Obj Property | Ont 1.1 |
| is a | Obj Property | Ont 1.2 |
| is a | Obj Property | Ont 1.3 |
| is a | Obj Property | Ont 1.4 |
| is a | Obj Property | Ont 2.1 |
| is a | Obj Property | Ont 2.2 |
| is a | Obj Property | Ont 2.3 |
| is a | Obj Property | Ont 2.4 |
| is a | Obj Property | Ont 2.5 |
| is a | Obj Property | Ont 2.6 |
| is a | Obj Property | Ont 2.7 |
| is a | Obj Property | Ont 2.7 |
| Owns | Obj Property | Ont 1.1 |
| Owns | Obj Property | Ont 2.0 |
| Reports to | Obj Property | Ont 2.9 |
| Shareholder | Obj Property | Ont 1.4 |
| Shareholder | Obj Property | Ont 2.4 |
| Works at | Obj Property | Ont 1.1 |
| Works at | Obj Property | Ont 2.1 |

Even without the inclusion of synonyms this is an extremely useful index. For example, every concept which has the same name in two different ontologies can potentially be aligned. The Aligner module would take each such pair and compare first their Object Properties and then their Data Properties.

For example, the concept 'Shares' appears in both ontologies as concepts Ont 1.7 and Ont 2.10. At this level they appear to be similar (S1.7,2.10=1.0 because the names are identical) and from an indexer module point of view that is sufficient.

Further analysis could be performed by the aligner module described in more detail below. By examining the Object Properties it would find that the Object Properties are different as shown in Table 4 below. Although they match in number and Object Property name, one of the related concepts is different giving S1.7,2.10=0.8571. By examining the Data Properties we find that they have identical Data Properties giving S1.7,2.10=1.0.

The source information on which the aligner module performed the preceding calculations is all available in the indexes created by the indexer.

TABLE 4

| Ontology 1 | | | Ontology 2 | | |
|---|---|---|---|---|---|
| Individual | Owns | Shares | Client | Owns | Shares |
| Company | Shareholder | Shares | Company | Shareholder | Shares |

Further analysis of the other concepts using the semantic matcher module would show that an "Individual" is a subclass of "Client" hence giving S1.7,2.10=0.8 →0.95. Ontology 2 is a more generic model than Ontology 1. This similarity range is adequate to establish anchor points between Shares in the two ontologies. The calculations of $S_{i,j}$ are performed by the aligner module.

The relationship between concepts is extracted in the Concept to Concept (C2C) table shown in display form in Table 5, which shows how Concept C1 relates to Concept C2.

TABLE 5

| Object Rel | C1 | C2 |
|---|---|---|
| Employs | Ont 1.4 | Ont 1.6 |
| Employs | Ont 2.4 | Ont 2.9 |
| has | Ont 1.3 | Ont 1.5 |
| has | Ont 2.3 | Ont 2.8 |
| Holds | Ont 1.1 | Ont 1.5 |
| Holds | Ont 2.1 | Ont 2.8 |
| is a | Ont 1.1 | Ont 1.0 |
| is a | Ont 1.2 | Ont 1.0 |
| is a | Ont 1.3 | Ont 1.2 |
| is a | Ont 1.4 | Ont 1.2 |
| is a | Ont 2.1 | Ont 2.0 |
| is a | Ont 2.2 | Ont 2.0 |
| is a | Ont 2.3 | Ont 2.2 |
| is a | Ont 2.4 | Ont 2.2 |
| is a | Ont 2.5 | Ont 2.4 |
| is a | Ont 2.6 | Ont 2.4 |
| is a | Ont 2.7 | Ont 2.1 |
| is a | Ont 2.7 | Ont 2.2 |
| Owns | Ont 1.1 | Ont 1.7 |
| Owns | Ont 2.0 | Ont 2.10 |
| Reports to | Ont 2.9 | Ont 2.1 |
| shareholder | Ont 1.4 | Ont 1.7 |
| shareholder | Ont 2.4 | Ont 2.10 |
| Works at | Ont 1.1 | Ont 1.6 |
| Works at | Ont 2.1 | Ont 2.9 |

The indexes are constructed in multiple formats, corresponding to sorting the above tables into different sequences. The aligner module can perform many of its tasks by executing SQL queries against the indexes.

An example of the index structure will now be described in more detail. In this regard, using the semantic matcher module, a root word or lemma is determined for each synonym set. The semantic matcher module requires that the context be set in order to obtain the optimum results. In general, when constructing indexes over a number of ontologies the context of each ontology is known, narrow and related to the other ontologies of interest.

The final set of indexes is created in a multi-step process summarised below:
- Extract all concepts, Object Properties and Data Properties from the ontology being indexed.
- Load these values into temporary tables (CDO and C2C) with the format described in Tables 3 and 5. These tables are created or recreated empty for each ontology being indexed.
- The ontology is loaded into the semantic matcher module This will examine every word semantically using any definitions contained in the ontology and comparing them with those definitions already loaded into the semantic matcher module or available from public dictionaries such as WordNet. The context is supplied by the ontology (e.g. Medical/Surgical or Geographical Location).

The semantic matcher module defines a Concept Id, a unique number corresponding to the lemma or root word for every family of synonyms.

The synonym table is then loaded with terms matching the terms in the temporary tables described above with the Concept Id.

All synonyms identified by the semantic matcher module for each term in the ontology being indexed are also loaded into the Synonym table.

The final CDO index is then created by substituting the appropriate Concept Id for each term in the CDO table.

The final C2C index is then created by substituting the appropriate Concept Id for each term in the C2C table.

The temporary (display versions) of the index are deleted.

The next ontology to be indexed is then loaded by repeating all the preceding steps.

When all the relevant ontologies have been indexed, a final pass of the synonym table against the semantic matcher module is performed in case any new synonyms have been identified during the loading process.

The indexes are loaded into an appropriate database structure and tuned for performance. Typically this will involve creating multiple database indexes over the ontology index tables.

It will be appreciated that there is no direct user interaction with his tool or with the indexes. Instead the indexer module provides a service which is used by other modules, tools or components.

Some of the services which this index can provide include the enhanced ability to:
choose the best ontology from a selection of ontologies;
align or merge multiple ontologies;
navigate an ontology;
extract synonyms;
perform semantic matching.

Ontology Pruner Module

The pruner module is designed to enable a user to take a large ontology or a collection of aligned ontologies and prune them down to the classes of interest for the user's needs, without losing integrity by inadvertently deleting a component which contains data or axioms relevant to their ontology terms of interest.

For example, issues arise when constructing and utilising a large reference ontology, such as the Foundational Model of Anatomy (FMA). In this regard, the FMA is very large and highly detailed, though also very general in nature (e.g. non-application specific). It is also rigorous in its adherence to proper modelling principles. These criteria together lend the FMA to many possible applications. However, they have also rendered it cumbersome (i.e. overly large or detailed or principled) for use by any specific application.

As a result, potential users of the FMA had requests of the following basic form, "we really like the FMA, but it is too large or too detailed for our needs, we really only need something based on subsets of the whole FMA". The basis for division varied, application to application, but examples include:
Region-based, i.e. the brain or the abdomen.
System-based, i.e. the cardiovascular system or the skeletal system.
Granularity-based, i.e. only items visible in an x-ray or only cellular and sub-cellular components.

Though the desired ontology derivative was generally based on a subset extraction such as those above, it was then often further manipulated to better suit the needs of the application (i.e. classes added, classes removed, properties removed, properties added, etc.).

Such requests could be handled in one of three ways:
Writing procedural code specific to each new request, which is not a generic solution.
Creating views over the ontology, which needs a language for defining the desired application knowledge base (KB) (not always a proper ontology) as well as an engine that could generate the application KB from the definition and the source ontology(ies). This has problems with adding and removing properties.
Pruning the ontology to deliver a well modelled subset ontology.

Thus, there are many needs for a pruned ontology, such as relevance, performance, manageability and testability and these requirements should be met by a tool which enables a person with little or no ontological expertise to safely prune unneeded concepts. Furthermore that person should be able to select and inspect the data described by the ontology by using a simplified query construction mechanism. They then will be able to study the effects of removing components from the ontology before committing to their removal, and then save the pruned ontology as a new ontology.

For example, SNOMED-CT is a large medical ontology of medical terms used in clinical documentation. It consists of 300,000+ concepts with about 1,400,000 relationships between them. The concepts are divided into 19 functional areas. A researcher may only be interested in one of these areas, say mental health. Removing the other 18 areas would break many of the relationships between medical health terms and pharmaceutical terms. Obviously they may wish to retain these items. To do so manually would require many months of work with existing tools and would be prone to error.

As another example a user may wish to create a new ontology from components of several existing source ontologies and then add their own additions. The combined ontology would contain many irrelevant concepts which would need to be removed. For example, a parcel delivery company combining a transport ontology with a geo-location ontology to create an ontology which enables delivery routes to be determined and optimised. By combining these ontologies and adding axioms such as aeroplanes start and stop their journeys at airports, ships at ports and trains at stations, it would be possible to construct an information base covering every concept in their business model. However much of each source ontology would not be needed.

The pruned ontology definition may be used in place of a view over the complete ontology. This view could be used for a number of purposes such as access control, scope management etc.

To achieve this, the pruner module operates in conjunction with the browser module to perform the functions set out in Table 6 below.

TABLE 6

| # | Title | Function |
|---|---|---|
| 1 | Prune Single Ontology | Use the updated ontology browser module to enable the tagging of classes by the user in a manner which allows the creation of a coherent, integrated subset of the ontology with all relevant object properties, axioms and inferences from the source ontology. |
| 2 | Prune Overlapping Ontologies | Using the semantic matching tool and the updated the ontology browser module to enable the tagging of classes in a manner which allows the creation of a coherent, integrated subset of the ontology with all relevant object properties, axioms and inferences from the source ontologies. Include a mechanism to determine if ontologies are in fact disparate. |
| 3 | Prune Disparate Ontologies | Include a mechanism to add the necessary detail to join the disparate ontologies. Then iteratively apply the mechanism above to establish the pruned ontology.<br>For example-Given a geo ontology and a transport ontology construct a journey ontology which would allow analysis of the appropriate transport mechanisms between two locations. |

The pruner module interacts with the browser module to allow a user to specify which classes, data properties, object properties and axioms of a selected ontology they wish to retain. Using those retained the pruner module checks to see that the relational and axiomatic integrity defined in the ontology is maintained.

In another version the user may specify two essential concepts within a single ontology which must be retained in the pruned ontology. The invention then maps all the conceptual relationships between classes, tagging all classes which are required to analyse the specified concept. Additional classes, object properties and axioms are then included from the source ontology to ensure the integrity of the pruned ontology.

In another version the user may specify two essential concepts from disparate ontologies which must be retained in the pruned ontology. The pruner module then attempts to map all the conceptual relationships between classes, tagging all classes which are required to analyse the specified concept. If no connecting paths are identified the software will recognise the potential impossibility of creating a pruned ontology which connects the two starting concepts. The user will be asked to:

Abandon the attempt, or

Redefine their goals and start again, or

Enlarge the scope by adding additional classes either manually or from another ontology and start again.

Assuming success the user now has a complete ontology which is greatly reduced in size from the combined source ontologies.

Figure 17A:
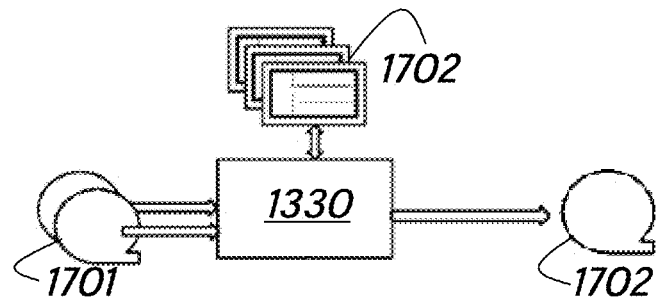
FIG. 17A is a schematic diagram of an example of the functionality of the pruner module of FIG. 13.

An example of the arrangement of the pruner module is shown in FIG. 17A.

In this example, the pruner module 1330 opens ontologies 1701 defined in OWL and RDFS files, with the user then interacting with the pruner module 1330 via a set of screens 1702 as defined in Table 7 below, to thereby produce a pruned ontology 1703. It will be appreciated that the screens may be generated by the browser module 1310 as previously described.

TABLE 7

| # | Screen Title | User Story |
|---|---|---|
| 1 | Landing page | The user will first access the 'landing page' which will have the capability of listing the available ontologies. The user will select an ontology. Having selected the ontology the tool will generate the screens to manage that ontology. |
| 2 | Class List | Having selected an ontology the user will be presented with a list of classes in the chosen ontology. The User will select one class as the entry point to the ontology |
| 3 | Class Display | All the data property fields for the class are displayed in the main frame, along with four additional frames which are:<br>The parent/super classes of the selected class-a clickable link utilising super class relationships.<br>The child/sub classes of the selected class-a clickable link utilising subclass relationships.<br>The related classes of the selected class-a clickable link using Object Property details.<br>The axioms which impact that class.<br>The field names on the screen are displayed with an adjacent data entry field which is blank when browsing an ontology.<br>Editing mechanisms are provided to select the classes and properties for the screens which are to be retained in the pruned ontology. |

Figure 17B:
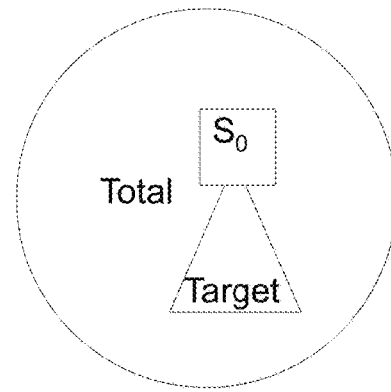
FIGS. 17B to 17D are schematic diagrams of examples of a pruning process.

When pruning a single ontology this is a tool assisted manual process, as will now be described with reference to FIG. 17B.

In this example, the user selects the concepts that they require and the tool identifies and adds the components required for completeness and integrity. The user selects a class as a starting seed point $S_0$ in the source ontology and tags it as $K_0$ for keep.

The computer identifies and tags as '$K_1$' all parents of classes marked '$K_0$', all classes and inferences from classes and inferences tagged as $K_0$. These tagged variables are called the $S_1$-shell. The user reviews the computer tagged items and retags them as $K_1$ for Keep, $M_1$ for Maybe and $D_1$ for Discard. All axioms are loaded for the tagged $M_i$ and $K_i$ components. The process is then repeated, incrementing i each time until the user has tagged all the components for the appropriate ontology.

A reasoner is then applied to the resulting ontology to identify potential errors and add inferred values. Any concepts, inferences or axioms thus added are tagged Kn and the tagged components are exported as the pruned ontology.

Figure 17C:
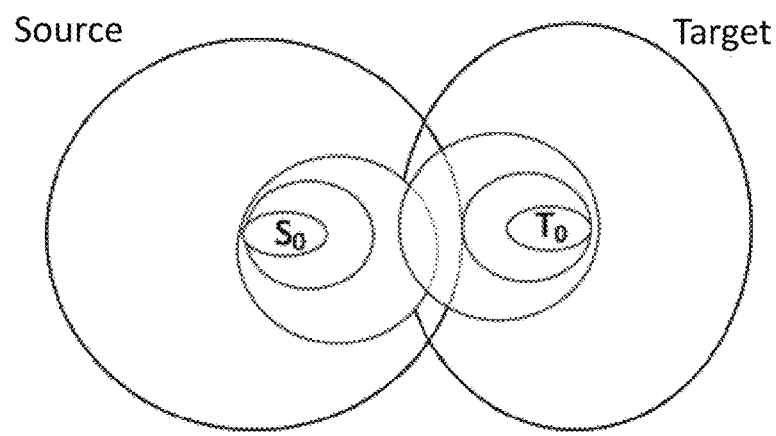

For multiple overlapping ontologies, the process is as shown in FIG. 17C.

In this example, the user selects a class as a starting seed point $S_0$ in one ontology and another as ending seed point $E_0$ in either the same or another ontology and tags them both as K for Keep with '$K_{0s}$' or '$K_{0e}$'.

The computer identifies and tags as '$K_{1s}$' or '$K_{1e}$' all parents of classes marked '$K_{0x}$', and all subclasses and inferences from classes and inferences tagged as '$K_{nx}$' where n=1. These tagged variables are called the $S_1$-shell and the $E_1$-shell. The variables in the S and E shells are compared by the semantic matcher module described in more detail below. The matcher module returns a numeric value for the match quality between variables in each shell. If the predetermined match quality is met then a path has been determined between the two shells. This should only occur of the shells overlap. If the start and end point are in the same ontology the match quality must be 1.0 or exact.

At any stage, the data properties of a tagged data class may be pruned. This is performed by selecting the class and marking the data fields (data properties) as 'D' for Discard. Any inferences based upon the existence of the discarded field will be ignored.

These steps are iterated, incrementing n by 1 each time until a predetermined number of variables have appropriate match quality or a predefined depth of shell is reached. The shell paths of the matching variables are tagged '$P_{jx}$'. If the predefined depth of shell is reached without establishing any paths then the process has failed and the ontologies are considered disparate. The process stops. At this point it is possible to increase the predefined shell depth, and to manually change the tag of any concepts which are considered out of scope from K to D for Discard. The process can be restarted.

Once these have been established, the paths $P_j$ between $S_0$ and $E_0$ can be populated and a skeletal pruned ontology can be defined in terms of these paths. All class parents and inferred parents for tagged $P_j$ path components are also tagged as belonging to the path $P_j$. All axioms are loaded for the tagged $P_j$ path components thus creating an expanded ontology.

A reasoner is applied to the expanded ontology to identify potential errors and add inferred values. Any concepts, inferences or axioms thus added are tagged and exported as part of the pruned ontology.

Figure 17D:
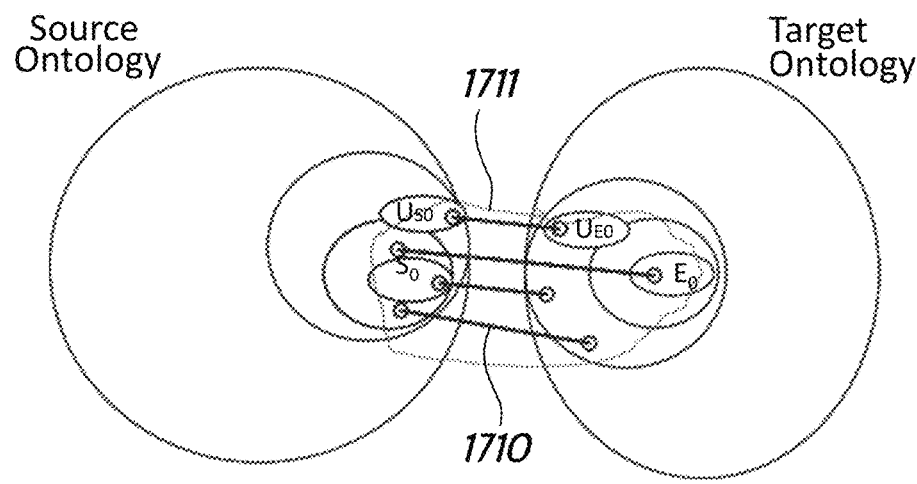

For disparate ontologies the process is as shown in FIG. 17D. In this regard, disparate ontologies can arise for two possible reasons:
- the user did not realise that they were disparate until they attempted to align them or to extract a subset ontology from concepts in the two ontologies. This is a potential failed outcome of the previous section; or
- the user knows that they are disparate and is supplying concepts and properties to enable them to join.

In either case, the user must supply the information to enable the ontologies to be joined. This is effectively the starting point for the process.

The user selects a class as a starting seed point $S_0$ in one ontology and another as ending seed point $E_0$ in the other ontology and tags them both as K for Keep with '$K_{0s}$' or '$K_{0e}$'. In addition they define a set of user defined paths which connect the ontologies, as shown by the lines 1710.

These paths have start and end points '$U_{0si}$' and '$U_{0Ei}$' where 'i' is the path number being defined. These paths form a contiguous set of related concepts, starting with a class in one ontology and ending with a class in another ontology.

The process described above for overlapping ontologies then applied to each concept pair $S_0$ and '$U_{0si}$' and $E_0$ and '$U_{0Ei}$' to establish paths $P_{si}$ and $P_{ei}$ between the starting/end points and the user defined concepts 'i'. Once these have been established, the paths $P_i$ between $S_0$ and $E_0$ can be populated and a skeletal pruned ontology can be defined in terms of these paths. All class parents and inferred parents for tagged $P_i$ path components are also tagged as belonging to the path $P_i$. All axioms are loaded for the tagged $P_i$ path components. This is called the expanded ontology.

A reasoner is applied to the expanded ontology to identify potential errors and add inferred values. Any concepts, inferences or axioms thus added are included in the pruned ontology 1711, which can now be exported.

When a concept is selected by the user as the starting point for pruning it is necessary to determine which additional concepts should be included. There are a number of algorithms base on Object Properties and Data Properties which are applied to make this determination. In this regard, object properties have the following attributes:
They name a relationship between two concepts.
The relationship has a direction. This is defined as from a 'Domain' concept to a 'Range' concept. In relational database terminology, the primary key of a Domain becomes a foreign key in a Range.
Optionally the relationship has a type, including:
Functional;
Inverse Functional;
Transitive;
Symmetric;
Asymmetric;
Reflexive;
Irreflexive.

Also the super/sub class relationship is equivalent to a special case of an object property. A subclass 'inherits' all the Data Properties and all the Object Properties of its superclass.

Using the sample ontology described above, if the starting point for pruning were 'Club' then it would be necessary to include all the super classes of Club, namely Organisation and Party in the pruned ontology. The class Member would not be included as the direction and type of that relationship precludes its automatic inclusion. For the same reason the subclasses of Organisation and Party would not be automatically included and neither would any subclasses of club be included had there been any.

However if Member had been included then the direction and type of the Object Properties 'Has' and 'Holds' would ensure that Club and Individual and all their superclasses were automatically included.

The Data Property 'Type' in any concept raises a red flag as it implies the existence of an unmodelled concept, viz. 'Type of Club' in Club, 'Type of Member' in Member and so forth. For example the 'Type of Club' concept could contain a list of all the valid values such as Sailing, Chess, Gymnastics etcetera. The Type_of_Club concept would have an Object Property called 'Has Type' with Range of Club. This concept would be automatically included in the pruned ontology.

All automatic inclusions and exclusions can be modified either across all concepts, or on a concept by concept basis. The user specifies 'Include', 'Exclude' or 'Ask' for each type of Object Property.

The decisions to include a particular concept are made by a specialised Semantic Reasoner using the ontology rules, in particular the Object Properties as input to an inference engine. First order predicate logic is initially used to get explicit inclusions and exclusions. Further inferences as in the example of a 'Type' Data Property must be determined using forwards and backwards inference chaining. To obtain the best result Novamente's probabilistic logic network techniques can be applied to each localised problem area.

An example of operation of the pruner module will now be described in more detail. In this example, in order to prune an ontology it is necessary to identify the concepts, data properties, object properties and inferences that are included in the ontology. In one example, this is achieved using the indexer module to index the ontology items, and then using the browser module to display the ontology terms for selection as previously described.

In particular, the user selects the ontology to be pruned in the browser module 'Landing screen'. In this regard, the ontology can be selected from any source, such as a file, Web address, or the like. Once the ontology has been selected the Class List is generated using the index of the ontology. This list displays the name and description of each class. For larger lists a list search function is provided enabling the user to search by class name or part of a class description. It is also possible to search on a data property. In either case the search would return a list of classes which contain that data property. The user then selects a class as the starting point and tags it $S_0$.

Optionally the user then selects an end point $E_0$ If the user does not select an endpoint then they will need to manually control the pruning operation as described above. The user may also return to the Landing Screen and select another ontology for the end point or could alternatively add a set of bridging concepts and relationships if they are aware that the chosen ontologies are disparate. If the user does not specify bridging concepts then the process will proceed on the basis of the overlapping ontologies process described above, otherwise it will proceed as per the disparate ontologies process.

To control the pruning process, a number of metadata parameters can be set, including:
  Location to store the pruned ontology.
  Shell depth for examination.
  Match quality for accepting sameness.
  Whether to pause the process at the completion of each shell to allow manual editing.
  Maximum run time.
  Verbosity of error and log messages.

An example of the manual pruning process will now be described in more detail.

In this example, the user only specifies a starting point from which to start the pruning process. They can perform manual pruning in one of two manners, which can be used interchangeably at any time.

From the Class List screen, typically displayed by the browser module 1310, they can tag classes to be retained with a 'K'. At any time they can select a 'Validate' option which will automatically tag any related classes and axioms and display the tagged classes in the class list. Additionally they can select a 'View' option which will pass the tagged classes to a graphing program to show the selected classes and relationships graphically. The graphing program can be a publically available graphing packages such as OntoGraf or the like.

Alternatively the user can open the starting class in the Class Display screen by clicking on the class in the Class List screen displayed by the browser module 1310. The user can then tag all the data properties which they wish to retain, plus any sub/super classes plus any classes specified in the object properties frame. This process can be performed iteratively by clicking on the link to any related class displayed. At any time the user can return to the Class List screen to Validate or View their progress.

Once the user has finished tagging the classes require for the pruned ontology, they return to the Class List screen and select the "Generate Ontology" option. This results in the pruned ontology being generated in the location specified in the application metadata. The tags can be saved to allow easy re-editing of the pruning process.

An example of pruning overlapping ontologies will now be described in more detail.

In this example, the user only specifies starting and end points from which to run the pruning process. The process proceeds as described in the multiple overlapping ontologies as described above.

Assuming that the application metadata parameters have been set to pause between shells the process will stop as each shell is completed. At this point the user can validate or view the automatically tagged items and may remove any tags that they recognise as irrelevant. Until a path connecting the starting and end points is established the view function will display two partial ontologies. By selecting a "Resume" option the program will start on the determination of the next shell.

At any time after one Path has been identified the process can be stopped. However alternatively, a number of different possible paths between the start and end points can be determined.

Once the specified end of processing conditions have been met the process stops and returns to the user with a status message which would include one of the following:
  Specified maximum shell depth reached. No paths found. Ontologies may be disparate (Failure).
  Specified maximum shell depth reached 'n' paths found 'rn' paths requested (Partial success).
  Specified number of paths found (Complete success).

The user may decide to extend the process by changing the completion criteria in the application metadata and selecting the Resume option. If the user is satisfied with the result they would select the "Generate Ontology" option. This results in the pruned ontology being generated in the location specified in the application metadata. The tags can be saved to allow easy re-editing of the pruning process.

If the user decides that the ontologies are in fact disparate then they would proceed as described below.

In this example, the user specifies starting and end points and a set of related bridging concepts from which to run the pruning process. They may have saved tags from an earlier attempt to prune and merge the ontologies.

By selecting a commence pruning option the process will start as described in as per the disparate ontology process described above. Assuming that the application metadata parameters have been set to pause between shells the process will stop as each shell is completed.

At this point the user can validate or view the automatically tagged items and may remove any tags that they recognise as irrelevant. Until a path connecting the starting and end points to one of the user defined bridging points is established the view function will display many partial ontologies, one for each user defined point and one for the starting and end points.

By selecting a resume option the process starts on the determination of the next shell. At any time after one path in the source ontology, and one path in the target ontology can be connected via the bridging classes the process can be stopped. However alternatively as many paths as possible between the start and end points can be determined.

Once the specified end of processing conditions have been met the process stops and returns to the user with a status message which would include one of the following:

Specified maximum shell depth reached. No paths found. Ontologies may be disparate (Failure).

Specified maximum shell depth reached 'n' paths found 'm' paths requested (Partial success).

Specified number of paths found (Complete success).

The user may decide to extend the process by changing the completion criteria in the application metadata and selecting the Resume option.

If the user decides that the ontologies are in fact still disparate then they would need to spend some effort in examining their bridging concepts. They may need to perform manual tagging to ensure that the paths meet.

If the user is satisfied with the result they can select a generate ontology option resulting in a pruned ontology being generated in the location specified in the application metadata. The tags can be saved to allow easy re-editing of the pruning process.

The Semantic Matcher Module

The semantic matcher module enables a mathematical value to be applied to the degree to which two concepts are similar when considered within a particular context. The name for this process is 'semantic matching' and it is of particular importance when trying to align the concepts in two ontologies. For example the words 'company' and 'organisation' in a business context do not have exactly the same meaning. All companies are organisations but not all organisations are companies. In fact the class companies are a subset of the class organisation. For example "This organisation is a listed company but that organisation is a golf club".

In a social context company is not related to organisation but may be related to a set of associates. For example "John Doe keeps bad company". A club and a company are both organisations so there is some similarity. A listed company and an unlisted company are also similar and share a common parent. Are they as conceptually close as a club and a company? What about a public unlisted company (>50 shareholders) and a private unlisted company (<51 shareholders)? Are they closer than a listed company and an unlisted company?

To give a mathematical basis to measure how similar two concepts may be we introduce the concept of 'sameness'.

There are a number of formulaic metrics. For example, the Levenstein distance (Levenshtein, 1966) counts the insertions and deletions needed to match two strings, the Needleman-Wunsch (Needleman, 1970) distance assigns a different cost on the edit operations, the Smith-Waterman (Smith, 1981) additionally uses an alphabet mapping to costs and the Monge-Elkan (Monge, 1996) uses variable costs depending on the substring gaps between the words. Moreover we used the Jaro-Winkler similarity, which counts the common characters between two strings even if they are misplaced by a "short" distance, the Q-Gram (Sutinen, 1995), which counts the number of tri-grams shared between the two strings and the sub-string distance which searches for the largest common substring. However, none of these have proved to be particularly effective.

Another common technique is to arrange the concepts in a single hierarchical tree with the concept of 'thing' as the root. Most Sameness formulae are functions of the number of concepts between those being measured and their common parent, and the distance to the root of the hierarchy.

However given the fact that the distance to the root of the hierarchy can differ significantly, depending upon the ontologist who built the ontology and whether the ontology has been pruned by the person using the ontology, the distance to the root is generally irrelevant.

In general, sameness is measured by the number of edges between concepts. Other possibilities exist based upon the number of data properties. For example, a club and a company may have "5" data properties each, the balance being held in the definition of an organisation, whereas a public listed company and a public unlisted company may only have one attribute each, the balance being held in the company definition. Thus a public unlisted company is more similar to a public listed company then a company is to a club ("2" attributes instead of "10", or in other words there is less difference and difference is equivalent to distance).

The concept of 'distance' is considered important. How far apart are two concepts? There are formulae based upon the number of concepts between those being measured and their common parent. If the distance is "1" then obviously one concept is a superclass of the other. However if the distance is "2" then they are either siblings or grandchildren. This is not a particularly useful fact.

There are some relationships between distance and sameness. Obviously if the distance is "0" then the sameness is "1.0", in other words, the concepts are identical, so in effect there is only one concept in this instance.

A good semantic matcher module should be able to calculate the sameness and distance of a match using any appropriate formula.

Given that there are many thousands of public and private ontologies describing every aspect of the scientific, engineering and business worlds. In order to align two ontologies it is necessary to determine whether there is a semantic match between the concepts in the two ontologies.

Currently the manipulation of ontologies defining linked concepts is confined to academics and professional ontologists. Definitions and names of concepts vary enormously depending upon context. In order to compare terms in and across ontologies we need to have some mechanism for examining the terms semantically. Are two concepts actually synonyms for the same thing or are they related in some other way. For example, organisations and companies have some attributes in common so there is some degree of sameness. All companies are organisations but not at all organisations are companies (Subsumption).

In another example the existence of fingers implies the existence of hands. Although they are not the same there is a relationship between them and the existence of one implies the existence of the other because one is a part of the other (Meronym).

Given any two concepts we would like to know how similar they are; i.e. Sameness 0 →1 where 1.0 implies they are identical, whether one is a subclass or superclass of the other (−1,0,1), and whether one is a part of another (−1,0,1).

The semantic matcher module includes a database of concepts, their meaning and relationships between them. It has tools for loading the concepts from ontologies, for manually editing the relationships between concepts and their definitions and for analysing concepts in a mathematically defined manner. These mathematically defined properties of concepts and their relationships can then be used in a variety of situations, such as aligning ontologies, as a dictionary and as a semantic concept matcher module.

The semantic matcher module concept finds synonyms, subsumptions (class hierarchy) and meronyms (part of) in a particular context (e.g. Medical, Business). It is initially loaded by parsing an ontology and obtaining the classes, their annotations, class structure and any 'part-of' Object properties. The class name is then used in something such as WordNet or Watson to determine the meaning and possible synonyms. The meaning is parsed into triples, as are any notations. The matcher module then looks for mathematical correspondences in the triples determine synonymity.

The semantic matcher module is a stand-alone process which either evaluates two lists of concepts, typically from two ontologies or else evaluates a single concept, matching this against reference terms to determine a meaning for the concept.

In the first instance the matcher module will pair each item in the first list with each item in the second list. Each pair i,j is then analysed to determine the following items:
The semantic similarity $S_{ij}$.
If The terms are synonyms then the similarity is $S_{ij}=1.0$.
If Antonyms then $S_{ij}=-1$.
If there is no relationship then $S_{ij}=0$
The subsumption relationship $Sub_{ij}$.
If $C_i$ is a subclass of $C_j$ then $Sub_{ij}=-1$.
If $C_i$ is a superclass of $C_j$ then $Sub_{ij}=1$.
else $Sub_{ij}=0$.
The meronym relationship $Mer_{ij}$.
If $C_i$ is a part off $C_j$ then $Mer_{ij}=-1$.
If $C_j$ is a part of $C_i$ then $Mer_{ij}=1$.
else $Mer_{ij}=0$.

In the second instance the matcher module takes a single concept and a context definition and produces a list of synonyms, sub and superclasses and meronyms for that concept in that context. If the context is not supplied the evaluation is performed across all contexts.

Some examples follow based upon the presumption that a medical ontology and a Human Resources Ontology have been defined to SemMatch:
SemMat(Party, Client, Business)=(1.0,0,0)
SemMat(Party, Individual, Business)=(0.25,1,0)
SemMat(Individual, Client, Business)=(0.25,−1,0)
SemMat(Car,Engine,Automotive)=(0.1,0,1)
SemMat(Car,Wheels,Automotive)=(0.1,0,1)
SemMat(Patient,Person,Medical)=(0.25,−1,0)
SemMat(Patient,Person,HR)=(0,0,0)
SemMat(Patient,Person)=(0.25,−1,0)
SemMat(Person, Medical)=Definition: A single human being
  Synonyms: Individual, Body
  SuperClass: Entity, Role
  SubClass: Patient, Practitioner, Performer
  Meronyms: −1, None
    +1, Organs, Limbs
SemMat(Person,)=Context: Medical
  Definition: A single human being
  Synonyms: Individual, Body
  SuperClass: Entity, Role
  SubClass: Patient, Practitioner, Performer
  Meronyms: −1, None
    +1, Organs, Limbs
SemMat(Person,)=Context: HR
  Definition: A single human being
  Synonyms: Individual
  SuperClass: Entity, Party, Involved Party
  SubClass: Employee
  Meronyms: −1, Family The two different usage methods will now be described in more detail with reference to FIGS. 18A and 18B.

Figure 18A:
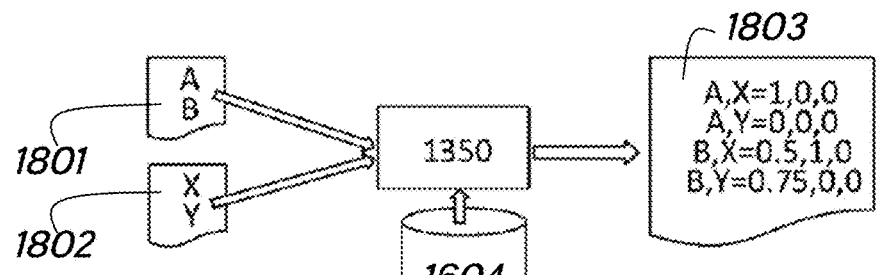
FIG. 18A is a schematic diagram of a first example of the functionality of the semantic matcher module of FIG. 13.

The Semantic Matcher module 1350 uses a Concept Matching Database 1604 to perform its evaluations. In the example of FIG. 18A, two lists of concepts 1801, 1802, such as ontology terms A, B and X, Y are received and then compared by the semantic matcher module 1350 to generate sameness scores 1803 for each possible pairing of ontology terms.

Figure 18B:
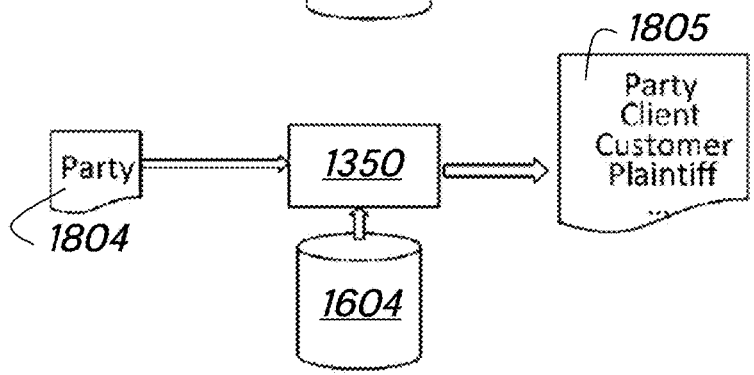
FIG. 18B is a schematic diagram of a second example of the functionality of the semantic matcher module of FIG. 13.
Figure 18C:
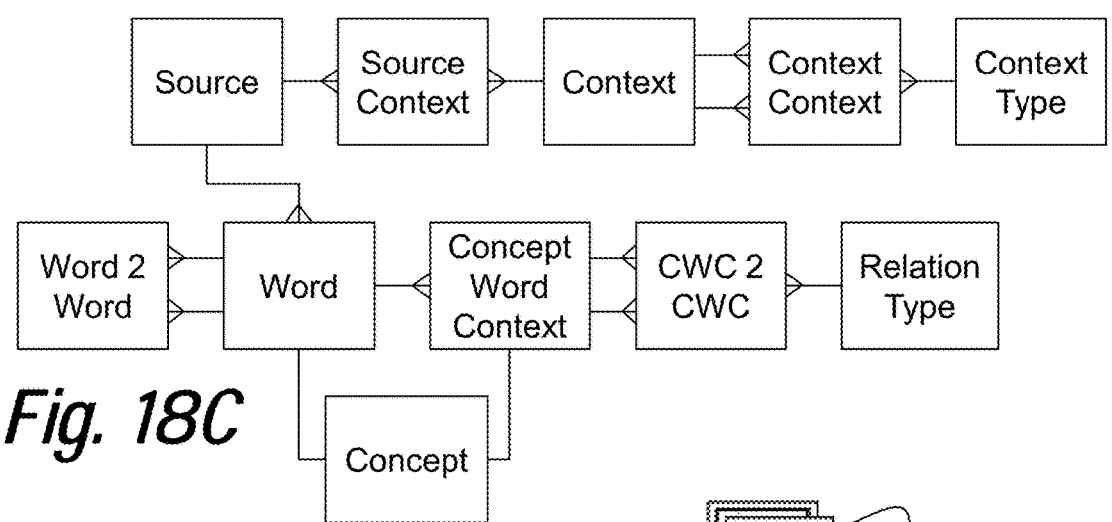
FIG. 18C is a schematic diagram of an example of relationships between tables.

In the example of FIG. 18B, a single concept, such as a single ontology term 1804 is received, and the semantic matcher module 1350 compares this to the concept matching database 1604 and returns a list of synonyms 1805.

The concept matching database (CMD) 1604 is constructed using the indexer module 1320. Before it can be used the database must first be loaded, which is typically it would be loaded by parsing an ontology based upon the context of interest. The database can be updated by the user at any time to add new contexts.

The CMD 1604 contains a number of tables as defined in Table 8, with the relationships between the tables being shown in 18C.

TABLE 8

| Table | Column | Description |
|---|---|---|
| Word | Word | The name of a concept from a particular source. |
| | Word_ID | An automatically generated unique computer key. |
| | Meaning | A paragraph defining the meaning of this version of the word. |
| | Meaning_RDF | The meaning above transformed to RDF triples. |
| | Source_ID | The Ontology from which the word was sourced. |
| Ccpt_W_Ctext | Word_ID | An automatically generated unique computer key |
| | Concept ID | An automatically generated computer key which is updated to ensure that synonyms all have the same key. |

TABLE 8-continued

| Table | Column | Description |
|---|---|---|
| | Lemma | Boolean switch showing whether the word is the main root word for synonyms. |
| | Context_ID | Foreign key identifying context. The context in which the concepts have these meanings and synonyms. |
| Concept | Concept | A concept name. It may be more than one word. For example 'Involved Party'. |
| | Concept ID | An automatically generated computer key which is updated to ensure that synonyms all have the same key. |
| Context | Context | Name of a context. Typically the name of an ontology e.g. SNOMED CT, HL7 RIM. |
| | Context_ID | An automatically generated unique computer key. |
| ContextSource | Context_ID | Foreign key identifying context. |
| | Source_ID | Foreign key identifying source. |
| Source | Source_ID | An automatically generated unique computer key. |
| | Address | Typically the URL/URI of the site from which the ontology use to load the database was obtained. |
| Relation Type | Relation_Type_ID | An automatically generated unique computer key. |
| | Name | The name of the Object Property used in the relationship between the two CWCs e.g. 'subclassof' or 'ispartof'. |
| | Description | A description of the Object Property e.g. subsumption, meronym. |
| Meronyms | CCW_ID_P | The input concept key |
| | CCW_ID_C | The concept key of the concept of which the input concept key is a part i.e. Concept_ID is part of Part_of_ID. |
| | Relation_Type_ID | The concept key of the concept of which the Includes_ID concept key is a part i.e. Includes_ID is part of Concept_ID. |
| Word to Word | Word_ID_P | The parent word key. |
| | Word_ID_C | The child word key-a synonym from a different source, typically Wordnet. |

Figure 18D:
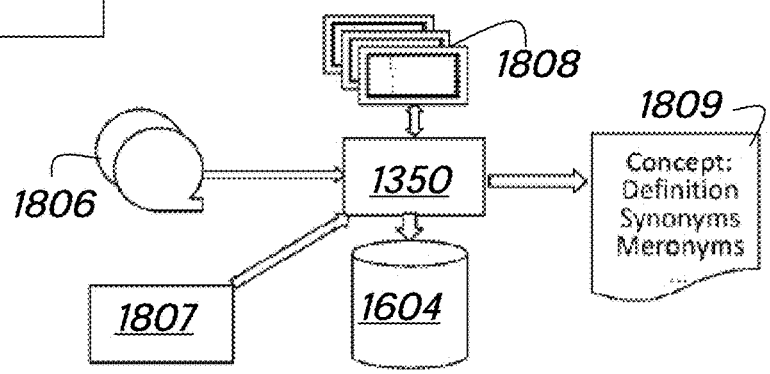
FIG. 18D is a schematic diagram of a third example of the functionality of the semantic matcher module of FIG. 13.

The load mechanism will now be described in detail with reference to FIG. 18D.

Initially, an overall context of the ontologies 1801 to be loaded is determined and entered into the Context table with an ID of 1. For example, if medical ontologies are loaded, the context would be identified as "medical".

An example of the ontologies in this category and the context name for each as shown below:
Adverse Event Reporting Ontology AERO
African Traditional Medicine Ontology ATMO
Allen Brain Atlas (ABA) Adult Mouse Brain Ontology ABA-AMB
Alzheimer's disease ontology ADO
Amino Acid Ontology AMINO-ACID
Amphibian Gross Anatomy Ontology AAO
Amphibian Taxonomy Ontology ATO
Anatomic Pathology Lexicon PATHLEX
Anatomical Entity Ontology AEO Each of these ontologies has a source which will be loaded into the Source table thus allowing the Source 2 Context table to also be loaded.

Next, the following information is extracted and parsed from each of the ontologies:
Classes
Object Properties
Annotations
Labels As all words are coming from one ontology the Context_ID is known. Each Class becomes a Word in the Word table. The Annotations are loaded as the Meaning in the Word table. Temporary tables are created relating Word_ID 2 Context_ID with lemma (root meaning) and Concept, both set to null, and Class2Object-Property2Class with Word_IDs for each class and Concept_ID set to null.

Following this, the extracted classes and their annotations are then loaded into Word table. Each Class becomes a Word. Each Word is assigned with a unique Word_ID and a class annotation becomes the Meaning in the Word table. As all words are coming from one ontology the Context_ID is known as previously described.

Temporary tables are created relating Word_ID2Context_ID with lemma and Concept, both set to null, and Class2Object-Property2Class with Word_IDs for each class and Concept_ID set to null.

For each context, the first step is to match each word to a meaning and synonym obtained from a standard dictionary, such as the WordNet 1802. Any unmatched words are then matched against words from other contexts to identify synonyms. These steps are now described in more detail.

Each word in the Word table is passed to WordNet 1802 to obtain a meaning and potentially the root word or lemma for the group of synonyms or lexeme, based upon that Word. The WordNet meaning is lexically compared with the meaning derived from the annotation.

This is done by converting the meaning to RDF triples and evaluating the triples. This process is described in more detail below.

If the meanings match then the Wordnet Word and Meaning are loaded into the Word table with a new Word_ID. The new Word_ID is assigned to Word_ID_C and the original Word_ID is assigned to Word_ID_P both are then loaded into the Word2Word.

The Word_ID2Context_ID table is loaded with the Word_ID assigned to the Wordnet Lemma as the Word_ID and the same Context_ID as the related Word_ID, which was loaded as the Word_ID_P. The Word_ID2Context_ID table has only two columns lemma and concept. So the lemma is assigned with new Word_ID_C and concept is assigned from Word_ID_P.

Finally the Class2Object-Property2Class is loaded with the Word_ID information from Wordnet 1802.

All words for which a Lemma was defined are then loaded into the Concept table. The Word_ID2Context_ID can now be updated with known Concept_ID and Lemma and used to load the Concept_Word_Context table resulting in the CWC_ID being assigned to each Concept and Word used in the named Context. The CWC_ID can be used to identify the words in the Class2Object-Property2Class and together to populate the CWC2CWC table and the Relation_Type table.

A second pass of the Word table examines the meanings of every word for which there is no related lemma, by syntactically comparing the meaning with the meanings of words in the other contexts. The Word_ID of the first meaning to match is chosen as the lemma. The process then continues as for Wordnet identified lemmas.

A third pass simply identifies each word which is not related to a lemma as being a lemma. At the completion of these three passes every word will have been identified in every possible context in the concept table 1809.

Following this a sameness value is calculated. If the full ontology were known then the calculation of Sameness could be performed by matching the attributes (Data Properties) of the concepts being compared. The attribute list would of necessity include the attributes of the superclasses of the concepts.

In the current example sameness is calculated by analysing the meaning of two words. The meaning in English is converted to rdf triples of the form Subject Predicate Object (spo). This is done using a Natural Processing Language (NLP) to RDF converter. (Arndt & Auer, 2014) (Augenstein, et al., 2013).

For example—a club has meaning "A type of organisation which has members, not shareholders and exists to meet some vocational need of its members" could be converted as shown in Table 9 below.

TABLE 9

| Subject | Predicate | Object |
|---------|-----------|--------|
| Club | Is a | Organisation |
| Club | Has | Members |
| Members | Have | Need |
| Needs | Are | Vocational |
| Club | Meets | Needs |

An organisation is a concept which is defined as follows "An organisation is a collection of individuals with an agreed reason for being their collection", which could be converted as shown in Table 10.

TABLE 10

| Subject | Predicate | Object |
|---------|-----------|--------|
| Organisation | Is a | Collection of individuals |
| Organisation | Has | Individuals |
| Individuals | Have | Agreed Reason for Being a Collection |

Inserting the Organisation definition into the Club definition we obtain the definition shown in Table 11.

TABLE 11

| Subject | Predicate | Object |
|---------|-----------|--------|
| Club | Is a | Organisation |
| organisation | Is a | Collection of Individuals |
| organisation | Has | Individuals |
| Club | Has | Members |
| Members | Have | Needs |
| Needs | Are | Vocational |
| Club | Meets | Needs |
| Individuals | Have | Agreed Reason for Being a Collection |

However we cannot infer that a member is an individual. Analysis of this can be used to determine that:
A Member of a Club is an Individual. This could have been inferred if the Membership concept had the Object Properties more correctly defined as Member is An Individual instead of Individual Holds Membership.
The agreed reason for being a collection is to meet vocational needs.

Applying the same process to a Qango in the example ontology described above we would obtain from the Meaning that a Qango is "an organisation created by a government to meet a specified government need", leading to the triples shown in Table 12.

TABLE 12

| Subject | Predicate | Object |
|---------|-----------|--------|
| Qango | Is a | Organisation |
| Organisation | Is a | Collection of Individuals |
| Organisation | Has | Individuals |
| Qango | Created By | Government |
| Government | Has | Need |
| Qango | Meets | Need |
| Individuals | Have | Agreed Reason for Being a Collection |

This can be used to construct a comparison table based upon common predicates and objects as shown in Table 13.

TABLE 13

| Predicate Object | Club | Qango |
|------------------|------|-------|
| Is A organisation (+2 other organisational matches) | Y | Y |
| Created by Government | N | Y |
| Meets Needs | Y | Y |
| Specified by Government | N | Y |
| Specified by Members | Y | N |

This allows a formula for sameness to be used based upon the following factors.
Number of triples for concepts of Club and Qango are denoted by N1 and N2 respectively where N1=9 and N2=7.
Number of shared predicates (SP) between the two concepts Club and Qango is 5, i.e. SP=5.
Number of shared predicate object (SPO) pairs between the two concepts Club and Qango is 4, i.e. SPO=4.
For example:
Sameness=SPO/SP=4/5=0.8 OR
Sameness=(SP+SPO)/(N1+N2)=9/16=0.5625
The actual formula used is irrelevant. The important fact is that we can derive a formula which gives a measure of Sameness.

It will be appreciated that throughout this process the user can interact with the semantic matcher module using screens 1808, typically displayed by the browser module.

Aligner Module

The need for ontology alignment arises out of the need to integrate heterogeneous databases, ones developed independently and thus each having their own data vocabulary. In the Semantic Web context involving many actors providing their own ontologies, ontology matching has taken a critical place for helping heterogeneous resources to interoperate. Ontology alignment tools find classes of data that are "semantically equivalent", for example, "Truck" and "Lorry". The classes are not necessarily logically identical.

The result of an ontology alignment is a set of statements representing correspondences between the entities of different ontologies. This may be expressed in the purpose built language 'Expressive and Declarative Ontology Alignment Language' (EDOAL) (David, et al., 2013) or other languages (ZIMMERMANN, et al., 2006).

The first requirement is to determine if there is a semantic match between the concepts in the ontologies being aligned, which can be determined using the semantic matcher module described above. For example the words 'company' and 'organisation' in a business context do not have exactly the same meaning. All companies are organisations but not all organisations are companies. In fact the class companies is a subset of the class organisation. For example "This organisation is a listed company but that organisation is a golf club". In a social context company is not related to organisation but may be related to a set of associates. For example "John Doe keeps bad company".

A club and a company are both organisations so there is some similarity. A listed company and an unlisted company are also similar and share a common parent viz. company. Are they as conceptually close as a club and a company? What about a public unlisted company (>50 shareholders) and a private unlisted company (<51 shareholders)? Are they closer than a listed company and an unlisted company?

To give a mathematical basis to measure how similar two concepts may be we introduce the concept of 'sameness'. There are a number of formulaic metrics for sameness. The most common technique is to arrange the concepts in a single hierarchical tree with the concept of 'thing' as the root. Most formulae are functions of the number of concepts between those being measured and their common parent, and the distance to the root of the hierarchy.

However given the fact that the distance to the root of the hierarchy is can differ significantly, depending on the ontologist who built the ontology and whether the ontology has been pruned by the person using the ontology, the distance to the root is probably irrelevant.

In general, sameness is measured by the number of edges between concepts. Other possibilities exist based upon the number of data properties. For example, a club and a company may have 5 data properties each, the balance being held in the definition of an organisation, whereas a public listed company and a private listed company may only have one attribute each, the balance being held in the company definition. Thus a private listed company is more similar to a public listed company then a company is to a club (2 attributes instead of 10, or in other words there is less difference and difference is equivalent to distance).

A Putative Ontology (PO) is an ontology created from a structured source, typically a relational database, an xml file or a spread sheet. Such an alignment may have some very complex mappings in which data instances in the putative ontology map to classes in the full ontology. This is a special case of alignment.

Figure 19A:
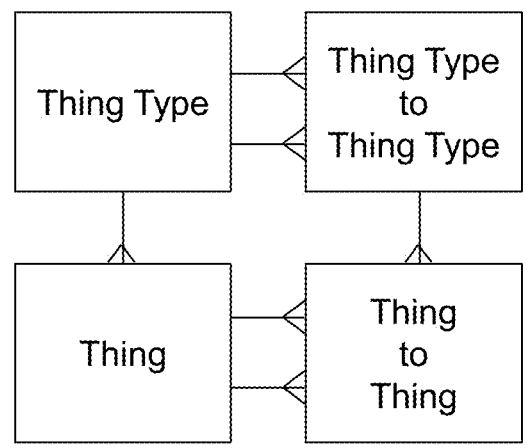
FIG. 19A is a schematic diagram of an example of a "thing database"

A simple example will now be described with reference to FIG. 19A, which shows a "Thing Database", which is an example of a totally denormalised data structure as it can contain the metadata (and hence structure) as well as the data within four tables.

For example, if the Thing Type table contains a Thing Type of 'Class', then every related row in the Thing table would contain the name of a class. The relationship between classes would be defined in the 'Thing to Thing' table where the 'Thing Type to Thing Type' specifies the type of relationship.

In ontological terms, any Type table can give rise to a set of classes. Consider a table containing details of a set of vehicles. A vehicle type table could have been used to ensure that only valid types of vehicles are included. For example Cars, trucks, tractors but not prams, bicycles, ships. Ontologically, we could then have a separate class for each type of vehicle specified in the Vehicle Type table. This concept can be generalised but is not always appropriate. It could result in every personnel table being split into male and female classes! Consequently the program should identify every situation in which hidden classes contained in the data can be exposed and present them to the user for validation.

In some cases the Type table may contain many types of types. For example Concepts, Data Properties and Properties of Data Properties, such as Vehicles, trucks, Cars, engine type, weight, kilograms. This could be shown as:

Car has engine type diesel
Car has weight 2000
Weight has Unit of Measure kilograms
Car is subclass of Vehicle An example of the thing database will now be described assuming the database is populated as shown in Tables 14 to 17.

TABLE 14

| Table | Thing | |
|---|---|---|
| ID | Name | Thing Type ID |
| 1 | Fingers | A |
| 2 | Hand | A |
| 3 | Person | A |
| 4 | Living Organism | A |
| 5 | Organisation | B |
| 6 | Individual | B |
| 7 | Client | B |

TABLE 15

| | Thing to Thing | |
|---|---|---|
| Table Thing ID_P | Thing_ID_C | Thing Type to Thing Type ID |
| 1 | 2 | Aa |
| 2 | 3 | Aa |
| 3 | 4 | Aa |
| 3 | 6 | Cc |
| 6 | 7 | Bb |
| 5 | 7 | Bb |

TABLE 16

| Table ID | Thing Type Name |
|---|---|
| A | Organic Structure |
| B | Business Component |

TABLE 17

| Table | Thing Type to Thing Type | | |
| --- | --- | --- | --- |
| ID | Thing_Type_ID_P | Thing_Type_ID_C | Name |
| Aa | A | A | Is Part of |
| Bb | B | B | Is a |
| Cc | A | B | Is the same as |

Figure 19B:
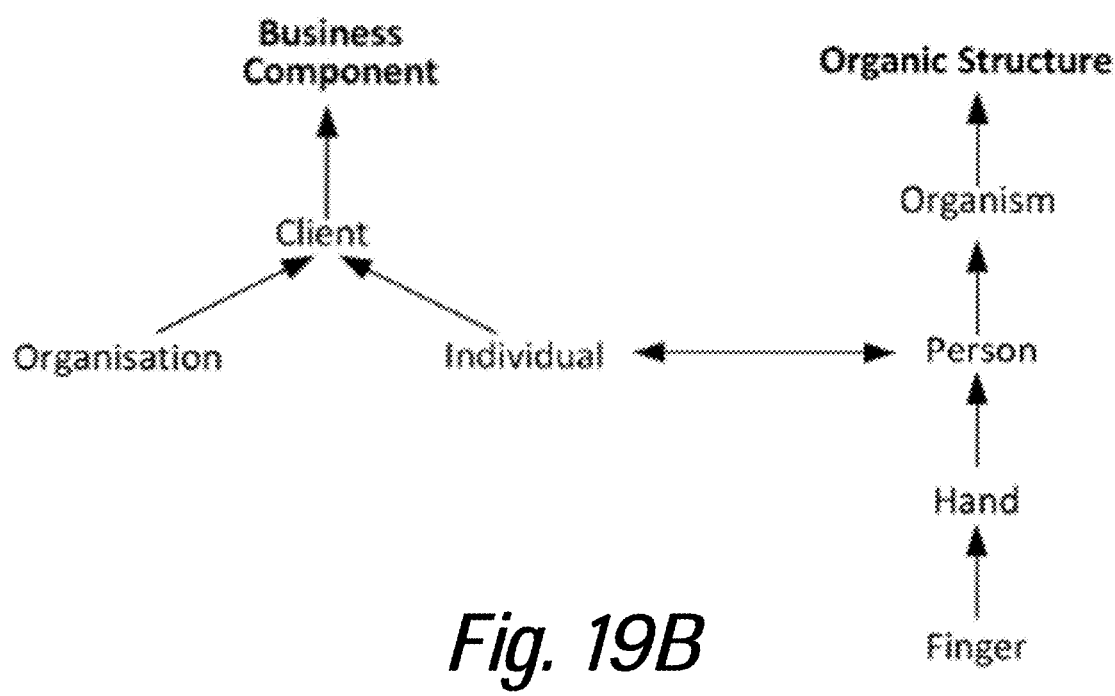
FIG. 19B is a schematic diagram of an example of a framework for unifying disparate sources.

A putative Ontology based on the Relational Schema would only show four classes with names related to the table names. However, an ontology based upon the data would show eight classes based upon the names in the 'Thing' and 'Thing Type' tables, plus all the Object Properties identified in the other two tables, as shown in FIG. 19B. In this example, the "business component" and "organic structure" terms are obtained from the thing type table (Table 16), whereas the remaining terms are obtained from the thing table (Table 14).

This is an example of the problem where the classes in one ontology match to data instances in another ontology. For clarity this is identified as a 'Putative Mapping Problem' (PMP). It can manifest during alignment when the putative ontology has data properties with names matching 'Primary Key' or 'Foreign Key', or a class with multiple instances of the same foreign key, as in 'Parent' and 'Child' (BOM) or a class with an associated type class. These examples potentially disguise a Class hierarchy hidden in Data Instances!

A common alignment technique is to arrange the concepts from each ontology into two hierarchical trees, each with the concept of 'thing' as the root. The mathematical concept of 'Distance' is then introduced to give some mathematical mechanism for determining alignment. Most Distance formulae are functions of the number of concepts between those being measured and their common parent, and the distance to the root of the hierarchy.

However given the fact that the distance to the root of the hierarchy can differ significantly, depending upon the ontologist who built the ontology, whether the ontology has been pruned by the person using the ontology, and whether there is a 'top' ontology acting as a conceptual umbrella, the distance to the root is probably irrelevant.

The ontology aligner module looks for common concepts in multiple ontologies and maps the concepts from one ontology to the other thus allowing the two ontologies to be treated as one ontology. Using the alignment it is also possible to merge the two ontologies although this is a risky process and is not generally recommended due to the potential for semantic mis-match propagation.

In general no ontology is perfect. For example there are many modelling errors in the sample ontologies used here. It is obvious that 'Shares' should be 'Owned' by 'Clients' rather than 'Individuals' and that 'Work History' should be 'Employed' by 'Client' rather than 'Company'. Both these instances show that the relationship is moving from a more restrictive relationship to a less restrictive relationship. Although that would be possible in these cases it would probably be invalid to move membership of a club from an 'Individual' to a 'Client'.

The class 'Membership' is also badly named as the relationship between Membership and Individual is 'Holds'. If the Class had been named 'Member' then the relationship would have been is A'. This would have allowed the Member to inherit the Properties of an Individual. Unless the Object Property 'Has' is fully defined then it use in inferencing is restricted.

These errors were introduced to the samples to illustrate some of the complexities of alignment.

Figure 19C:
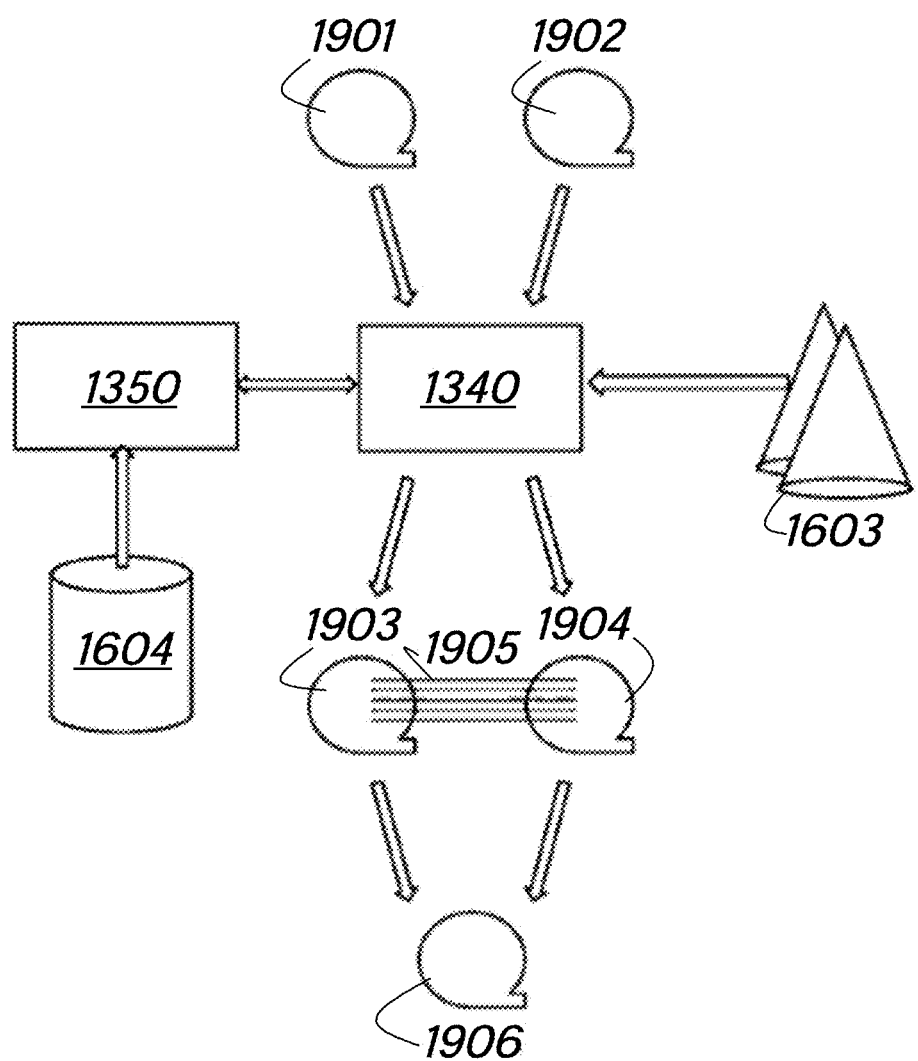
FIG. 19C is a schematic diagram of an example of the functionality of the aligner module of FIG. 13.

Operation of the aligner module will now be described in more detail with reference to FIG. 19C.

In this regard, in use, ontologies 1901, 1902 defined in OWL and RDFS files are opened using the aligner module 1340, with the user then interacting with the ontology using a set of screens as defined below, ultimately resulting in ontologies 1903, 1904 connected by a series of alignments 1905 and potentially a merged aligned ontology 1906.

The process consists of a number of sub processes, including:
Initialisation.
Low level Class matching—identifies minimal mappings.
Putative Mapping Problem Identification.
Object Property Analysis.
Data Property Analysis.
Multi Class mappings.
PMP resolution.
Sibling Analysis.
Minimal mapping resolution.

Because an alignment can be identified in many steps there is the potential to recalculate the alignment for a particular pair of concepts. This problem is overcome by maintaining an Alignment Map. This map is updated every time an alignment is identified and is consulted by the program before a new alignment pair is considered for evaluation to prevent duplication of effort. The Alignment Map can be displayed to the user enabling them to follow the alignment process, query and override any potential alignment and instruct the program to re-perform any process.

These steps will now be described in more detail. Each step i can be assigned a weighting factor Wi, with the results being combined to provide an overall alignment score. These weighting factors are applied at certain steps. A possible Weight Accumulation formula is given, but there are many possible weighting schemes that could be used. This is an area where machine learning or statistical analysis and inferencing can be used to determine suitable weighting formulas.

During the initialisation process, an index 1603 is obtained from the Indexer module. Following this the ontologies 1901, 1902 are loaded into the semantic matcher module 1340. When the alignment table has not been pre-loaded then $W_0=0.0$.

In the following examples $W_i=i$ for illustration of the technique. Otherwise the weights W, are assigned by the user or a heuristic mechanism determined by machine learning or experience. In general for any step i the accumulatively determine Match Value MVA is determined by:

$$MV_i^A = MV_{i-1}^A/W_i + (W_i-1)*MV_i/W_i$$

where $MV_i$ is the raw Match Value calculated in step i
Another, more traditional weighting scheme would be $$MV = \Sigma MV_i * W_i / \Sigma W_i$$

where MV is the weighted match value and MV, is the match value at step i

This process could be performed at each step or only at the end of the procedure, depending on the preferred implementation.

Next, class matching is performed on the basis of the semantic meaning of terms in the ontologies. This process examines each potential alignment pair using the semantic matcher module to find a potential match based on the class name. If it finds an alignment it then traverses the inheritance chains (Object Property='SubClassof') from that alignment, checking the class names for another alignment using the semantic matcher module.

This may only require a small number of matches although it is possible to find all matching classes. A complete 1-1 match is possible if the ontologies being matched are using the same basic ontology. For example:

Adverse Event Reporting Ontology AERO

African Traditional Medicine Ontology ATMO

Both are based on the standard Galen ontology so one would expect a 1-1 match.

MV for each pair is based upon the score provided by the semantic matcher module and Set $W_1=1.0$ for purposes of this example.

Starting at the root of the first Ontology, examine each class starting at the root class of the second ontology. A match occurs when the sameness found using the semantic matcher module for the concept pair exceeds the threshold Match Value for alignment (MVAT). If an acceptable match is found it is called a potential alignment and the details are recorded in the alignment map.

The alignment map records the two concepts, assigns an alignment Id, a minimal map Id, any tags associated with the alignment, any PMP Id assigned, any enrichment Id and the last processing step Id. A separate table, related on the Alignment Id stores the Match Value for each step. These values can be manually overridden if desired.

The alignment map may be pre-loaded with any known alignments. These are tagged with a user tag 'User Initiated' and the Match value must be set, generally to 1.00 although lower values are possible. The combination of 'User Initiated' and MV=1.00 will prevent further processing of this alignment.

The process continues to the next class related to the current class in the first Ontology by an Object Property. Superclasses of the current class are processed first. The program processes Inheritance Object Properties before other Object Properties. Superclasses of the current class are processed before any subclasses are examined. The process stops as soon as an alignment with MV<MVAT. is found.

Each time a potential alignment is identified it is assigned to a minimal mapping set and given a minimal map Id mm_ID. If a hierarchically related class is identified it is added to the same mm_ID. At the end of this step we will defined have a number of minimal maps which potentially meet the criteria of minimal mapping. This cumulative match value is refined at each succeeding step.

The recognition of a potential PMP is always performed. PMP resolution is only performed if requested in a configuration file. If not requested the recognition of the potential PMP is recorded in the activity log created as the alignment is performed as an Information Message and is added to the cumulative statistics report.

In some instances it may not be desirable to resolve the PMP as both ontologies may be putative ontologies and it may be desirable to retain the BOM structure.

If PMP resolution was requested then PMP tagging is performed. The Data Property names are examined for the existence of key words such as:

Object Property names contain:
  Type
  Relation
  Class
  Concept
  . . .
Data Property names contain:
  Identifier
  ID
  Key
  Parent
  Child
  Primary Key
  Foreign Key
  . . .

The existence of data properties containing these key words does not necessarily imply a PMP. Further algorithms need to be applied to be certain. Any structure which maps to a standard.

'Type' table in ERA diagrams must be identified. The user must select each row in the type table which is to be.

'Bill of Materials' structure must be identified and potentially expanded into the appropriate class structure.

At this stage the classes involved in each PMP are tagged as 'PMP' and given a PMP-set-identifier PMP01, PMP02, . . . for each set of equivalent BOM tables. They are resolved later on, as will be described in more detail below. As each PMP class is identified the details may be presented to the user who may decide that that instance is not a PMP. No MV is calculated for this step so $MV_2^A=MV_1^A=0.5$.

Following this, object properties and their related classes associated with the each alignment pair from the previous steps are analysed. This step is sometimes called 'Structural Analysis'. This will identify:

If the names of all the related classes and the Object Properties match then tag the pair as an "Anchor Point". MV=1.0. Add the related classes to the minimal map if they are not already there and repeat step 2 Data Property Analysis for the related classes in that Minimal Map If the name and related super class match but not any of the subclasses then tag the pair as "Possible Siblings". MV=0.3. Add the Super class to the Minimal Map. Go to multi class mappings below.

If the name and related super class match but only some of the subclasses match then tag the pair as "Related subset".

MV is calculated as follows:

Assign weights of 2.0 to each matching subclass and 1.0 to each other matching related class.

Sum these weights as the Number matching $N_M$

Assign weights of 1.0 to each subclass and 0.5 to each other related class.

Sum these weights across both superclasses as the Total Number NA

The Match Value $MV_3=N_M/N_A$

If no related classes match then the $MV_3=0.001$

Add the Super class to the Minimal Map. Go to multi class mappings below.

For each pair calculate the cumulative weighted Match Value as below:

$$MV_3^A=MV_2^A/W_3+(W_3-1)*MV_3/W_3$$

Assume $W_3=3$ $MV_2^A=0.5$ from previous example $MV_3=1.0$ from Object Property match Then $MV_3^A=0.5/3+2/3*1.0=0.83333$ Following this, data property analysis is performed to analyse whether the data properties (attributes) of matching classes are similar. The analysis, for each pair of classes:

Compare the Data Properties for each class using SemMat where there is no exact name match.

Assign a "Match value" (MV) based on the Data Properties.

Tag the alignment pair with a match type. Select the next pair in the minimal map and repeat the processes above.

If there are no more alignments within the minimal map, move to the next minimal map.

In more detail, if A={$a_1$, $a_2$, $a_3$, . . . $a_i$} is a set of Data Properties of the first concept and B={$b_1$, $b_2$, $b_3$, . . . $b_j$} is a set of Data Properties of the second concept then the following possibilities exist:

All Data Properties in the classes match. Tag as "Exact Match" i.e. $\forall a \in A \equiv \forall b \in B$ Match Value=1.000

A subset of Data Properties from one ontology match all the Data Properties in the other ontology. Tag as "Subset"

i.e. $A \subset B$ or $\forall a \in A \equiv \exists b \in B$ $MV_i = (N(A \cap B)/N(B))^{0.5}$ where N(A) is the number of Data properties in A, assuming N(A)<N(B)

A subset of Data Properties from one ontology match a subset of Data Properties in the other ontology. Tag as "PartMatch"

i.e. $\forall a \in A \equiv \exists b \in B$ $MV_i = N(A \cap B)/N(B)$ where N(A) is the number of Data properties in A, assuming

N(A)<N(B)

No Data Properties match. MV=0.1, Tag as "NameOnly"

i.e. $\forall a \in A \not\equiv \forall b \in B$

If MV is less than a predetermined threshold, (default value=0.1) then discard that match pair from the Minimal Map and proceed with the next match pair. This process is repeated until all minimal maps have been analysed, at which point a matching value is calculated:

$$MV_4^A = MV_3^A/W_4 + (W_4-1)*MV_i/W_4$$

Assume $W_4=4$ $MV_3^A=0.833333$ $MV_4=1.0$ from Data Property match

Then $MV_4^A=0.8333/4+3/4*1.0=0.9583$

Multi class mappings occur when the class in on ontology has been split into a number of subclasses in another ontology. In such cases we would expect the pair to be have already been tagged as either "Possible Siblings" or "Multi Class Mappings" and "Subset".

The multiclass mapping is usually detected by analysing the number of Data Properties for the potentially related classes in the class and sub classes in each ontology. If the ontology class which does not have a subclass has the number of Data Properties approximately equal to the class in the other Ontology plus the Data Properties of the sub-class with the most Data Properties then it is probable that the sub classes of the class in the second ontology have been denormalised into the class in the first ontology.

There are the following possible scenarios:

The Data Properties in single class in one ontology maps to the Data Properties in a class and subclass or subclasses in the other ontology.

The Data Properties in a class and subclasses match to the Data Properties in a class and some subclasses in the other ontology.

In the first case the Data Property count is performed by considering matching the Data Properties of the first ontology class with the Data Properties of each pair composed of Class+Subclass in the second ontology.

For example, Company in Ontology 1 has no children, and 2 children in Ontology 2. If analysing the Data Properties of company (1) with Company+Listed Company (2) shows that the number of Data Properties match but not all the meanings.

Analysing the Data Properties of company (A) with Company+Unlisted Company (B) shows that both the number and meaning of Data Properties match. This can be tagged as 'Different Normalisation' and assigned a matching value MV=1.0.

Because the Listed Company and Unlisted Company are siblings it is possible to infer that the Listed Company is an enrichment in ontology 2 so it can be tagged as 'Enrichment' and the matching value calculated by dividing twice the number of matching Data Properties by the total number of Data Properties.

$$MV_i = 2*N(A \cap B)/(N(A)+N(B))$$

where N( ) is the function to produce the number of Data properties in concepts A, B and $A \cap B$ This method can be generalised to the situation where the two classes have a different number of children. This situation can be tagged as 'Enrichment Possible' and each class involved is given a single enrichment ID.

Another case of multiclass mappings is when classes have been normalised differently. For example, a Vehicle class could be subclassed as (SUV, Sedan, Coupe, Convertible) or it could be subclassed by manufacturer (Citroen, Peugeot, Fiat, Rover). Thus two vehicle ontologies could parse the data properties differently. However, the attributes of vehicles would be identical in the two ontologies.

In the general case, if a set of Data Properties are assigned to a set of sub Classes from two ontologies, and the sub Classes are different in each ontology but the set of Data properties defining these classes are either identical or very similar, then there is a many to many mapping between the subclasses defined. This is also tagged as 'Enrichment Possible' and each class involved is given a single enrichment ID.

No MV is calculated for this step so $MV_5^A=MV_4^A=0.9583$.

PMP resolution involves identifying additional classes in putative ontologies by identifying denormalised classes stored in tables, and results in a major enrichment of the ontology from which it was derived.

Each PMP-set-identifier is analysed to determine its mapping to a Type structure or a BOM structure as described above. These generally map to some arrangement of the ERA diagram shown in FIG. 19A, as is determined by mapping only the Object properties with the matching structural relationships in that diagram. An example of extracted classes from Data Property instances is shown in Tables 14 to 17.

Once the mapping is determined it is a relatively simple matter to generate the denormalised ontology captured in the BOM structure. This generated ontology component can then be aligned by returning to the step of low level class matching based on the semantic meaning of the classes as previous described. In this step the Classes generated from the BOM analysis will be added to the appropriate minimal maps.

No MV is calculated for this step as it results in the return to the step of low level class matching and the recalculation of the MV values for the newly identified classes.

Following this enrichment analysis is performed, with each enrichment_ID identified in the multi class mappings process being analysed to determine whether the subclass sets from the two ontologies match or contain siblings. For example ontology 1 class organisation may have sub classes Club and Company. Ontology 2 contains Qango, Club and Company. Qango is a sibling in Ontology 2 but does not appear in ontology 1. Rather than say the Qango does not align with anything it would be better to identify it as an enrichment to Ontology 1.

Before the enrichment can be applied it would necessary to determine whether the Qango has been denormalised into one of the other subclasses by analysing the Data Properties of Club and Company.

Assuming that the class meets the criteria to be added as a sibling it should be possible to ensure that the minimal maps containing the class and subclass are identical at this stage.

No new MV is calculated for this step. Each sibling retains its current MV. This MV could be raised by a small factor by assigning a current MV of 1.0 to components identified as siblings.

Once all classes are resolved and enrichment completed, any major restructuring should have already occurred and accordingly, minimal maps can be resolved. Further restructuring occurred if enrichments were added in the previous section. Both these facts would result in improve minimal mappings.

Alignments with $MV_7 < MV_{AT}$ the threshold would be rejected. $MV_{AT}$ is the Match Value threshold for alignment.

The next step is to apply redundancy recognition patterns, so that, within each Minimal Map, redundancy, disjointedness and subsumption is determined. This will have largely been performed already by the preceding steps.

Once the Minimal Map has been fully processed it is recorded along with its classes as a set of RDF triples.

Finally the Minimal Maps must be assembled into a single map by querying the RDF triple generated above. This will be a map of all the classes for which an alignment with acceptable threshold value was found. There may be unaligned items.

Using the cumulative matching formula the final match value $MV_8 = 0.9375$.

Using the linear matching formula $MV = (1*0.5 + 2*1 + 3*1)/(1+2+3) = 5.5/6 = 0.9167$.

An example alignment index is shown in Table 18, which shows an alignment map for the example ontologies described above. The results have been sequenced by alignment pair and step number to highlight the effects of the various algorithms. In reality they would be performed in the # sequence (Column 1).

TABLE 18

| # | Ontology 1 | Ontology 2 | Align Id | Mini Map | Tags | | Step | MV | Cum MV |
|---|---|---|---|---|---|---|---|---|---|
| 4 | Club | Club | 4 | 1 | Exact Match | 1 | SemMat | 1.0000 | 1.0000 |
| 11 | Club | Club | 4 | 1 | Anchor Point | 2 | Obj Prop | 1.0000 | 1.0000 |
| 18 | Club | Club | 4 | 1 | Exact Match | 3 | Data Prop | 1.0000 | 1.0000 |
| 27 | Club | Qango | 11 | 1 | Possible Match | 1 | SemMat | 0.5000 | 0.5000 |
| 28 | Club | Qango | 11 | 1 | Related Subset | 2 | Obj Prop | 0.8000 | 0.6500 |
| 29 | Club | Qango | 11 | 1 | Subset | 3 | Data Prop | 0.5000 | 0.5500 |
| 30 | Club | Qango | 11 | 1 | Sibling | 4 | Multi Class | 0.5000 | 0.5125 |
| 5 | Company | Company | 5 | 1 | Exact Match | 1 | SemMat | 1.0000 | 1.0000 |
| 12 | Company | Company | 5 | 1 | Subclass Mismatch | 2 | Obj Prop | 0.0001 | 0.5000 |
| 19 | Company | Company | 5 | 1 | Subset | 3 | Data Prop | 0.7072 | 0.6381 |
| 25 | Company | Company + Listed Company | 9 | 1 | Different Normalisation | 4 | Multi Class | 0.5000 | 0.5000 |
| 26 | Company | Company + Unlisted Company | 10 | 1 | Different Normalisation | 4 | Multi Class | 1.0000 | 1.0000 |
| 22 | employment | Work History | 8 | 2 | Possible Match | 1 | SemMat | 0.0010 | 0.0010 |
| 23 | employment | Work History | 8 | 2 | Related Subset | 2 | Obj Prop | 0.8000 | 0.4510 |
| 24 | employment | Work History | 8 | 2 | Subset | 3 | Data Prop | 0.8660 | 0.7273 |
| 2 | Individual | Person | 2 | 1 | Exact Match | 1 | SemMat | 1.0000 | 1.0000 |
| 9 | Individual | Person | 2 | 1 | Related Subset | 2 | Obj Prop | 0.8000 | 0.9000 |
| 16 | Individual | Person | 2 | 1 | Exact Match | 3 | Data Prop | 1.0000 | 0.9666 |
| 6 | Member | Membership | 6 | 1 | Near Match | 1 | SemMat | 0.7000 | 1.0000 |
| 13 | Member | Membership | 6 | 1 | Anchor Point | 2 | Obj Prop | 1.0000 | 0.8500 |
| 20 | Member | Membership | 6 | 1 | Exact Match | 3 | Data Prop | 1.0000 | 0.9500 |
| 3 | Organisation | Organisation | 3 | 1 | Exact Match | 1 | SemMat | 1.0000 | 1.0000 |
| 10 | Organisation | Organisation | 3 | 1 | Related Subset | 2 | Obj Prop | 0.3333 | 0.6667 |
| 17 | Organisation | Organisation | 3 | 1 | Exact Match | 3 | Data Prop | 1.0000 | 0.8888 |
| 1 | Party | Client | 1 | 1 | Exact Match | 1 | SemMat | 1.0000 | 1.0000 |
| 8 | Party | Client | 1 | 1 | Related Subset | 2 | Obj Prop | 0.8889 | 0.9259 |
| 15 | Party | Client | 1 | 1 | Exact Match | 3 | Data Prop | 1.0000 | 0.9815 |

TABLE 18-continued

| # | Ontology 1 | Ontology 2 | Align Id | Mini Map | Tags | | Step | | MV | Cum MV |
|---|---|---|---|---|---|---|---|---|---|---|
| 7 | Shares | Shares | 7 | 1 | Exact Match | 1 | SemMat | | 1.0000 | 1.0000 |
| 14 | Shares | Shares | 7 | 1 | Related Subset | 2 | Obj Prop | | 0.8571 | 0.9285 |
| 21 | Shares | Shares | 7 | 1 | Exact Match | 3 | Data Prop | | 1.0000 | 0.9762 |

Figure 19D:
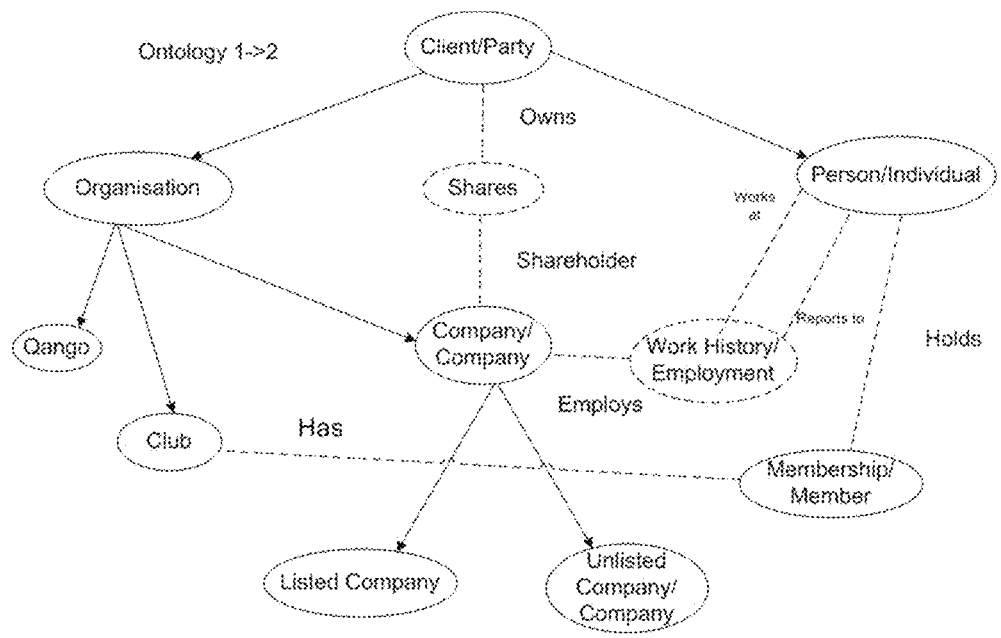
FIGS. 19D and 19E are schematic diagrams of examples of merged ontologies.
Figure 19E:
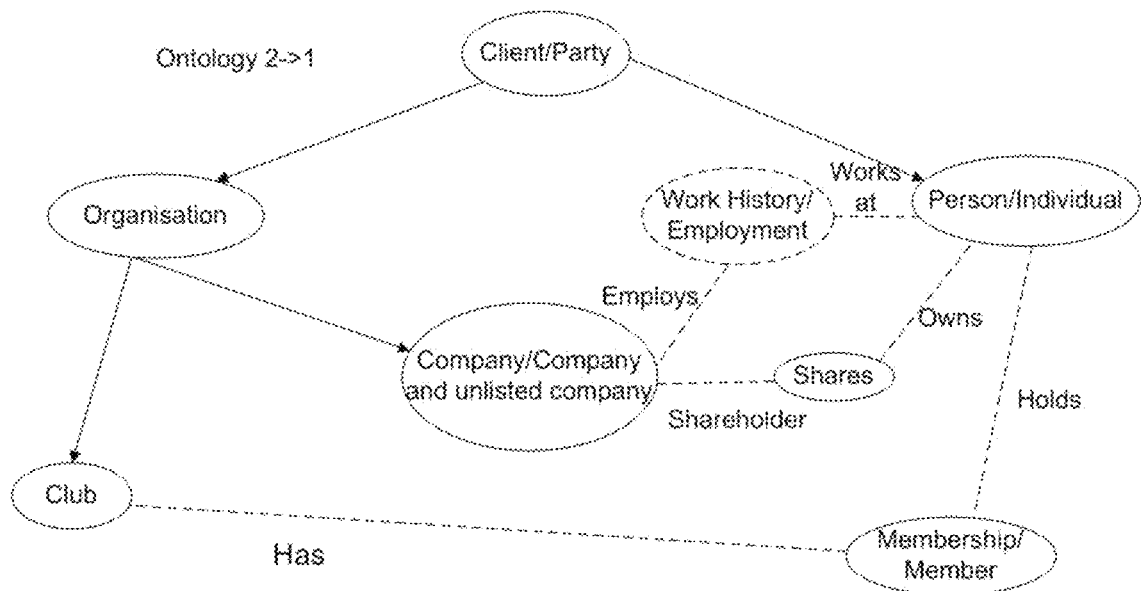

A merge process can then be performed to produce a merged ontology 1906, although this is optional and will depend on the preferred implementation. If the user decides to merge the ontologies then a number of decisions need to be made, including:

- Determine whether the merged ontology should be Ontology 1 into Ontology 2, or vice versa, or whether the merged ontology should be given a new URI. These cases are shown diagrammatically in FIGS. 19D and 19E.
- Select $MV_{MT}$ as the Match Value threshold for merging. Generally the $MV_{MT}$ would be lower than the $MV_{AT}$ as we may include related classes which do not actually align.
- If classes are not to be merged then a decision is required as to whether both, neither or only one of the classes should be included in the merged ontology. This can be specified as a rule, or as 'Ask', in which case the merge process would pause to allow the user to decide the action.
- Should classes for which no alignment was found be added to the merged ontology? For example, if Ontology 1 consists of classes A,B and Ontology 2 of classes B,C where B is the set of classes which are aligned, then should the merged ontology be A,B,C, or A,B or B,C or just B?

Once the merge parameters have been determined then it is a simple matter to merge the Classes, Data Properties and Object Properties of the two ontologies.

Any Data Property instances would retain their original URI unless specified otherwise. Thus if an aligned class has instance data in each ontology then the single merged class would contain the instances from both ontologies.

In general user interaction with the aligner module will be for the purpose of controlling the alignment process.

The first step is to load the configuration file specifying parameters to be used in the alignment and merge. There are a number of metadata parameters which can be set. These include:

- URI of the ontologies to be aligned.
- Location to store the alignment map.
- Location to store the merged ontology.
- The Match Value threshold for aligning $MV_{AT}$.
- The Match Value threshold for merging $MV_{MT}$.
- Match quality for accepting sameness during low level class matching.
- Optionally preload the Alignment Table with known alignments.
- Weights to be applied at each analysis step. These could be determined by a machine learning algorithm.
- Whether to pause the process during merge to allow user input on merging.
- Maximum run time.
- Verbosity of error and log messages.
- Etcetera.

The user then runs or schedules the process. If a pause for user input was specified the user provides input as requested, and as provided via screens typically displayed by the browser module.

Upon completion of the process the user examines:

- A report produced giving statistics of:
  - number of input classes in each ontology;
  - number of classes aligned;
  - number of PMPs identified;
  - number of PMPs expanded;
  - number of classes expanded from PMPs;
  - number of Data Property instances expanded from PMPs;
  - maximum and minimum Match values;
  - number of Classes merged;
  - number of classes in Merged Ontology;
  - number of data instances in merged ontology;
  - etcetera.
- The runtime logs to evaluate error, warning and information messages.

Based upon this information the user decides to accept the alignment or merge or to vary some of the configuration parameters and reschedule the process.

Accordingly, the above described processes allow for users to interact with ontologies to perform a variety of tasks including browsing, pruning and aligning ontologies. These processes can use a variety of modules and allow operations to be performed such as determining mappings between ontologies, including putative and formalised ontologies, which can in turn be used in mapping source and target data structures for the purpose of facilitating transfer of content between source and target data stores.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. Apparatus for generating a putative ontology from a data structure associated with a source data store, the apparatus including an electronic processing device that generates a putative ontology by: a. creating a normalised schema from the data structure associated with the source data store; b. identifying instances of denormalised data in the normalised schema which had been metadata denormalised in the data structure; c. determining whether the denormalised data defines an object relationship between rows in the metadata denormalised in the data structure; d. identifying at an ontology object property from the object relationship; e.

determining whether the denormalised data defines a concept in the rows of denormalised metadata in the data structure; f. identifying at least one ontology class from denormalised metadata; g. creating at least one second ontology class from at least one of the normalised schema classes which was not created by metadata denormalisation; h. creating at least one ontology object property from a relationship identified in the normalised schema; and i. creating at least one ontology data property from an attribute of each entity on the normalised scheme.

2. Apparatus according to claim 1, wherein the electronic processing device utilises a rules-based approach.

3. Apparatus according to claim 1, wherein the Putative Ontology is pruned to generate a pruned putative ontology comprising a relationship to a user identified set of Classes.

4. Apparatus according to claim 3, wherein the pruned putative ontology comprises a data structure definition for a Resource Description Framework (RDF) triple store or graph database.

5. Apparatus according to claim 4, further comprising a processor module configured to produce a field mapping between the fields of the data store and the pruned putative ontology for each Class, Object Property, Data Property and Notation.

6. Apparatus according to claim 5, further comprising and Extraction-Transforming- Loading (ETL) module configured to extract data defined by the pruning process from the source data store, transform the extracted data according to the field mapping, and load the transformed date into the appropriate Class, Object Property, Data Property and Notation fields of the pruned Putative ontology.

7. Apparatus according to claim 5, further comprising a processor module configured to extract data defined by the pruning process from the source data store.

8. Apparatus according to claim 5, further comprising an orchestrator module configured to transform the pruned data according to the field mapping, and load the transformed data into the appropriate Class, Object Property, Data Property and Notation fields of the pruned Putative ontology.

9. Apparatus according to claim 7, wherein the processor module is further configured to: register disparate data sources by adding metadata and mapping files; convert unstructured data into RDF; load RDF into triple-store; translate the mapping files into putative ontologies; and expose a SPAQRL endpoint for each source.

10. Apparatus according to claim 8, in which the orchestrator module is configured to accept data from multiple processor modules.

11. Apparatus according to claim 8, in which the orchestrator module is configured to: Register target ontologies; Read and index mapping files;
Transform SPARQL queries from target to mapped source vocabularies; Translate Response from source to target vocabularies; Store transformation rules; and Expose a SPARQL endpoint for the target.

* * * * *